US012442222B1

(12) United States Patent
Hood et al.

(10) Patent No.: US 12,442,222 B1
(45) Date of Patent: Oct. 14, 2025

(54) EXIT DEVICE ASSEMBLY

(71) Applicant: dormakaba USA Inc., Indianapolis, IN (US)

(72) Inventors: Brian H. Hood, Zionsville, IN (US); Juan Alvarado, Indianapolis, IN (US); Jason Clifford, Noblesville, IN (US)

(73) Assignee: dormakaba USA Inc., Indianapolis, IN (US)

( * ) Notice: Subject to any disclaimer, the term of this patent is extended or adjusted under 35 U.S.C. 154(b) by 96 days.

(21) Appl. No.: 18/107,211

(22) Filed: Feb. 8, 2023

Related U.S. Application Data

(60) Provisional application No. 63/307,735, filed on Feb. 8, 2022.

(51) Int. Cl.
*E05B 65/10* (2006.01)

(52) U.S. Cl.
CPC ...... *E05B 65/1006* (2013.01); *E05B 65/1053* (2013.01)

(58) Field of Classification Search
CPC ............. E05B 65/1073; E05B 65/1006; E05B 65/1066; E05B 65/1053; E05B 65/106; E05B 65/1013; E05C 9/04; E05C 9/042; E05C 9/043; E05C 5/02; E05C 5/04
See application file for complete search history.

(56) References Cited

U.S. PATENT DOCUMENTS

| | | | | |
|---|---|---|---|---|
| 703,642 A | | 7/1902 | Czermak et al. | |
| 808,673 A | * | 1/1906 | Morewood | E05B 65/1006 292/93 |
| 1,014,960 A | | 1/1912 | Ericson | |
| 1,117,457 A | * | 11/1914 | Smith | E05B 65/1006 292/21 |
| 1,130,266 A | | 3/1915 | Skiff | |
| 1,136,989 A | | 4/1915 | Woodard | |
| 1,203,115 A | | 10/1916 | Hurd | |
| 1,203,116 A | | 10/1916 | Hurd | |
| 1,551,506 A | | 8/1925 | Parsons | |
| 1,589,957 A | | 6/1926 | Handell | |
| 1,593,852 A | | 7/1926 | Shaw | |
| 1,603,397 A | | 10/1926 | Nielsen | |
| 1,630,141 A | * | 5/1927 | Soemer | E05B 65/1006 292/92 |
| 1,676,059 A | * | 7/1928 | Smith | E05B 65/1006 292/92 |

(Continued)

FOREIGN PATENT DOCUMENTS

| | | |
|---|---|---|
| CA | 2832778 A1 | 5/2014 |
| CA | 2896448 A1 | 1/2016 |

(Continued)

*Primary Examiner* — Christine M Mills
*Assistant Examiner* — Faria F Ahmad
(74) *Attorney, Agent, or Firm* — Faege Drinker Biddle & Reath LLP

(57) ABSTRACT

An exit device including an intermediate transmission assembly transmitting the translation of an input into a rotational vertical rod output is disclosed. An upper door latch receiving a rotational vertical rod input to actuate an upper door latch from a latched position to an unlatched position is further disclosed. A lower latch receiving a rotational vertical rod input to actuate a lower latch from a latched position to an unlatched position is additionally disclosed.

22 Claims, 41 Drawing Sheets

(56) References Cited

U.S. PATENT DOCUMENTS 1,721,489 A * 7/1929 Prinzler .............. E05B 65/1006 292/92
1,919,328 A 7/1933 Hansen
1,941,459 A 1/1934 Bock
2,147,581 A * 2/1939 Prinzler .............. E05B 65/1066 70/92
2,631,052 A 3/1953 Jamison, Jr.
2,836,451 A * 5/1958 Clifton, Jr. .......... E05B 65/1066 70/92
3,583,740 A 6/1971 Armstrong
3,663,047 A 5/1972 Zawadzki
3,730,574 A 5/1973 Zawadzki
3,776,582 A 12/1973 Balducci
3,788,687 A 1/1974 Zawadzki
3,801,144 A * 4/1974 Diehl .................. E05B 47/0002 70/92
4,283,882 A 8/1981 Hubbard et al.
4,366,974 A * 1/1983 Horgan, Jr. ........... E05B 65/106 292/336.3
4,382,620 A * 5/1983 Horgan, Jr. ........... E05B 65/106 292/336.3
4,660,872 A 4/1987 Carson et al.
4,711,480 A * 12/1987 Horgan, Jr. ........... E05C 19/166 49/141
4,741,563 A * 5/1988 Cohrs ................. E05B 65/1046 292/168
4,819,976 A 4/1989 Bert
4,877,276 A 10/1989 Pastva
4,880,261 A 11/1989 Bisbing
4,898,008 A 2/1990 Eberly
4,921,287 A 5/1990 Horvath et al.
4,961,330 A * 10/1990 Evans ................. E05B 65/1053 70/92
5,114,192 A * 5/1992 Toledo .................... E05B 63/20 292/21
5,154,454 A * 10/1992 Hollaway ........... E05B 65/1046 292/DIG. 60
5,161,837 A * 11/1992 O'Brien .............. E05B 65/1006 292/336.3
5,702,134 A * 12/1997 Hsieh .................. E05B 65/1046 292/DIG. 60
5,816,017 A 10/1998 Hunt et al.
6,000,733 A * 12/1999 Linder ................ E05B 65/1046 292/92
6,511,104 B1 * 1/2003 Horgan, Jr. ............... E05B 3/00 292/336.3
6,581,419 B1 6/2003 Strodtman
6,641,183 B2 11/2003 Brown
6,820,905 B1 11/2004 Haeck et al.
6,854,773 B2 2/2005 Lin
7,000,954 B2 2/2006 Cohrs et al.
7,144,050 B2 12/2006 Lin
7,287,784 B2 10/2007 Lin
7,712,800 B2 5/2010 Peng
7,748,757 B2 7/2010 Shen
8,042,843 B2 10/2011 Tien
8,267,440 B2 9/2012 Shen
9,500,003 B1 11/2016 Greg
9,580,944 B2 2/2017 Arlinghaus et al.
11,118,377 B2 9/2021 Blanchard et al.
12,006,733 B2 6/2024 Chen et al.
2003/0057714 A1* 3/2003 Brown ................ E05B 65/1013 292/196
2004/0227351 A1 11/2004 Lin
2007/0273158 A1 11/2007 Berger
2009/0236864 A1 9/2009 Ehrlich et al.
2010/0109352 A1* 5/2010 Tien .................... E05B 65/1006 292/336.3
2010/0117376 A1* 5/2010 Shen ................... E05B 65/1006 292/92
2010/0236298 A1 9/2010 James et al.
2010/0253098 A1 10/2010 Moreno
2011/0198869 A1* 8/2011 Lu ......................... E05C 9/1875 292/195
2011/0198871 A1* 8/2011 Lu ........................... E05B 63/12 292/195
2012/0001757 A1 1/2012 Jung et al.
2013/0093195 A1* 4/2013 Tien ...................... E05B 65/104 292/93
2013/0127184 A1* 5/2013 Tien ...................... E05B 65/104 292/219
2014/0049055 A1* 2/2014 Shih .......................... E05C 7/00 292/162
2014/0102155 A1* 4/2014 Lin ......................... E05C 9/046 70/92
2015/0075231 A1 3/2015 Waugh et al.
2016/0060918 A1* 3/2016 Garrett ...................... E05G 1/04 292/138
2016/0069107 A1* 3/2016 Uyeda ..................... E06B 5/164 292/145
2016/0168879 A1* 6/2016 Chen ................... E05B 65/1006 292/138
2016/0244993 A1* 8/2016 Nepsha ................... E05C 9/043
2017/0191288 A1* 7/2017 Lin ..................... E05B 65/1006
2017/0241166 A1 8/2017 Cheng
2018/0238088 A1* 8/2018 Bowles ................... E05C 9/047
2019/0194986 A1 6/2019 Cheng
2019/0352937 A1 11/2019 Mckibben et al.
2020/0270898 A1* 8/2020 Schaeffer .................. E05C 9/20
2021/0017793 A1* 1/2021 Digmann .............. E05B 47/026
2022/0341212 A1 10/2022 Crondahl
2023/0068173 A1 3/2023 Zhang et al.
2023/0340807 A1 10/2023 Kleynerman
2023/0392419 A1 12/2023 Lay et al.
2024/0254805 A1 8/2024 Charney et al.

FOREIGN PATENT DOCUMENTS

CA 3022369 A1 4/2019
DE 202012007145 U1 * 12/2013 ........... E05B 1/0038
EP 0330807 A1 9/1989
EP 1672154 A2 * 6/2006 ......... E05B 17/0025
GB 2214561 A 9/1989

* cited by examiner

EXIT DEVICE ASSEMBLY

RELATED APPLICATIONS

This application claims the benefit of U.S. Provisional Application No. 63/307,735, filed Feb. 8, 2022, titled EXIT DEVICE ASSEMBLY, the entire disclosure of which is expressly incorporated by reference herein.

This application is also related to U.S. Provisional Application No. 63/307,732, filed Feb. 8, 2022, titled EXIT DEVICE ASSEMBLY; U.S. Provisional Application No. 63/307,736, filed Feb. 8, 2022, titled EXIT DEVICE ASSEMBLY; U.S. patent application Ser. No. 18/107,226, filed Feb. 8, 2023, titled EXIT DEVICE ASSEMBLY; and U.S. patent application Ser. No. 18/107,223, filed Feb. 8, 2023, titled EXIT DEVICE ASSEMBLY, the entire disclosures of which are expressly incorporated by reference herein.

FIELD OF THE DISCLOSURE

The present disclosure relates to door hardware and, in particular, to an exit device for selectively allowing egress through a door.

BACKGROUND OF THE DISCLOSURE

Exit devices can be coupled to a door to provide an actuator for a latch to allow egress through the door frame mated with the door. An input of the exit device is configured to actuate a latch from a latched configuration to an unlatched configuration permitting the operator to open the door.

SUMMARY OF THE DISCLOSURE

An exit device including an intermediate transmission assembly transmitting the translation of an input into a rotational vertical rod output is disclosed. An upper door latch receiving a rotational vertical rod input to actuate an upper door latch from a latched position to an unlatched position is further disclosed. A lower latch receiving a rotational vertical rod input to actuate a lower latch from a latched position to an unlatched position is additionally disclosed.

An exit device including an intermediate transmission assembly transmitting the translation of an input into a rotational vertical rod output is disclosed. An upper door latch receiving a rotational vertical rod input to actuate an upper door latch from a latched position to an unlatched position is further disclosed. A lower latch receiving a rotational vertical rod input to actuate a lower latch from a latched position to an unlatched position is additionally disclosed.

In an embodiment of the disclosure herein, an upper door latch assembly is provided, and the upper door latch assembly comprises: an upper latch which has a rocker, the rocker rotatable about a rocker axis of rotation from an extended and latched position to a retracted and unlatched position. The rocker is also rotatable about the rocker axis of rotation from a retracted and unlatched position to an extended and latched position. The upper door latch assembly further comprises a rotatable input which is rotatable about a rotatable input axis of rotation. The rocker axis of rotation is substantially perpendicular to the rotatable input axis of rotation, and the rotatable input has a rotatable input latched position and a rotatable input unlatched position. The rotatable input is rotatable about the rotatable input axis of rotation from the rotatable input latched position to the rotatable input unlatched position and also rotates from the rotatable input unlatched position to the rotatable input latched position.

In the present embodiment herein, the rotatable input extends a length that is greater than half of the height of a pedestrian traffic door, and the upper latch can be actuated from a distance away greater than half of the height of the pedestrian traffic door. Further, the upper door latch assembly includes an upper vertical rod, and the rotatable input includes a cam. The cam has a longitudinal axis and the longitudinal axis of the cam is offset from the rotatable input longitudinal axis.

In the present embodiment herein, the upper door latch assembly includes a pivotable roller bracket that is pivotable about a pivot axis. Further, the upper door latch assembly includes a roller rotatably supported by the pivotable roller bracket, the roller supported on a roller axis of rotation, and the roller axis of rotation is spaced a distance from the pivot axis. The pivotable roller bracket has a blocking position where the roller blocks movement of the upper latch from the extended and latched position toward the retracted and unlatched position, and the pivotable roller bracket is pivotable about the pivot axis from the blocking position to allow the upper latch to actuate toward the retracted and unlatched position. Further, the upper latch bears against the roller when actuated from the extended latched position to the retracted and unlatched position.

The present embodiment disclosed herein, the upper door latch assembly further including a torsion spring biasing the pivotable roller bracket toward the blocking position. The torsion spring biasing the roller toward the upper latch and providing a biasing force to maintain the position of the upper latch in the retracted and unlatched position when the upper latch maintains the retracted and unlatched position.

The present embodiment disclosed herein, wherein the rotatable input comprises a cam and the cam maintains a stop position blocking the pivotable roller bracket from pivoting from the blocking position when the rotatable input maintains the rotatable input latched position. The upper latch also includes a return arm positioned to receive a force to overcome the biasing force maintaining the position of the upper latch in the retracted and unlatched position.

In another embodiment of the disclosure herein, an upper door latch assembly comprises an upper latch having an extended and latched position and a retracted and unlatched position. The upper door latch assembly further includes a rotatable input having a rotatable input latched position and a rotatable input unlatched position. The rotatable input is rotatable about a rotatable input axis of rotation from the rotatable input latched position to the rotatable input unlatched position and rotatable from the rotatable input unlatched position to the rotatable input latched position. The rotatable input maintains the upper latch in the latched position when the rotatable input maintains the rotatable input latched position. The rotatable input extends a length greater than half of a height of a pedestrian traffic door, whereby the upper latch can be actuated from a distance greater than half of the height of a pedestrian traffic door.

The present embodiment disclosed herein further including a rocker rotatable about a rocker axis of rotation from the latched position to the unlatched position and rotatable from the unlatched position to the latched position. The rocker axis of rotation is substantially perpendicular to the rotatable input axis of rotation. Further, the rotatable input comprises an upper vertical rod and a cam.

Another embodiment of the disclosure herein, including an egress point comprising a door frame having a left vertical frame member, a right vertical frame member and an upper frame member extending between the left vertical frame member and the right vertical frame member, and the door frame defines an opening allowing pedestrian egress. The egress point further includes a door connected to the door frame, the door rotatable between a closed position that blocks pedestrian egress through the door frame and an open position that allows pedestrian egress through the door frame, and the door has a door height. The egress point also includes a strike plate supported by the upper frame member, and an upper latch has a latched position and an unlatched position. When the upper latch is in the latched position, the upper latch cooperates with the strike plate to secure the door in the closed position. When the upper latch is in the unlatched position, the door is allowed to move from the closed position towards the closed position. The egress point further including an upper vertical rod rotatable about a vertical rod axis of rotation to actuate the upper latch from the latched position to the unlatched position.

DETAILED DESCRIPTION OF THE DRAWINGS

Figure 1:
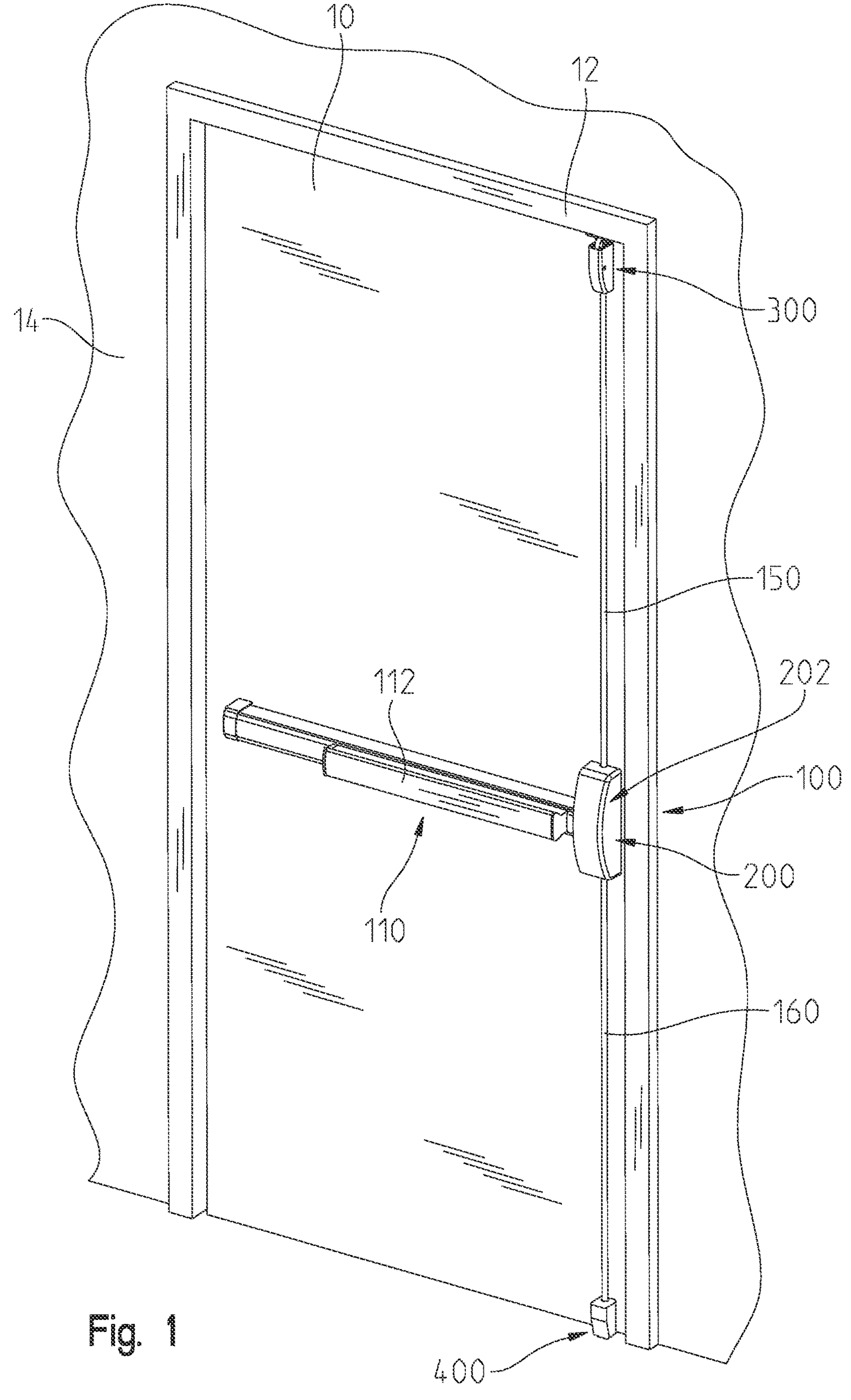
FIG. 1 shows a perspective view of a door having an exit device assembly of the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

FIG. 1 illustrates an egress point including door frame 12 defining an opening through wall 14 allowing pedestrian egress therethrough, door 10 connected to door frame 12 (e.g., via door hinges) and rotatable between the closed position shown in FIG. 1 blocking egress through door frame 12 and an open position allowing egress through door frame 12, and exit device assembly 100. Door 10 has a height nominally equal to that of a general pedestrian traffic door. While door 10 and door frame 12 can also selectively allow ingress, FIG. 1 is said to illustrate an egress point because exit device is actuatable from an interior to allow egress through door frame 12. In various alternative embodiments, door frame 12 could be configured to hold a single door or a plurality of doors. Door frame 12 includes two (left and right) generally vertical frame members connected by an upper frame member. The "vertical" frame members of the present disclosure are nominally vertical in the context of a door installation. That is, a "vertical" frame member is not exactly plumb, but will appear vertical or nearly vertical (within 0-8 degrees of plumb) to an observer.

Exit device assembly 100 is operable to transition door 10 between the closed position illustrated in FIG. 1 and an open position allowing ingress and egress through door frame 12. Exit device assembly 100 is operable between a latched position that corresponds to retaining door 10 in the closed position and an unlatched position that corresponds to allowing door 10 to be transitioned from the closed position into the open position. Exit device assembly 100 includes input device 110 with input 112 that actuates exit device assembly 100 between the latched position and the unlatched position allowing a user to transition the door 10 from a closed position to an open position. In various embodiments, the input device 110 of the exit device assembly 100 is a touch bar input that receives a user touch in the form of a push on push bar 112 that translates push bar 112 toward door 10.

Input device 110 is operatively coupled to door 10 and to intermediate transmission assembly 200. Input device 110 operates intermediate transmission assembly 200 in a way that actuates the exit device assembly 100 between the latched position and unlatched position. Accordingly, intermediate transmission assembly 200 is operatively connected to upper latch assembly 300 through upper vertical rod 150. Further, intermediate transmission assembly 200 is connected to lower latch assembly 400 through lower vertical rod 160. Both upper vertical rod 150 and lower vertical rod 160 are substantially vertical. The "vertical" rods of the present disclosure are nominally vertical in the context of a door installation. That is, a rod need not be precisely plumb to be considered a vertical rod, but will appear vertical or nearly vertical (within 0-8 degrees of plumb) to an observer.

Figure 7:
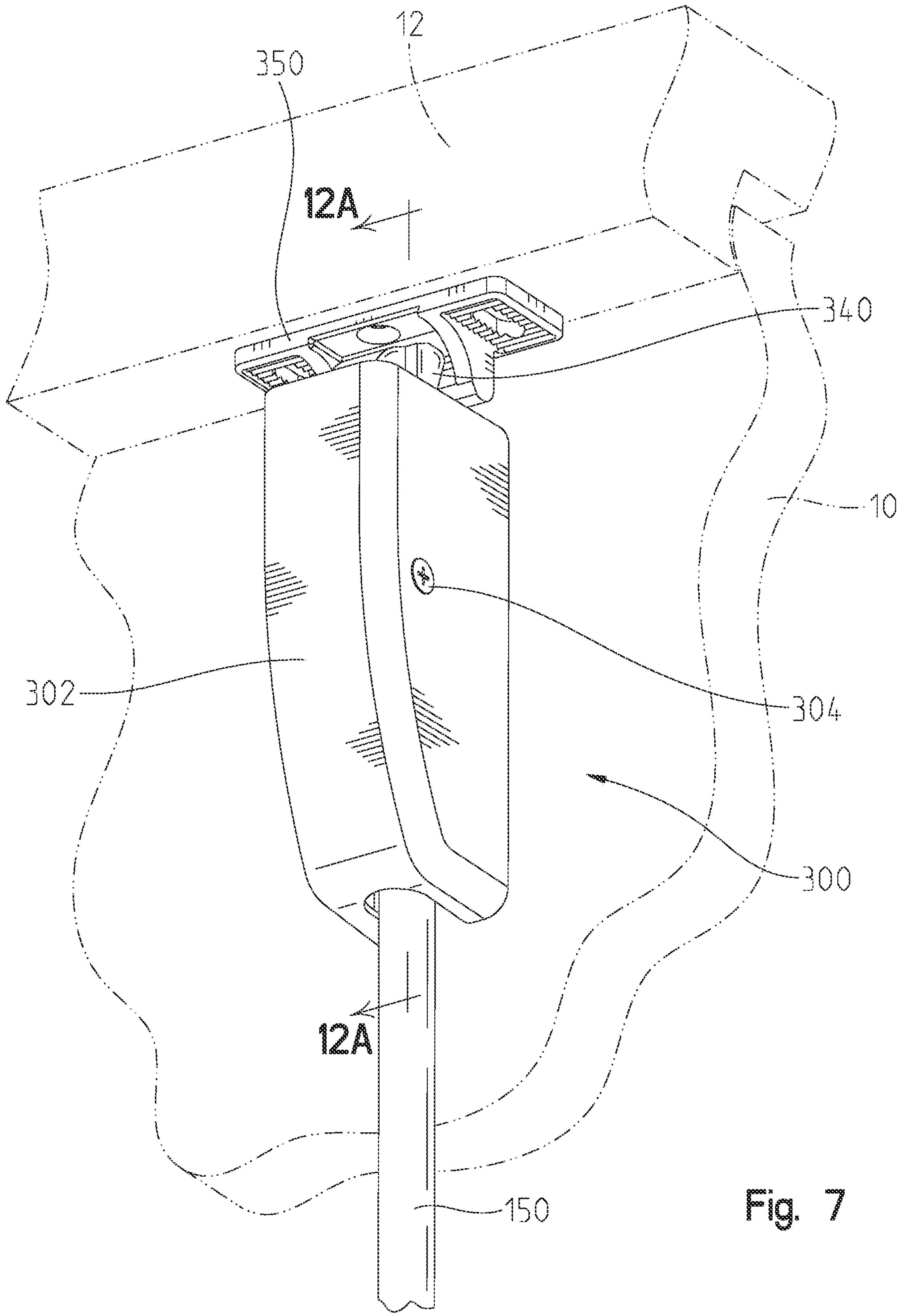
FIG. 7 shows a perspective view of a top latch assembly of the exit device assembly of FIG. 1.
Figure 14:
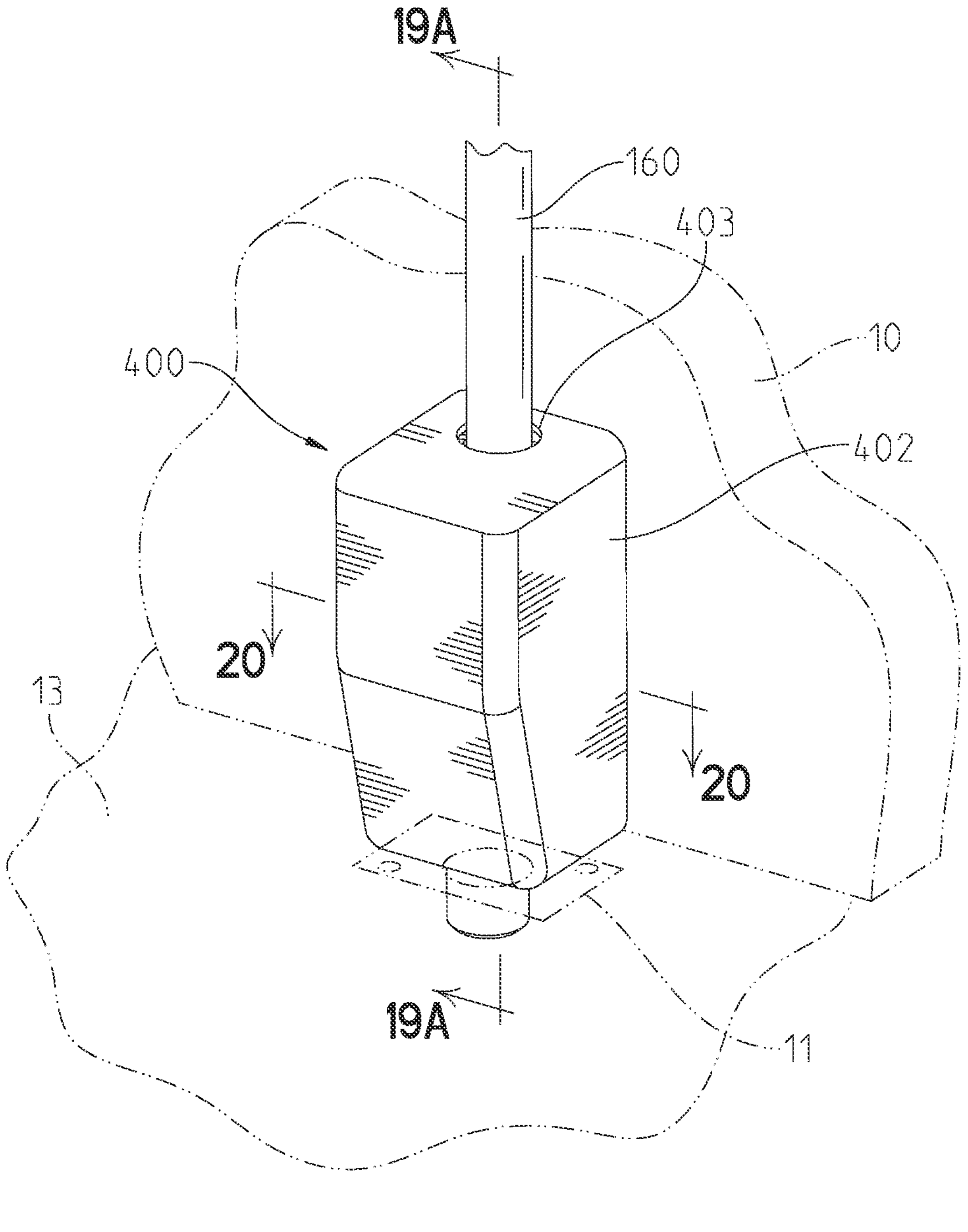
FIG. 14 shows a perspective view of a lower latch assembly of the exit device assembly of FIG. 1.
Figure 15:
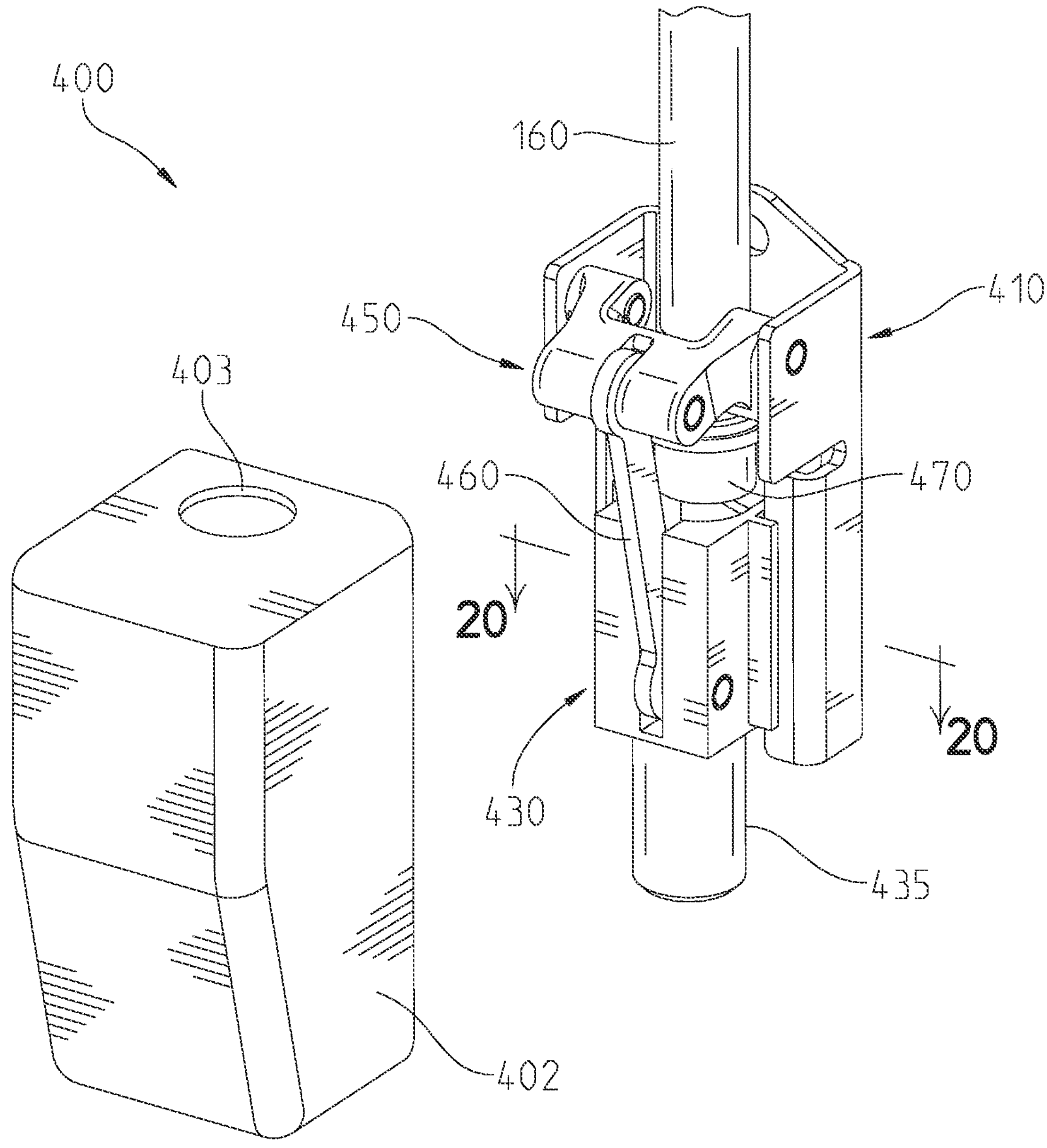
FIG. 15 shows a view of a lower latch assembly of FIG. 14 with the cover removed.

Intermediate transmission assembly 200 transmits a translational movement into a rotational output. Upper vertical rod 150 and lower vertical rod 160 are operably coupled to intermediate transmission assembly 200 and rotate in response to the actuation of intermediate transmission assembly 200 by push bar 112, as further explained below. Upper vertical rod 150 is coupled with upper latch assembly 300. Referring to FIG. 7, upper latch assembly 300 includes latch 340 that rotates out of engagement with strike plate 350 in response to rotation of upper vertical rod 150, as described in more detail below with reference to FIGS. 12A-12C. Referring to FIG. 15, lower latch assembly 400 includes latch 435 in the form of a bolt that moves vertically relative to receiver 11 (FIG. 14) in response to rotation of lower vertical rod 160, as described in more detail below with reference to FIGS. 14-21B. The "vertical" movement of latch 435 is "substantially vertical" in that it appears to a user to be vertical or nearly vertical. In the context of this patent application, an element need not be precisely plumb to be considered "substantially vertical," but rather may be within 0-8 degrees of plumb.

Because upper vertical rod 150 and lower vertical rod 160 rotate in response to a push received on push bar 112 to actuate latches 340, 435, as opposed to the vertical rod translation of predicate devices, the input force needed to actuate latches 340, 435 is reduced relative to the predicate devices. Furthermore, the length of vertical rods 150, 160 need not be as precise as in the predicate devices.

Intermediate Transmission Assembly

Figure 2:
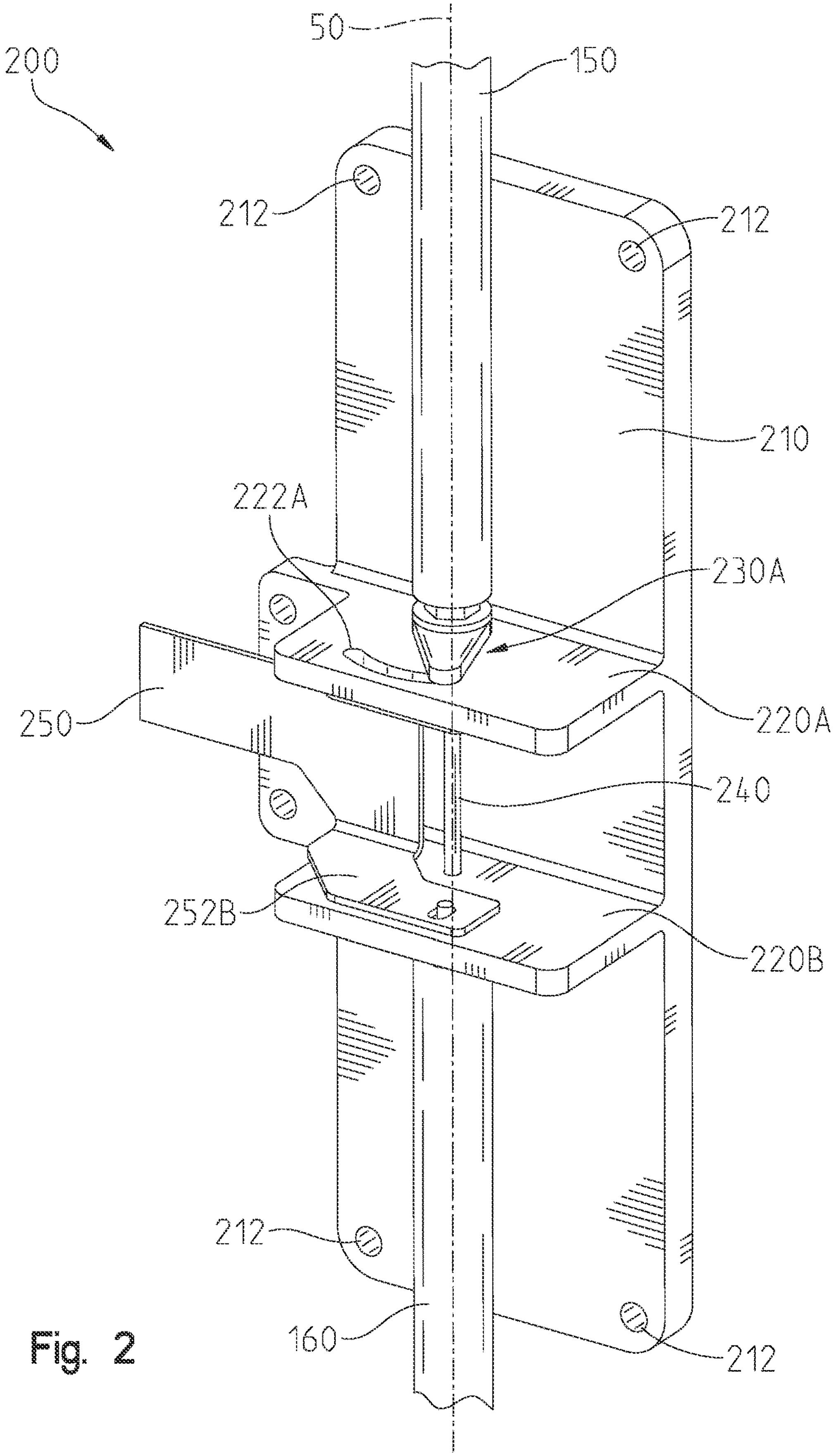
FIG. 2 shows a perspective view of an intermediate transmission assembly of the exit device assembly of FIG. 1.

The intermediate transmission assembly 200 will now be explained in greater detail. As can be seen in FIG. 2, intermediate transmission assembly 200 is positioned vertically between upper vertical rod 150 and lower vertical rod

160. In the present embodiment, intermediate transmission assembly 200 includes a cover 202 (FIG. 1). In FIG. 2, intermediate transmission assembly 200 is in an unactuated position, i.e., in a position corresponding to an unactuated or at rest position of push bar 112. Intermediate transmission assembly 200 is positioned so that it actuates both upper vertical rod 150 and lower vertical rod 160 when it receives an input via push bar 112. Intermediate transmission assembly 200 includes input 250 exemplified as input bracket 250 operably coupled to latch chassis, or frame 210. Latch chassis 210 includes openings 212 positioned around the perimeter of latch chassis 210. Openings 212 are configured to receive fasteners (not shown) to mount latch chassis 210 to door 10.

Turing to FIG. 3, intermediate transmission assembly 200 will be explained in greater detail. Latch chassis 210 further includes chassis extensions 220A, 220B extending outward from a base of latch chassis 210. In the present embodiment, chassis extensions 220 include upper chassis extension 220A and lower chassis extension 220B. Upper chassis extension 220A is configured with upper channel 222A and upper axle aperture 224A, and lower extension 220B is configured with lower channel 222B and lower axle aperture 224B. In the present embodiment, upper channel 222A and lower channel 222B are configured to have the profile of a circular arc. In various embodiments, upper channel 222A and lower channel 222B may have any arcuate shape with various profiles. Further, chassis extensions 220A and 220B are vertically spaced apart a distance that is approximately equal to the vertical height of input bracket 250. In various embodiments, chassis extensions 220A and 220B may be spaced apart a distance greater than the vertical height of input bracket 250.

Figure 6:
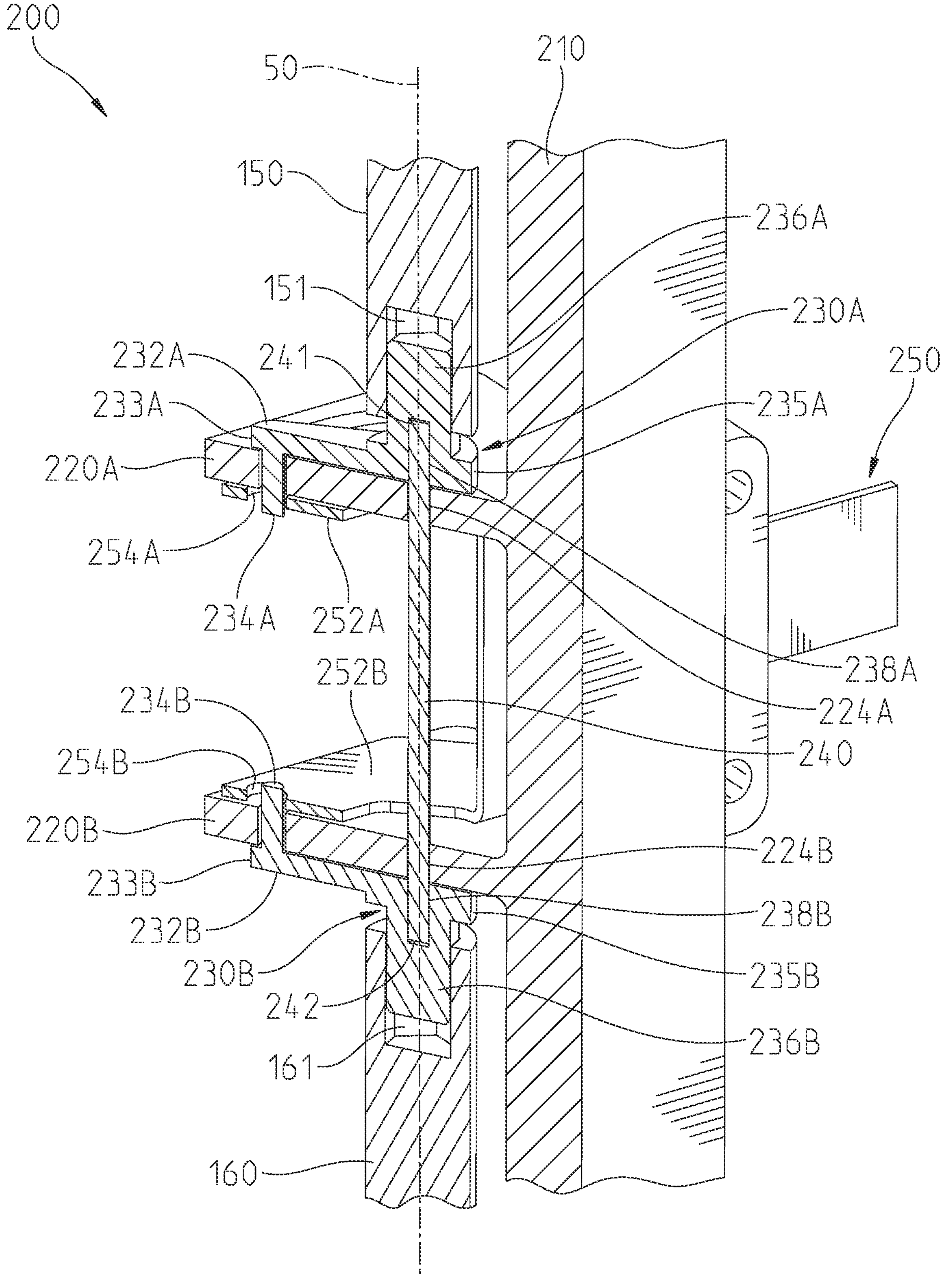
FIG. 6 is a cross-sectional view of the intermediate transmission assembly of FIG. 1, taken along line 6-6 of FIG. 5.

Intermediate transmission assembly 200 further includes outputs 230A, 230B. Illustratively, intermediate transmission assembly 200 includes upper output 230A and lower output 230B. Upper output 230A includes arm 232A. Arm 232A includes first end 233A and second end 235A, which are both nominally circular at their extremes from each other. First end 233A is configured with a smaller diameter circular portion than second end 235A. First end 233A of arm 232A further includes pin, or extension 234A extending substantially vertically downward therefrom. In the present embodiment, pin 234A is cylindrically shaped. Adjacent second end 235A of arm 232A, insert 236A extends in a substantially vertically upward direction. As shown in FIG. 6, arm 232A further includes aperture 238A positioned through second end 235A, opposite upper vertical rod 150, and extending within insert 236A.

In the present embodiment, aperture 238A is, when intermediate transmission assembly 200 is assembled, aligned with upper axle aperture 224A, and arm 232A is appropriately sized for pin 234A to be simultaneously received within upper channel 222A. In the present embodiment, insert 236A has a hexagonal cross-section, and engages, in a rotationally fixed manner, the lower end opening 151 of upper vertical rod 150 (FIG. 6). More particularly, lower end opening 151 of upper vertical rod 150 has a cross-section that is substantially congruent to the cross-section of insert 236A, i.e., lower end opening shares a cross-sectional shape with insert 236A, but is slightly larger to allow insert 236A to be inserted into lower end opening 151 to effect rotational locking of upper vertical rod 150 to output 230A such that rotation of output 230A about the longitudinal axis of upper vertical rod 150 yields the same rotation of upper vertical rod 150. In various embodiments, insert 236A may have a variety of cross-sections that can transmit a torque to the upper vertical rod 150 from the arm 232A.

Figure 3:
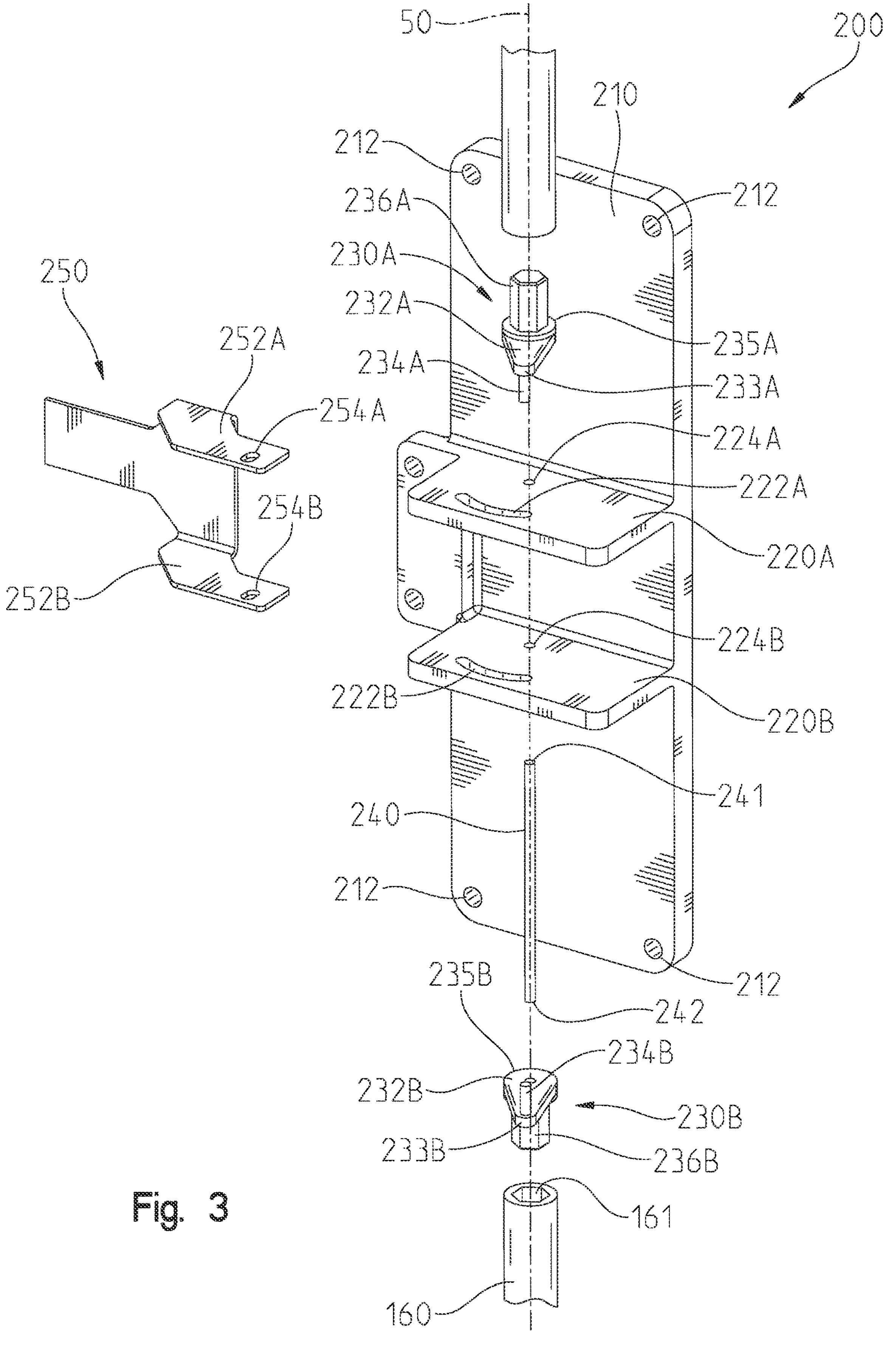
FIG. 3 shows an exploded view of an intermediate transmission assembly of the exit device assembly of FIG. 1.

Still referring to FIG. 3, intermediate transmission assembly 200 includes both upper output 230A and lower output 230B. Lower output 230B operates identical to upper output 230A, however it is rotated to be oriented 180 degrees, or upside-down, relative to the upper output 230A. Lower output 230B includes an arm 232B. Arm 232B includes first end 233B and second end 235B which are both nominally circular at their extremes from each other. First end 233B is configured with a smaller diameter circular portion than the second end 235B. First end 233B of arm 232B further includes pin, or extension 234B extending substantially vertically upward therefrom. In the present embodiment, pin is cylindrically shaped. Adjacent second end 235B of arm 232B, insert 236B extends in a substantially vertically downward direction. As shown in FIG. 6, arm 232B further includes aperture 238B positioned through second end 235B, opposite lower vertical rod 160, and extending within insert 236B.

In the present embodiment, aperture 238B is, when intermediate transmission assembly 200 is assembled, aligned with lower axle aperture 224B, and arm 232B is appropriately sized for pin 234B to be simultaneously received within lower channel 222B. In the present embodiment, insert 236B has a hexagonal cross-section, and engages, in a rotationally fixed manner, the upper end opening 161 of lower vertical rod 160 (FIG. 6). More particularly, upper end opening 161 of lower vertical rod 160 has a cross-section that is substantially congruent to the cross-section of insert 236B, i.e., lower end opening shares a cross-sectional shape with insert 236B, but is slightly larger to allow insert 236B to be inserted into upper end opening 161 to effect rotational locking of lower vertical rod 160 to output 230B such that rotation of output 230B about the longitudinal axis of lower vertical rod 160 yields the same rotation of lower vertical rod 160. In various embodiments, insert 236B may have a variety of cross-sections that can transmit a torque to the lower vertical rod 160 from the arm 232B.

Still referring to FIG. 3, intermediate transmission assembly 200 further includes axle 240 which extends between and through upper extension 220A and lower extension 220B. Further, axle 240 includes an upper portion 241 that, in assembly, extends through upper axle aperture 224A and into aperture 238A. Axle 240 further includes lower portion 242 that, in assembly, extends through lower axle aperture 224B and insert into aperture 238B. In the present embodiment, upper portion 241 and lower portion 242 each include at least one spline which engages a mating spline extending into aperture 238A and aperture 238B, respectively. In various embodiments, upper portion 241 of axle 240 is secured to output 230A and lower portion 242 is secured to output 230B through a friction fit. In various embodiments, upper portion 241 and lower portion 242 are coupled to output 230A and 230B, respectively, through various methods including adhesive, welding, fastening, or other methods. Axle 240, insert 236A, and insert 236B are positioned on vertical rod rotation axis 50, and upper vertical rod 150, insert 236A, axle 240, insert 236B, and lower vertical rod 160 all rotate together along vertical rod rotation axis 50 (see, e.g., FIGS. 3 and 5), which nominally coincides with the longitudinal axes of upper vertical rod 150, upper output 236A, axle 240, lower output 236B, and lower vertical rod 160.

Referring to FIGS. 2-6, intermediate transmission assembly 200 includes input bracket 250 interposed between upper extension 220A and lower extension 220B. Input bracket

250 includes upper tab 252A and lower tab 252B, which extend nominally perpendicular to door 10 (FIG. 1). In the present embodiment, an upper extent of upper tab 252A and a lower extent of lower tab 252B are positioned within the lower extent of upper extension 220A and the upper extent of lower extension 220B, respectively. Upper tab 252A includes channel 254A and lower tab 252B includes channel 254B. In the present embodiment, channels 254A and 254B are configured with a length that is at least equal, if not greater than, the sagitta or height, of the arcuate shape of upper channel 222A and lower channel 222B. In the present embodiment, channel 254A and channel 254B are nominally parallel, and channel 222A and channel 222B are nominally parallel. In various embodiments, channels 254A and 254B, and channels 222A and 222B need not be parallel.

Figure 4:
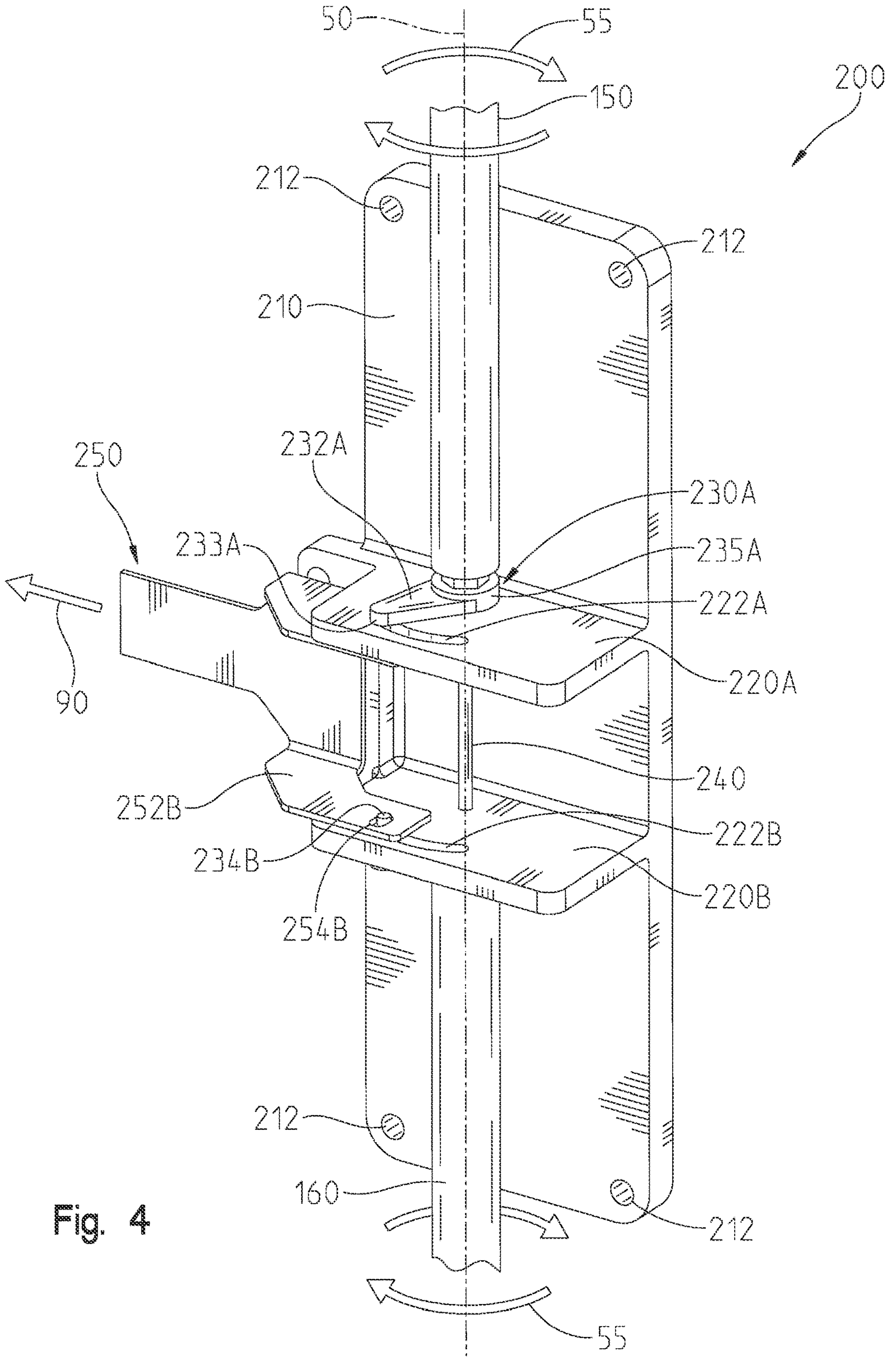
FIG. 4 shows a perspective view of an intermediate transmission assembly of the exit device assembly of FIG. 1 with the intermediate transmission assembly in an actuated configuration.

Illustrated in FIG. 4, intermediate latch assembly 200 is in an actuated, or engaged configuration. Input bracket 250 is moved in lateral direction 90, which is parallel with door 10. As can best be seen in reference to lower tab 252B, pin 234B engages channel 254B after passing through lower channel 222B. Similarly, pin 234A engages channel 254A after passing through upper channel 222A (FIG. 6). As best seen in FIG. 4, as input bracket 250 moves in lateral direction 90, lower tab 252B and upper tab 252A pull on pin 234B and pin 234A, respectively, moving pin 234B and pin 234A in lateral direction 90 guided along channels 222B and 222A. As pins 234A, 234B move along upper channel 222A and lower channel 222B, respectively, arm 232A and arm 232B also rotate around vertical rod rotation axis 50. Insert 236A rotates with arm 232A and insert 236B rotates with arm 232B, thereby rotating upper vertical rod 150 and lower vertical rod 160 (which are rotationally secured to inserts 236A, 236B, respectively) about vertical rod rotation axis 50. As input bracket 250 moves along lateral direction 90, upper vertical rod 150 and lower vertical rod 160 are rotated about rotation axis 50 in rotational direction 55. As will be described further below, as upper vertical rod 150 and lower vertical rod 160 rotate, upper latch assembly 300 and lower latch assembly 400 will move between a latched and an unlatched position allowing door 10 to open and/or close and be locked.

Input bracket 250 is configured to move in lateral direction 90 in response to actuation of input device 110 (FIG. 1). Specifically, a user can push push bar 112 of input device 110 toward door 10 over a defined travel of push bar 112. Actuating push bar 112 over the travel of push bar 112 results in translation of input bracket 250 sufficient to rotate arms 232A, 232B over their full travel, as defined by channels 222A, 222B. In various embodiments, input device 110 may use a ramped slot/peg combination to transmit the translation of push bar 112 toward door 10 into the translation of input bracket 250 along door 10 (and nominally orthogonal to the translation of push bar 112) sufficient to rotate arms 232A, 232B over their full travel. In various embodiments, input device 110 may use a bell crank type mechanism to transmit the translation of push bar 112 toward door 10 into the translation of input bracket 250 along door 10 (and nominally orthogonal to the translation of push bar 112) sufficient to rotate arms 232A, 232B over their full travel.

In alternative forms of input device, push bar 112 couples with at least one actuator housed within input device 110 to effect translation of input bracket 250. In such an embodiment, the actuator rotates about a rotation axis that is nominally parallel to the door, and perpendicular to the ground. The actuator includes a first leg and a second leg, wherein the first leg couples with input 112, and the second leg couples with input bracket 250. The actuator may be a roll of spring steel. In various embodiments, second leg may couple to input bracket 250 through an extension that extends through the housing of input device 110. Illustrated in FIG. 1, input device 110 extends a majority of the width of door 10 and includes a housing which accommodates the actuator and extension of input device 110, of this embodiment.

Figure 5:
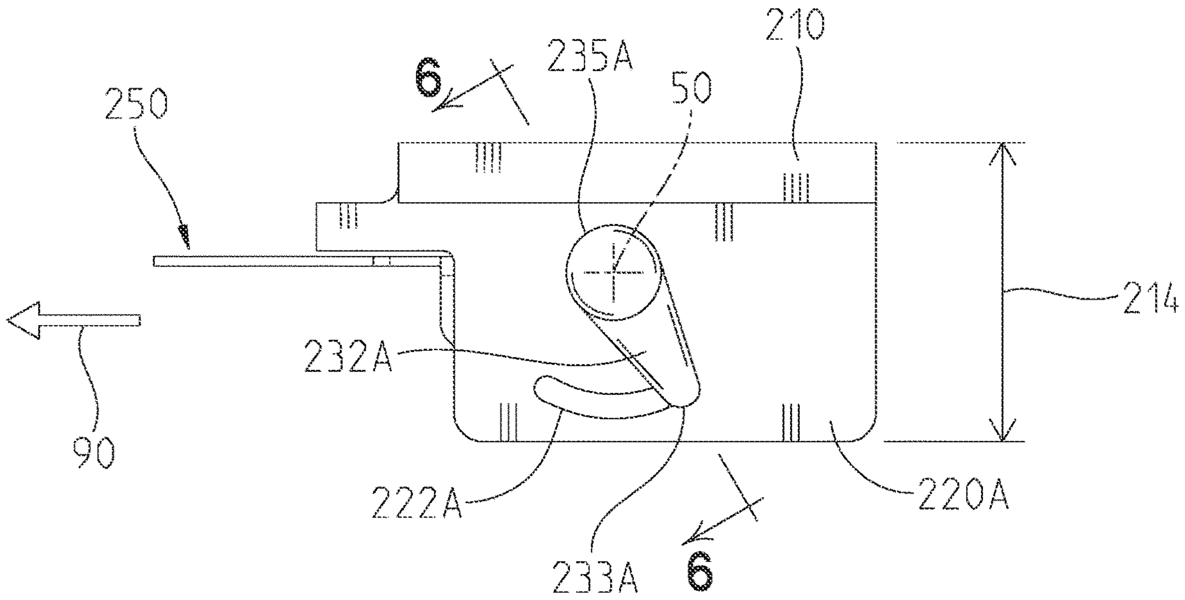
FIG. 5 shows a plan view of an intermediate transmission assembly of the exit device assembly of FIG. 1 in an unactuated configuration.

Illustrated in FIG. 5, the rotation path of upper output 230A can be seen in greater detail. As input bracket 250 moves in lateral direction 90, arm 232A and pin 234A (FIG. 6) move within upper channel 222A, causing upper output 230A to rotate about vertical rod rotation axis 50. In the present embodiment, channels 222A and 222B are configured with an arc that extends approximately 60 degrees about vertical rod rotation axis 50. Upper vertical rod 150 and lower vertical rod 160 may therefore rotate approximately 60 degrees about vertical rod rotation axis 50. In various alternative embodiments, upper vertical rod 150 and lower vertical rod 160 may have a rotational range anywhere between 30 and 120 degrees. In various embodiments, upper vertical rod 150 and lower vertical rod 160 may rotate between 45 and 90 degrees. In various embodiments, a variety of rotational ranges may be accommodated with the present system. In the present embodiment, the outer profile of latch chassis 210 extends a distance 214 (FIG. 5) greater than length of arm 232A. In various embodiments, distance 214 may be equal to or greater than the length of arm 232A.

Referring to FIG. 6, the lower side of arm 232A is flush with, i.e., abuts the upper side of upper extension 220A and upper side of arm 232B is flush with, i.e., abuts the lower side of lower extension 220B. Tabs 252A, 252B of input bracket 250 are also flush with, i.e., abut the lower side of upper extension 220A and the upper side of lower extension 220B, respectively. In this way, extensions 220A, 220B guide the movements of input bracket 250 and outputs 230A, 230B. Further, insert 236A extends into lower end opening 151 within upper vertical rod 150, and insert 236B extends into upper end opening 161 within lower vertical rod 160. Further, axle 240 extends through upper axle aperture 224A and lower axle aperture 224B to rotationally couple arm 232A and arm 232B, as described above.

Upper Latch Assembly

Upper latch assembly 300 will now be explained in greater detail. As shown in FIG. 7, upper latch assembly 300 is operably coupled to upper vertical rod 150 and in selective engagement with strike plate 350 through latch 340 of latch assembly 300. Latch 340 is a rocker in the exemplification shown. Strike plate 350 is coupled to door frame 12 at an upper, downward facing portion of door frame 12 using fasteners (not shown) received through strike plate apertures 352. Strike plate 350 is, in certain exemplifications thereof, positioned in such a way that the coupling between the strike plate 350 and latch 340 in the latched position of latch 340 prevents the door 10 from opening relative to door frame 12. In various embodiments, strike plate 350 is positioned in such a way that the coupling between the strike plate 350 and latch 340 in the latched position of latch 340 creates a seal between door 10 and door frame 12. Strike plate 350 is laterally aligned with upper vertical rod 150 and latch 340. Upper latch assembly 300 includes upper latch cover 302 to conceal the mechanism of upper latch assembly 300. Upper latch cover 302 may be flush with the surface of door 10.

Figure 8:
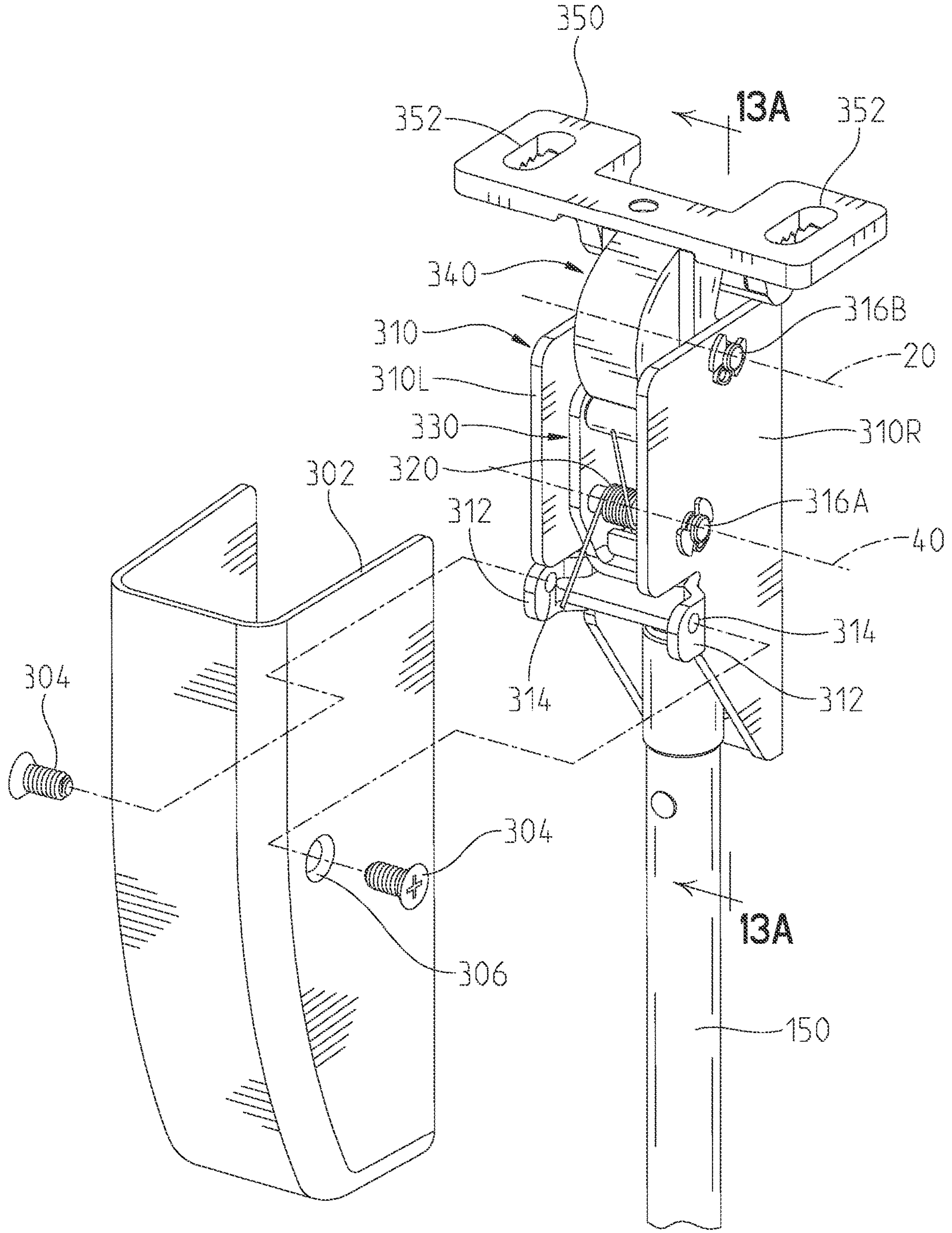
FIG. 8 shows a partially exploded view of the top latch assembly of FIG. 7.
Figure 9:
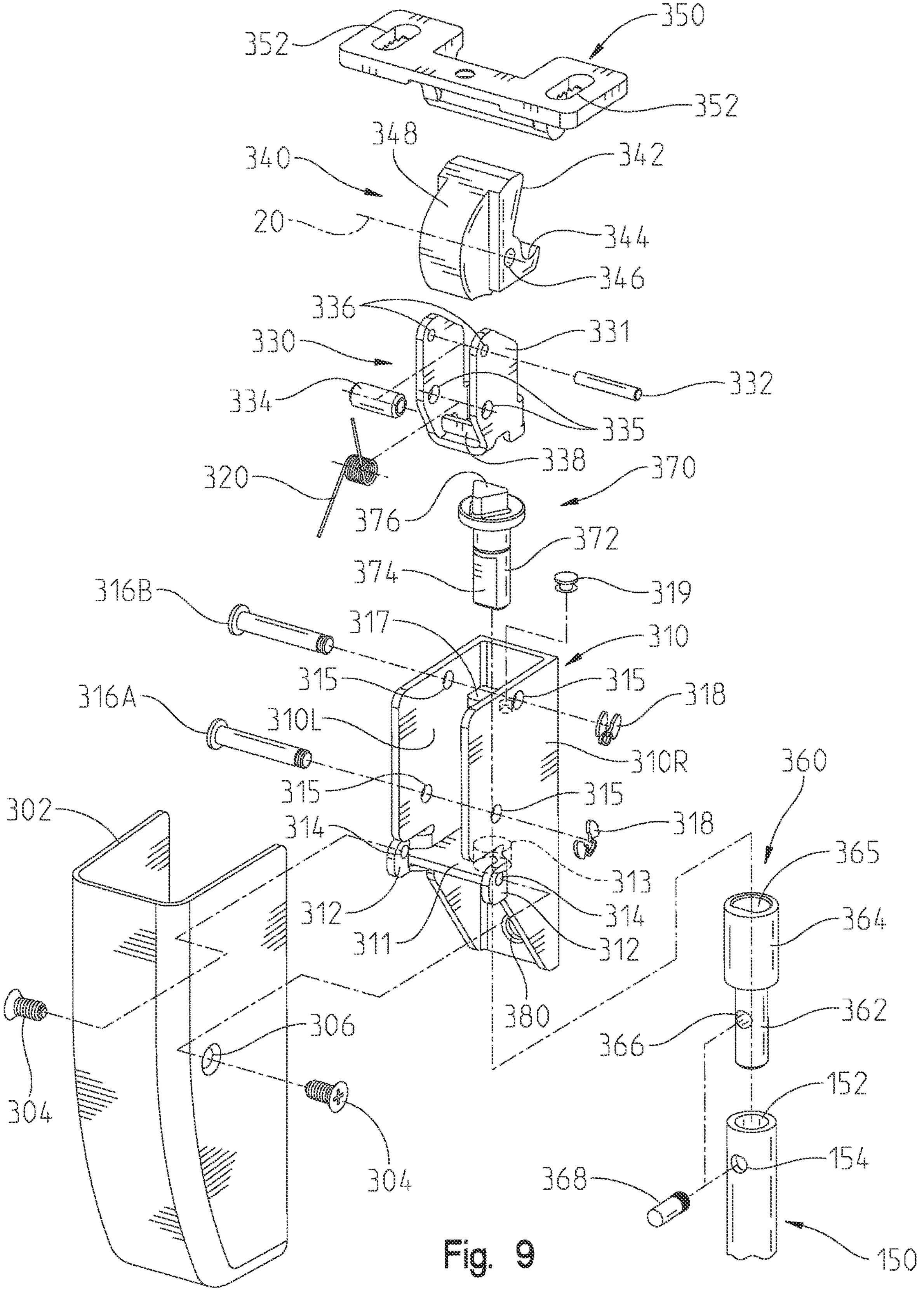
FIG. 9 shows an exploded view of the top latch assembly of FIG. 7.

Referring to FIGS. 8-9, the inner mechanism of upper latch assembly 300 will be described. Upper latch assembly 300 includes upper latch bracket 310 which receives the moveable components of upper latch assembly 300. In the illustrated embodiment, upper latch bracket 310 is a U-shaped bracket. Upper latch bracket 300 includes left wall 310L and right wall 310R. Upper latch bracket 310 also includes bracket extensions 312 which include extension apertures 314 to receive fasteners 304. Upper latch cover 302 includes cover apertures 306 which receive fasteners 304. Fasteners 304 extend through cover apertures 306 and extension apertures 314 to couple upper latch cover 302 to upper latch bracket 310.

Figure 12A:
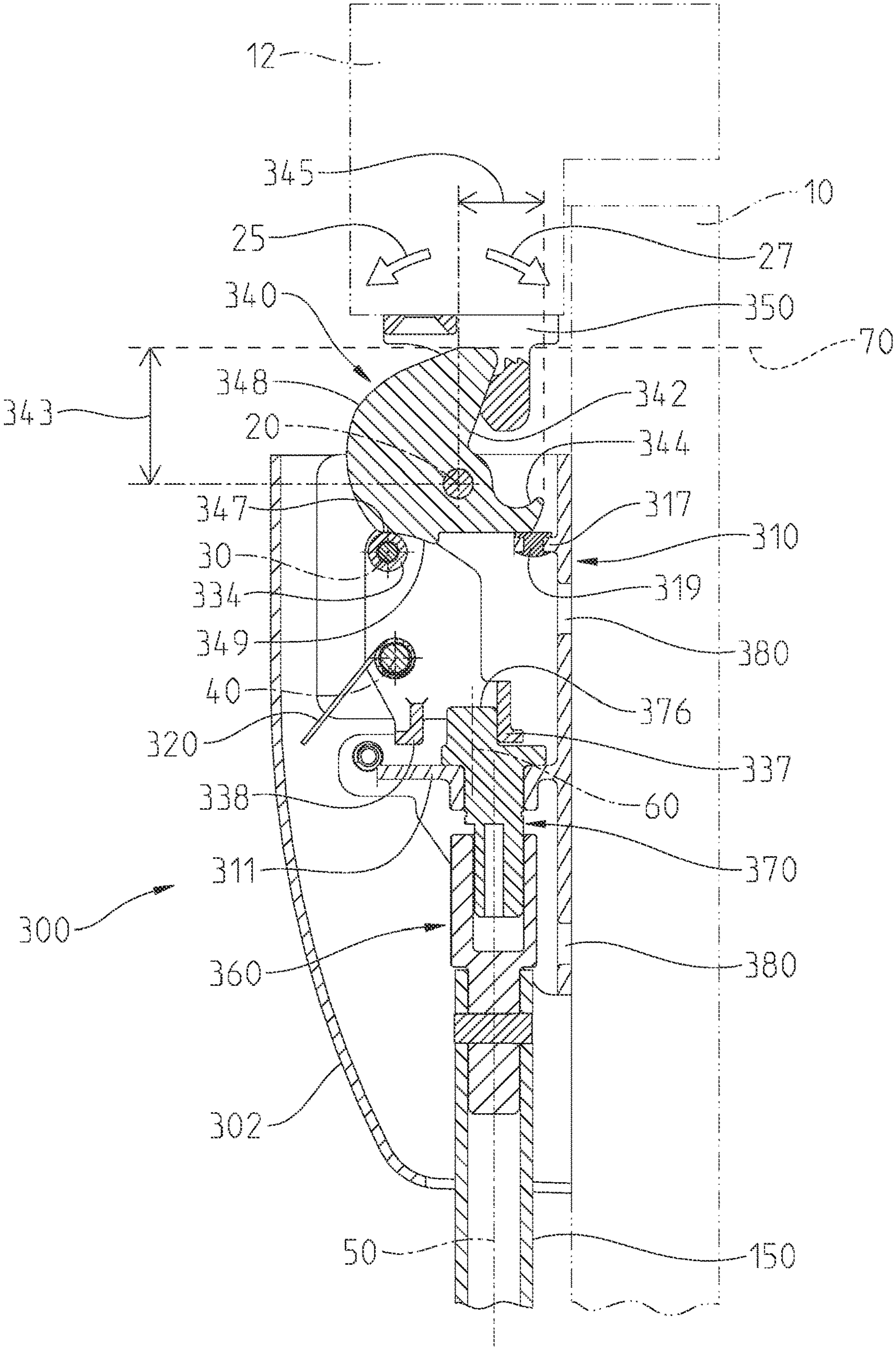
FIG. 12A shows a cross-sectional view of the top latch assembly of FIG. 7, shown in a latched position, taken along line 12A-12A of FIG. 7.

Upper latch bracket 310 further includes bracket apertures 315 (FIG. 9) which receive lower pin 316A and upper pin 316B. Illustratively, pin 316A and pin 316B each have a flanged end and are inserted through bracket apertures 315 and retained on upper latch bracket 310 by retaining clips 318. In various embodiments, pins 316A and 316B may be retained by alternative methods. Further, upper latch bracket includes middle extension 311 and upper extension 317. Upper extension 317 includes an aperture sized to receive and retain button 319, as illustrated in FIG. 12A. Upper latch bracket 310 further includes apertures 380 which receive fasteners (not shown) to mount upper latch assembly 300 to door 10.

Figure 10:
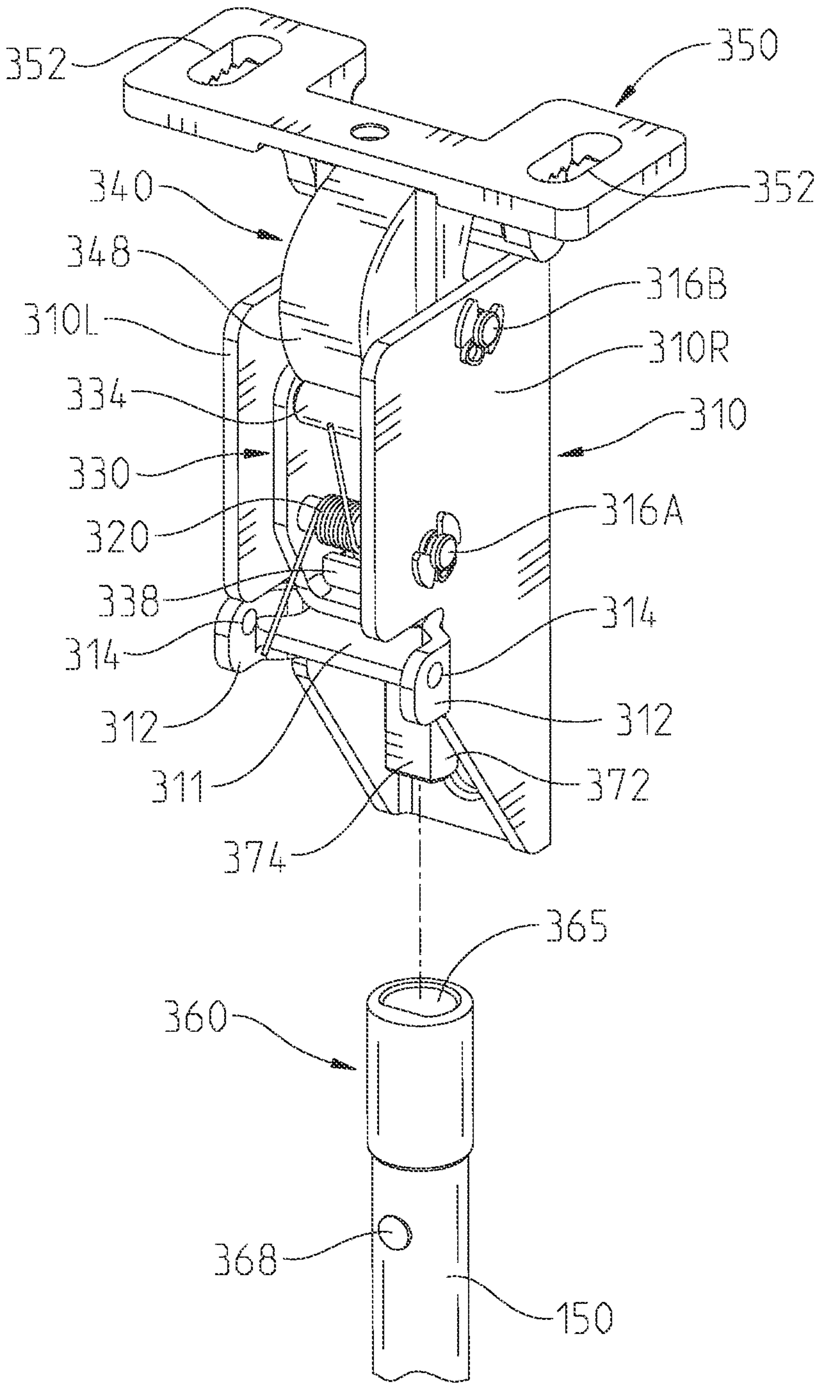
FIG. 10 shows a perspective view of a partial assembly of the top latch assembly of FIG. 1 with an uninstalled upper vertical rod.

As shown in FIGS. 8 and 9, roller assembly 330 includes roller bracket 331. Roller bracket 331 includes roller assembly lower apertures 335 sized to receive lower pin 316A, which pivotably couples roller assembly 330 to upper latch bracket 310. The longitudinal axis of lower pin 316A defines roller assembly rotational axis 40 about which roller assembly 330 pivots. Roller assembly 330 further includes a biasing member in the form of torsion spring 320 positioned about pin 316A between left wall 310L and right wall 310R. Torsion spring 320 includes a first arm bearing against middle extension 311, as shown in FIG. 10, and a second arm bearing against roller 334. Roller assembly 330 includes upper apertures 336 which receive roller shaft 332, on which roller 334 is rotatably retained between left and right walls 310L, 310R of upper latch bracket 310. Roller 334 is rotatable about roller shaft 332, and the longitudinal axis of roller shaft 332 defines roller rotation axis 30 (FIG. 12A), about which roller 334 is rotatable. Roller assembly 330 further includes first vertical extension 337 and second vertical extension 338 which are positioned on the lower portion of the roller bracket 331 (FIG. 12A). Roller assembly 330 is positioned laterally between left wall 310L and right wall 310R.

Figure 11:
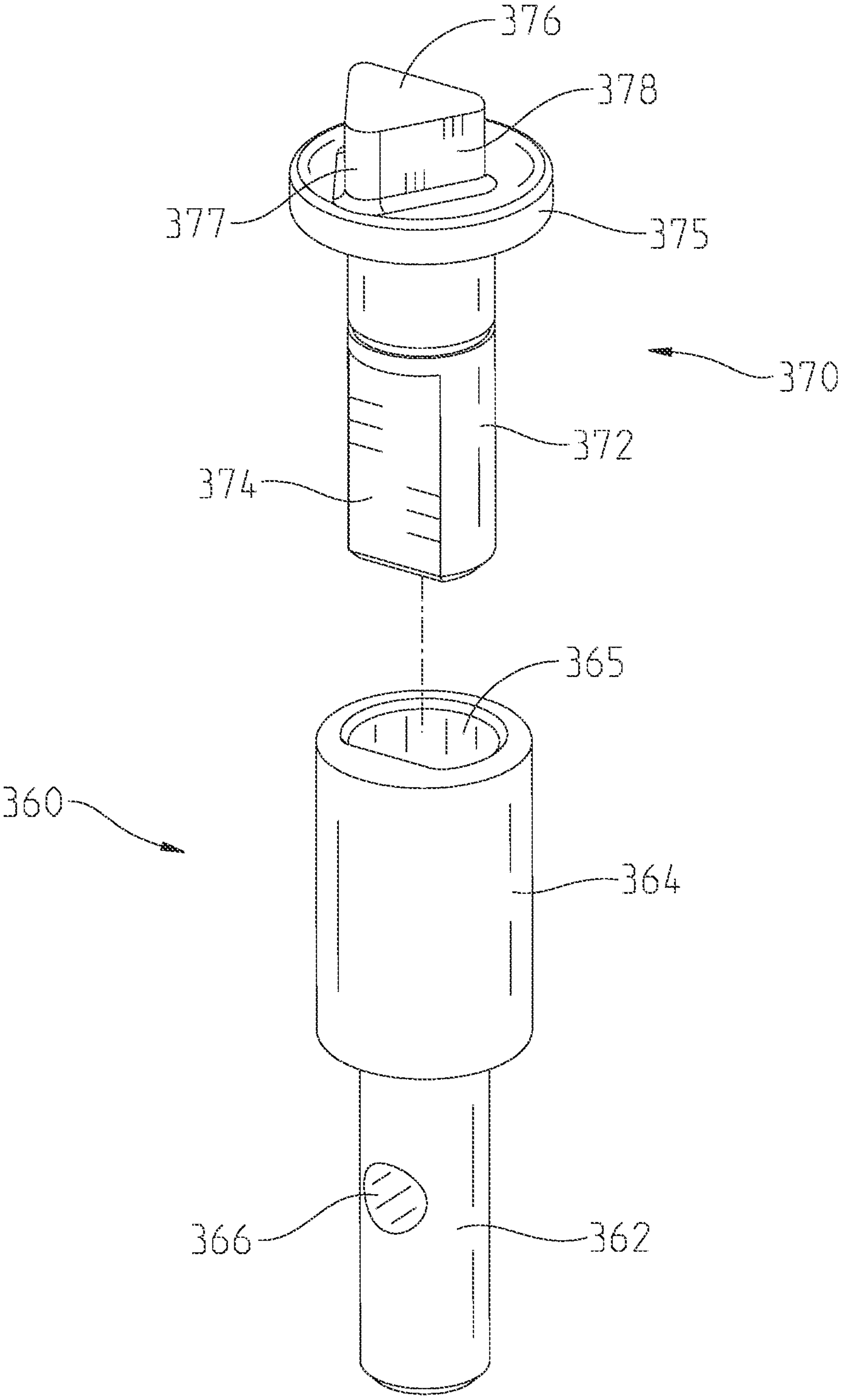
FIG. 11 shows an exploded view of the upper portion of the upper vertical rod of FIG. 10.

Referring to FIGS. 9-11, upper vertical rod 150 is extended by adaptor 360. Adaptor 360 includes lower portion 362 and upper portion 364, and lower portion 362 has receiving aperture 366 configured to receive fastener 368. Further, upper vertical rod 150 has receiving portion 152 configured to receive the lower portion 362 of adapter 360. Illustratively, receiving portion 152 is in the upper extent of the upper vertical rod 150. Further, upper vertical rod has aperture 154 configured to receive fastener 368. Fastener 368 rotationally couples upper vertical rod 150 and adaptor 360 as shown in FIG. 10, so that adaptor 360 rotates as a part of upper vertical rod 150.

Upper latch assembly 300 includes cam stem 370. Cam stem 370 includes lower portion 372, middle portion 375 and cam 376. Upper portion 364 of adapter 360 has an outer profile with the same nominal diameter as upper vertical rod 150. Adaptor 360 includes receiving portion 365 which receives lower portion 372 of cam stem 370. In the present embodiment, lower portion 372 has planar face 374, which creates a D-shaped cross section on lower portion 372. Receiving portion 365 is an elongate aperture formed by a wall having a cross-section shape substantially congruent to D-shaped lower portion 372. Specifically, receiving portion 365 is the same shape as D-shaped lower portion, but is slightly larger to allow axial sliding between cam stem 370 and adapter 360. The substantially congruent cross-sections rotationally lock cam stem 370 to adapter 360. When assembled, adapter 360 and cam stem 370 form a part of upper vertical rod 150. Middle extension 311 includes aperture 313 through which cam stem lower portion 372 can pass to couple with receiving portion 365 (FIG. 10.). When lower portion 372 is inserted into aperture 313, middle portion 375 contacts middle extension 311.

In the present embodiment, cam 376 includes outer extents 377 and planar portions 378. In the present embodiment, cam 376 has three outer extent portions and three planar portions. In an exemplification of the disclosure, cam 376 has a cross-section along its longitudinal axis defining an equilateral triangle having a center (e.g., a circumcenter) on longitudinal axis 60 (FIG. 12A) of cam 376 that is offset from the longitudinal axis 50 about which upper vertical rod 150 rotates. In various embodiments, cam 376 could have various numbers of outer extent portions and planar portions. Illustratively, outer extents 377 and planar portions 378 are in selective contact with first vertical extension 337 and second vertical extension 338.

In the present embodiment, cam stem 370, adaptor 360 and upper vertical rod 150 all rotate about vertical rod rotation axis 50. Cam 376 has centerline 60 which is offset from vertical rod rotation axis 50 (FIG. 12A). As vertical rod 50 rotates, centerline 60 rotates about vertical rod rotation axis 50. Centerline 60 and vertical rod rotation axis 50 are nominally parallel to each other.

Latch 340 will now be described in greater detail. As seen in FIG. 9, latch 340 is C-shaped and includes aperture 346 which receives upper pin 316B. Longitudinal axis of upper pin 316B defines latch rotation axis 20, about which latch 340 rotates from a latched position to an unlatched position, as is further described hereinbelow. In the present embodiment, latch 340 includes latch arm 342, return arm 344, rolling surface 348, and roller depression 349. Referring to FIG. 12A, latch arm 342 has an outer extent at latch arm distance 343 from latch rotation axis 20, and return arm 344 has an outer extent at return arm distance 345 from latch rotation axis 20. In the present embodiment, latch arm distance 343 is greater than return arm distance 345. Latch arm 342 is configured to contact strike plate 350 when door 10 is in the closed and latched position. Alternatively, latch arm 342 may be spaced a small distance, e.g., 8 mm or less from strike plate 350 when door 10 is in the closed and latched position. Whether latch arm 342 contacts strike plate 350 or is spaced a small distance from strike plate 350 in the latched position of upper latch 340, latch arm 342 cooperates with strike plate 350 to secure door 10 in the closed position, i.e., in a position blocking pedestrian egress through door frame 12 in such positions. Latch rotation axis 20 is substantially perpendicular to the vertical rod rotation axis 50.

Upper latch assembly 300 is illustrated in a latched position in FIG. 12A. Illustratively, when upper latch assembly 300 is in the latched position, latch arm 342 is in contact with strike plate 350 or latch arm 342 is positioned very close to (i.e., less than 8 mm from) strike plate 350. Further, upper vertical rod 150 is in a neutral, unrotated position, and cam 376 of cam stem 370 is in a first position in which one of the planar portions 378 is in contact with first vertical extension 337 of roller assembly 330. In the latched position, torsion spring 320 biases first vertical extension 337 to be in contact with planar portion 378. In the latched position, roller 334 contacts roller depression 349. With roller 334 positioned as illustrated in FIG. 12A (with upper latch assembly 300 in the latched position), roller bracket 331 is in a blocking position with roller 334 blocking rotation of latch 340 in direction 25. In certain embodiments, roller rotation axis 30 and roller assembly rotational axis 40 are positioned such that a counterclockwise (from the perspective of FIG. 12A) torque applied to latch 340 would yield a clockwise (again, from the perspective of FIG. 12A) torque applied to roller bracket 331, which would be blocked by cam 376. In any event, axes 30, 40 are positioned such that a counterclockwise (from the perspective of FIG. 12A) torque applied to latch 340 in the position shown in FIG. 12A will not rotate roller bracket 331 such that roller 334 no longer engages roller depression 349. Therefore, latch 340 may not rotate in direction 25 and remains in contact with strike plate 350 or spaced a predetermined distance therefrom.

As illustrated in FIG. 12A, latch arm 342 of latch 340 has an upper extent at vertical location 70. Further, return arm 344 of latch 340 is in contact with button 319 on upper extension 317, which restricts rotation in rotational direction 27. Button 319 is made of a more resilient material than upper extension 317 and thereby provides a shock absorption when latch 340 is moved from the unlatched position to the latched position, as further described below.

Figure 12B:
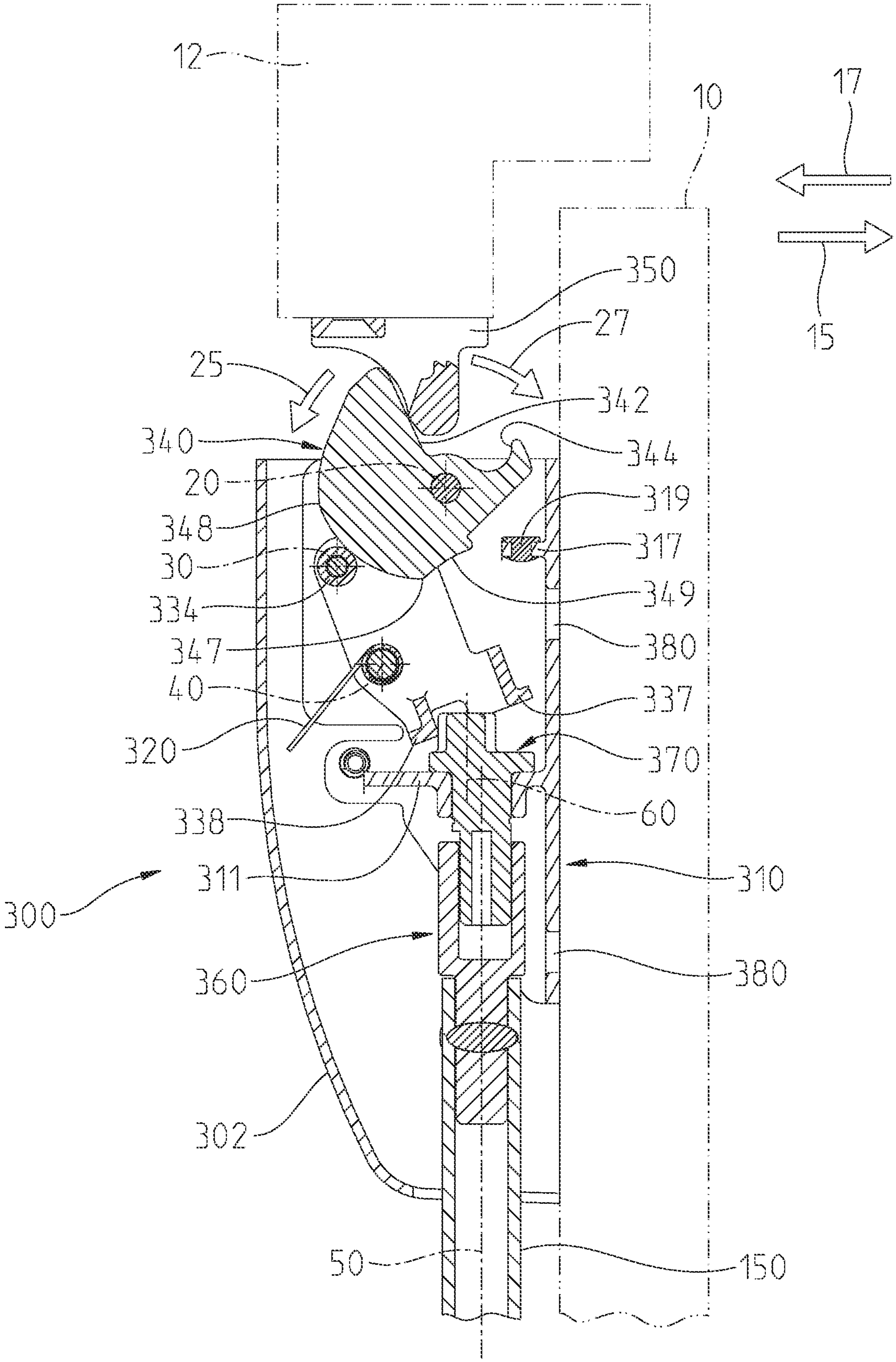
FIG. 12B shows a cross-sectional view of the top latch assembly similar to that of FIG. 12A, shown in a partially latched position.
Figure 12C:
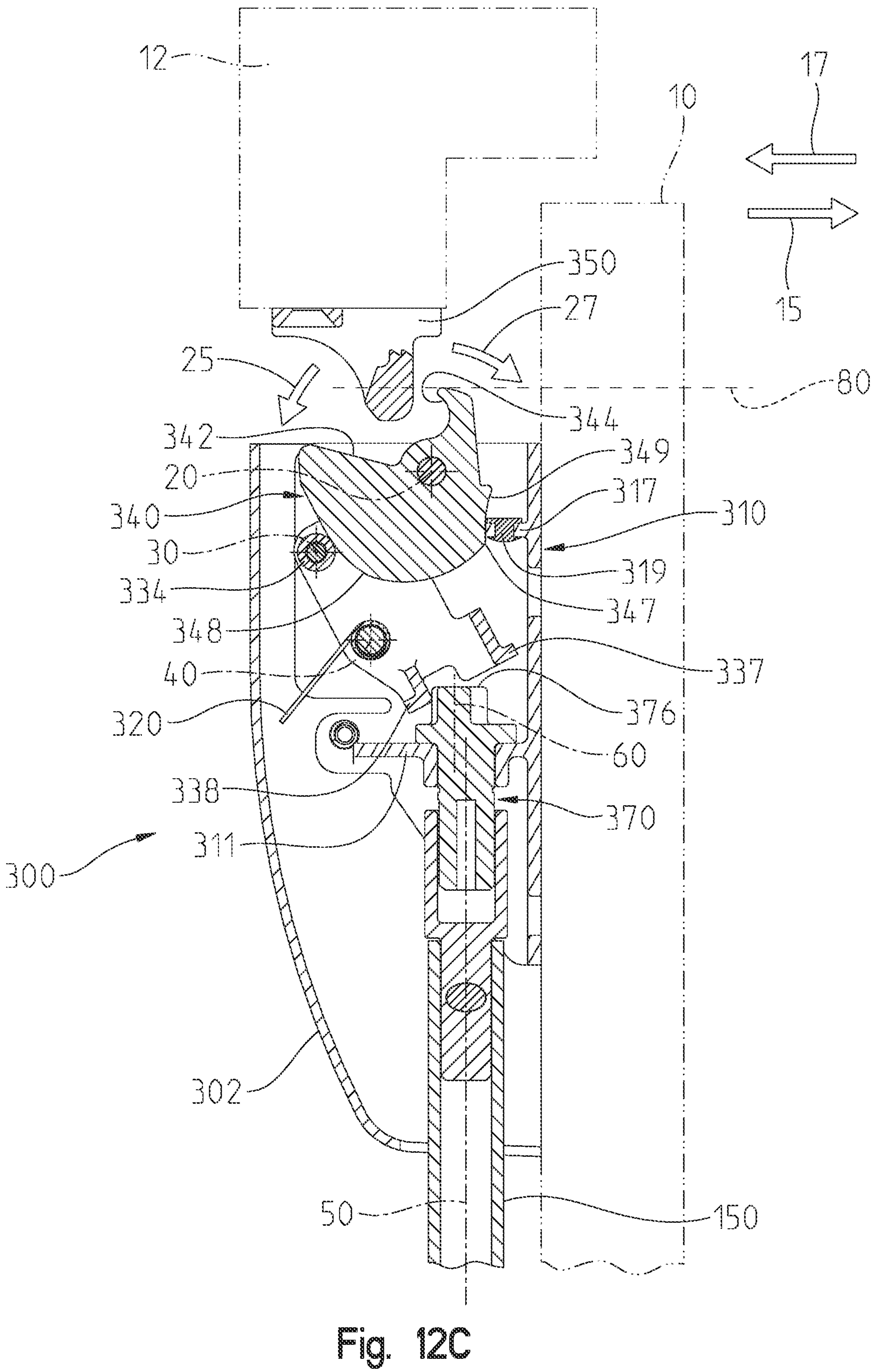
FIG. 12C shows a cross-sectional view of the top latch assembly similar to that of FIG. 12A, shown in an unlatched position.

In FIG. 12B, an intermediate, or partially latched position of upper latch mechanism 300 is shown between the latched position as shown in FIG. 12A and the unlatched position as shown in FIG. 12C. Upper vertical rod 150 is partially rotated in response to a partial user input to input device 110. In response to the user input, adaptor 360 and cam stem 370 are partially rotated. At least one of planar portions 378 rotates out of contact with first vertical extension 337 and at least one of outer extents 377 comes into contact with first vertical extension 337. The biasing force of torsion spring 320 is overcome and movement of first vertical extension 337 rotates roller assembly 330, which in turn allows roller 334 to roll over protrusion 347 (which may, in certain embodiments, simply be a point of inflection between concave depression 349 and convex rolling surface 348) and come into contact with the rolling surface 348 of latch 340. Further, as door 10 moves in the opening direction 15, strike plate 350 exerts a force on latch arm 352 and pushes latch 340 in rotational direction 25. In this way, latch 340 is allowed to rotate with respect to strike plate 350 in rotational direction 25.

FIG. 12C illustrates an unlatched position of upper latch mechanism 300. Upper vertical rod 150 is fully rotated in response to a full user input which rotates adaptor 360 and cam stem 370 through their full rotational travel. As latch 340 rotates further in rotational direction 25, roller 334 rotates further along rolling surface 348, and roller assembly 330 rotates, and second vertical extension 338 contacts cam 376 of cam stem 370. More specifically, roller assembly 330 is unable to rotate further in direction 25 once second vertical extension 338 comes into contact with cam 376 and therefore roller assembly 330 is rotationally restricted between the latched position as shown in FIG. 12A and the unlatched position as shown in FIG. 12C. As illustrated in FIG. 12C, return arm 344 of latch 340 has an upper extent at vertical location 80. Vertical location 80 is vertically lower than vertical location 70.

When latch 340 is in the unlatched position, roller assembly 330 retains cam stem 370 in the fully rotated position as shown in FIG. 12C. Specifically, the biasing force of torsion spring 320 applies a clockwise (from the perspective of FIG. 12C) torque to roller assembly 330, which in turn applies a counterclockwise (from the perspective of FIG. 12C) torque to latch 340, forcing it against upper extension 317. In the present embodiment, when exit device assembly 100 is in an unlatched configuration, it will remain in the unlatched configuration until a force is exerted on return arm 344 in rotational direction 27 to overcome the biasing force of torsion spring 320, as described below.

FIGS. 12A-C illustrate the process of the upper latch mechanism 300 transitioning from the latched position (FIG. 12A) into the unlatched position (FIG. 12C). The process works in reverse to transition the upper latch mechanism 300 from the unlatched position into the latched position. Illustratively, as door moves in closing direction 17, strike plate comes into contact with return arm 344 of latch 340, exerting a force on return arm 344 of latch 340 causing latch 340 to rotate in rotational direction 27. As latch 340 rotates in rotational direction 27, roller assembly 330 is allowed to rotate back to a neutral position as shown in FIG. 12A, assisted by the torsion spring 320. Illustratively, roller 334 rotates over protrusion 347 back into engagement with roller depression 349. Subsequently, cam stem 370 is allowed to rotate back to a neutral position (in which it is biased by input device 110) as shown in FIG. 12A where at least one of planar portions 378 is in contact with first vertical extensions 337.

Figure 13A:
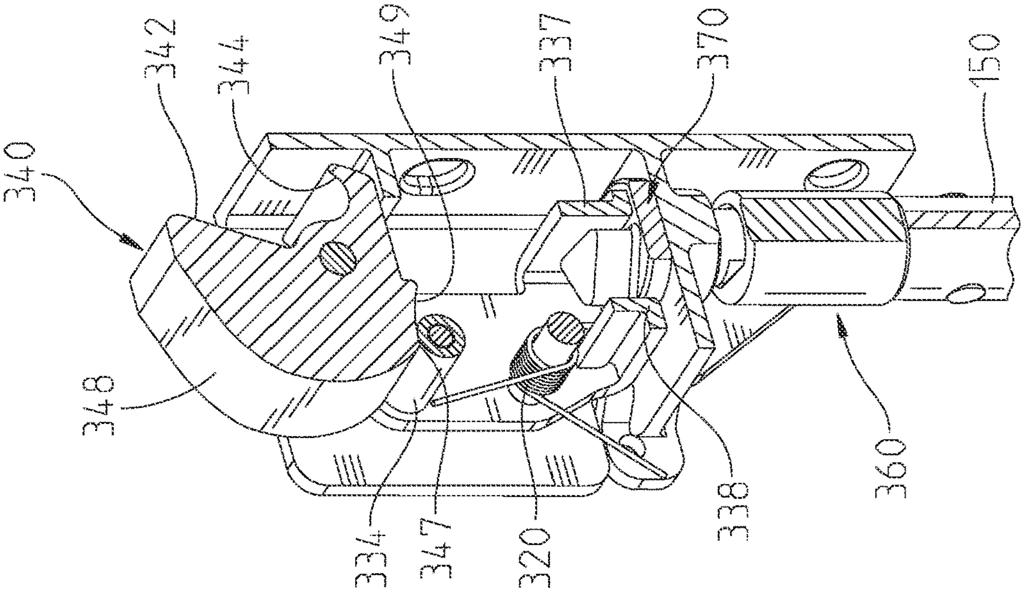
FIG. 13A shows a perspective, cross-sectional view of the top latch assembly of FIG. 7, shown in a latched position, taken along line 13A-13A of FIG. 8.
Figure 13B:
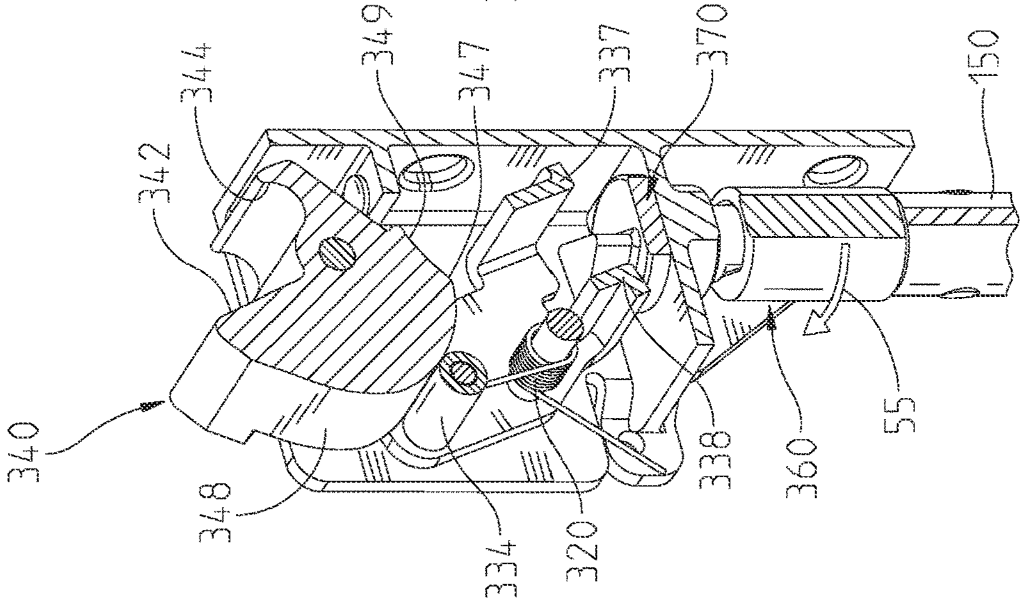
FIG. 13B shows a perspective, cross-sectional view of the top latch assembly similar to that of FIG. 13A, shown in a partially latched position.
Figure 13C:
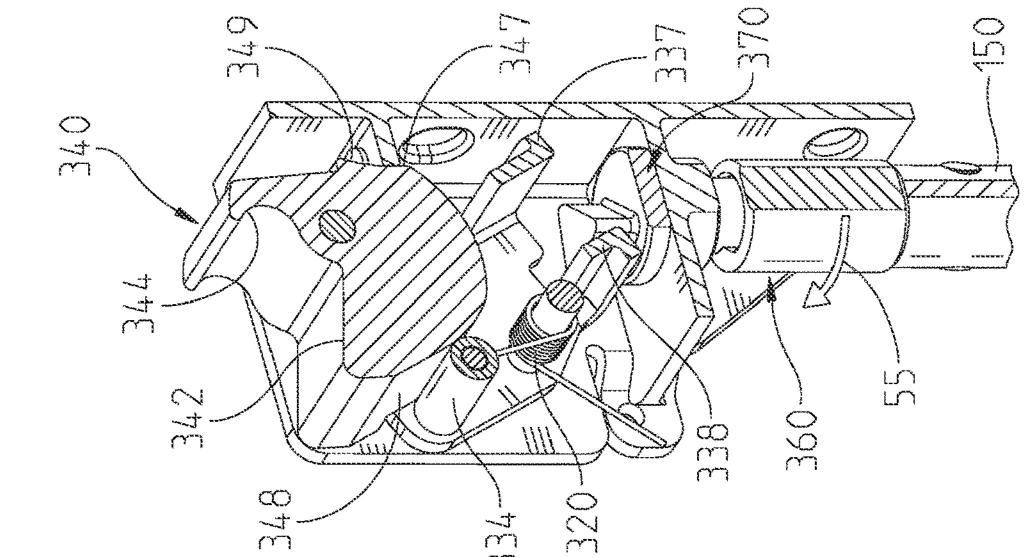
FIG. 13C shows a perspective, cross-sectional view of the top latch assembly similar to that of FIG. 13A, shown in an unlatched position.

FIG. 13A shows another view of the latched configuration illustrated in FIG. 12A, FIG. 13B shows another view of the partially latched configuration illustrated in FIG. 12B, and FIG. 13C shows another view of the unlatched configuration of FIG. 12C. As illustrated in FIG. 13A, one of the planar portions 378 of the cam 376 is in contact with first vertical extension 337. As cam stem 370 rotates in rotational direction 55 (FIG. 13B), outer extent 377 of cam stem 376 exerts a force on first vertical extension 337 rotating roller assembly 330 in rotational direction 25 (FIG. 12C). Cam 376 may be in a variety of shapes or configurations. In an exemplary embodiment, cam 376 has a triangular profile. It is contemplated that cam 376 could have any suitable profile with a plurality of outer extents and a plurality of planar portions.

Referring to FIGS. 22-30 another exemplary upper latch assembly 500 is illustrated. Upper latch assembly 500 interfaces with adaptor 360 to couple upper latch assembly 500 to upper vertical rod 150. Like upper latch assembly 300, upper latch assembly 500 receives a rotation input of upper vertical rod 150 to control the operation of upper latch assembly 500. Upper latch assembly 500 is operably coupled to upper vertical rod 150 and in selective engagement with strike plate 350 through a latch 540 of upper latch assembly 500.

Latch 540 is a rocker in the exemplification shown. Strike plate 350 is coupled to door frame 12 at an upper, downward facing portion of door frame 12 using fasteners (not shown) received through strike plate apertures 352. Strike plate 350 is, in certain exemplifications thereof, positioned in such a way that the coupling between the strike plate 350 and latch 540 in the latched position of latch 540 prevents the door 10 from opening relative to door frame 12. In various embodiments, strike plate 350 is positioned in such a way that the coupling between the strike plate 350 and latch 540 in the latched position of latch 540 creates a seal between door 10 and door frame 12. Upper latch assembly 500 includes upper latch cover (not shown), similar to cover 302 to conceal the mechanism of upper latch assembly 500.

Figure 23:
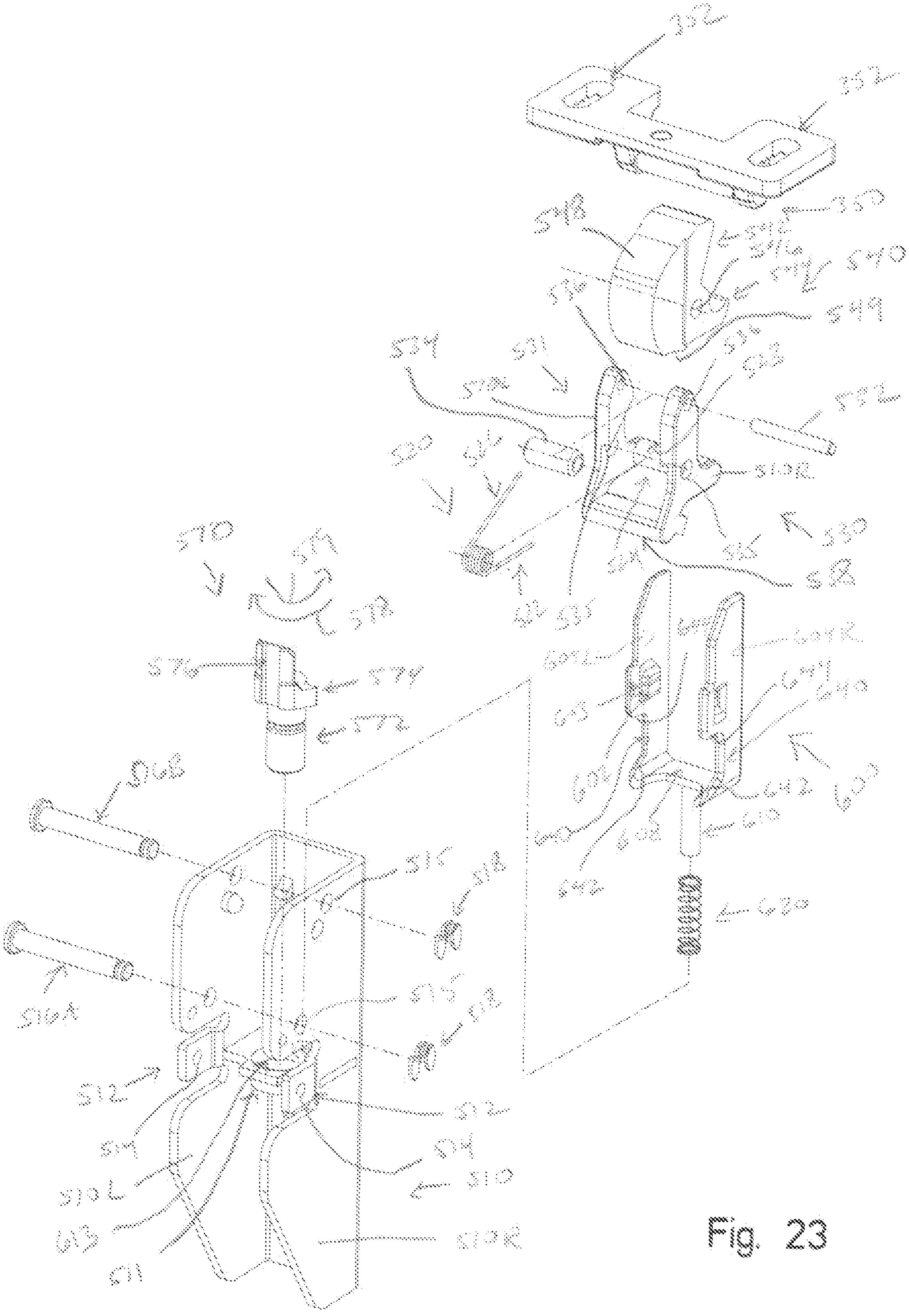
FIG. 23 shows an exploded view of the top latch assembly of FIG. 22.

Referring to FIG. 23, the components of upper latch assembly 500 will be described. Upper latch assembly 500 includes an upper latch bracket 510 which receives the moveable components of upper latch assembly 500. In the illustrated embodiment, upper latch bracket 510 is a U-shaped bracket. Upper latch bracket 500 includes left wall 510L and right wall 510R. Upper latch bracket 510 also includes bracket extensions 512 which include extension apertures 514 to receive fasteners (not shown) which couple the upper latch cover (not shown) to upper latch bracket 510.

Upper latch bracket 510 further includes bracket apertures 515 which receive lower pin 516A and upper pin 516B. Illustratively, pin 516A and pin 516B each have a flanged end and are inserted through bracket apertures 515 and retained on upper latch bracket 510 by retaining clips 518. In various embodiments, pins 516A and 516B may be retained by alternative methods. Further, upper latch bracket includes an extension 511 which as explained in more detail herein supports cam stem 570. Upper latch bracket 510 further includes apertures 580 (see FIG. 24) which receive fasteners (not shown) to mount upper latch assembly 500 to door 10.

Figure 24:
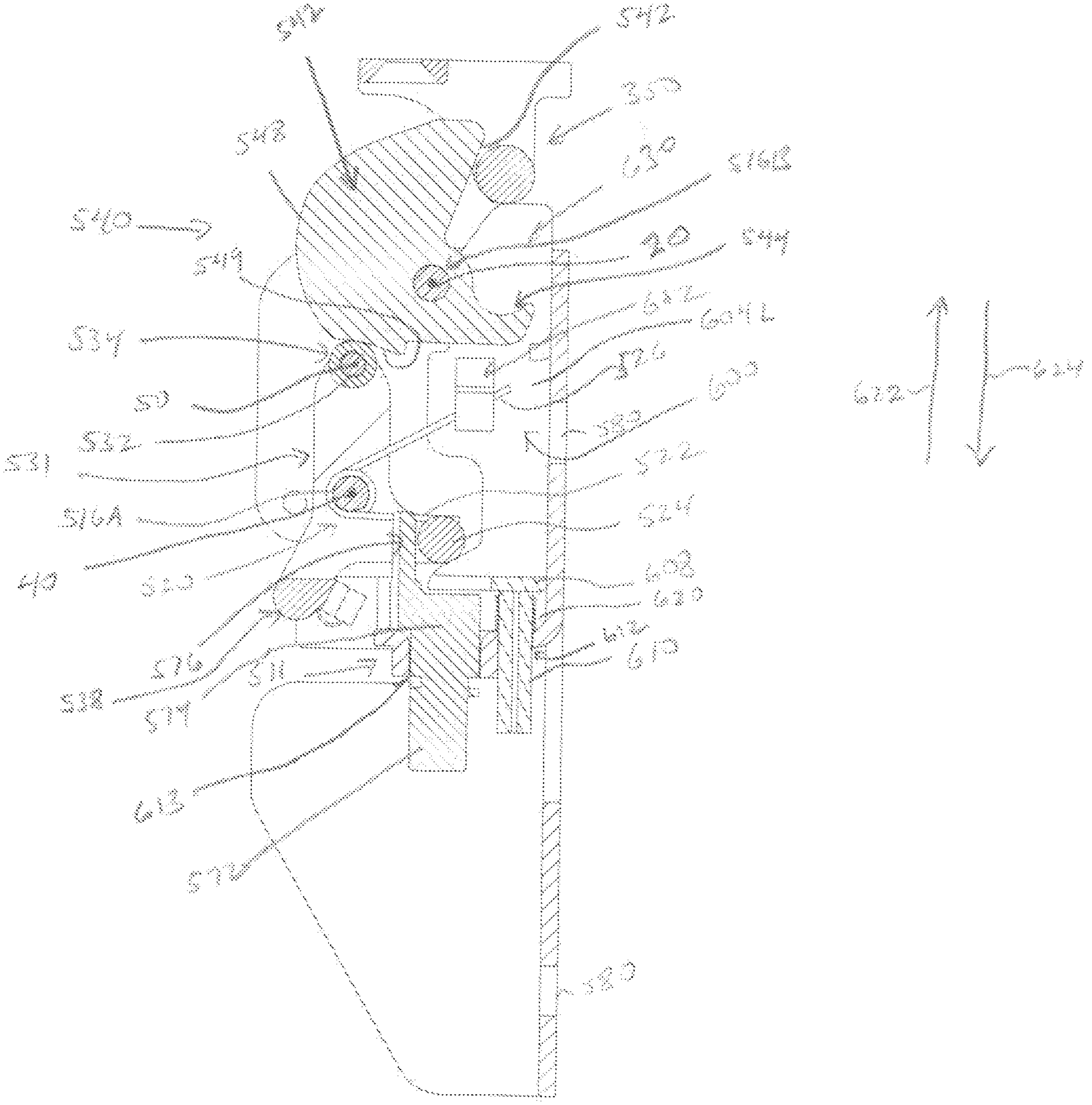
FIG. 24 shows a cross-sectional view of the top latch assembly of FIG. 22, shown in a latched position, taken along line 24-24 of FIG. 22.

Upper latch assembly 500 further includes a roller assembly 530 and an auxiliary bolt 600. Roller assembly 530 includes a roller bracket 531 having roller assembly lower apertures 535 sized to receive lower pin 516A, which pivotably couples roller assembly 530 to upper latch bracket 510. The longitudinal axis of lower pin 516A defines roller assembly rotational axis 40 (see FIG. 24) about which roller assembly 530 pivots. Roller assembly 530 further includes a biasing member in the form of torsion spring 520 positioned about pin 516A between left wall 510L and right wall 510R. Referring to FIGS. 23 and 24, torsion spring 520 includes a first arm 522 bearing against a cross member 524 of roller assembly 530, optionally received in notch 523 of cross member 524, and a second arm 526 received in an opening 603 provided between a left wall 604L of auxiliary bolt 600 and a hump 602 of auxiliary bolt 600. As shown in FIG. 23, auxiliary bolt 600 includes a right upstanding wall 604R and a left upstanding wall 604L and a lower connecting wall 608. A pin 610 extends down from lower connecting wall 608.

Referring to FIG. 24, pin 610 is received in an opening 612 of extension 511. A biasing member, illustratively a compression spring 620, is positioned about pin 610 and between an upper surface of extension 511 and a lower surface of lower connecting wall 608. Compression spring 620 biases auxiliary bolt 600 upward in direction 622. As explained in more detail herein, in FIG. 24, a top portion 630 of auxiliary bolt 600 is contacting strike plate 350 which moves auxiliary bolt 600 downward in direction 624 against the bias of compression spring 620.

Returning to FIG. 23, roller assembly 530 includes upper apertures 536 which receive a roller shaft 532, on which a roller 534 is rotatably retained between left and right walls 510L, 510R of roller bracket 531. Roller 534 is rotatable about roller shaft 532, and the longitudinal axis of roller shaft 532 defines roller rotation axis 50 (see FIG. 24), about which roller 534 is rotatable. Roller assembly 530 further includes a cross member 538 having a rear surface 539 which interacts with cam 576 (see FIG. 26) as described in more detail herein.

Returning to FIG. 23, upper latch assembly 500 includes cam stem 570. Cam stem 570 includes lower portion 572, middle portion 575 and cam 576. Cam stem 570 is coupled to adaptor 360 to couple vertical rod 150 to cam stem 570. Cam 576 of cam stem 570 rotates in directions 578, 579 in response to a corresponding rotation of upper vertical rod 150.

Lower portion 572 of cam stem 570 is received in a second opening 613 in extension 511 and extends below extension 511 to couple to adaptor 360. Middle portion 574 of cam stem 570 rests on an upper surface of extension 511.

Latch 540 will now be described in greater detail. As shown in FIG. 23, latch 540 is generally C-shaped and includes aperture 546 which receives upper pin 516B. Longitudinal axis of upper pin 516B defines latch rotation axis 20, about which latch 540 rotates from a latched position to an unlatched position, as is further described hereinbelow. In the present embodiment, latch 540 includes latch arm 542, return arm 544, rolling surface 548, and roller depression 549. Latch arm 542 is configured to contact strike plate 350 when door 10 is in the closed and latched position. Alternatively, latch arm 542 may be spaced a small distance, e.g., 8 mm or less from strike plate 350 when door 10 is in the closed and latched position. Whether latch arm 542 contacts strike plate 350 or is spaced a small distance from strike plate 350 in the latched position of upper latch 540, latch arm 542 cooperates with strike plate 350 to secure door 10 in the closed position, i.e., in a position blocking pedestrian egress through door frame 12 in such positions. Latch rotation axis 20 is substantially perpendicular to the vertical rod rotation axis 50.

Upper latch assembly 500 is illustrated in a latched position in FIG. 24. Illustratively, when upper latch assembly 500 is in the latched position, latch arm 542 is in contact with strike plate 350 or latch arm 542 is positioned very close to (i.e., less than 8 mm from) strike plate 350. Further, upper vertical rod 150 is in a neutral, unrotated position, and cam 576 of cam stem 570 is in a first position in which of p576 is flush with cross member 524 of roller bracket 531. Further, auxiliary bolt 600 is moved downward in direction 624 against the bias of compression spring 620. This downward movement lowers second arm 526 of torsion spring 520 and energizes torsion spring 520 which in turn presses down on first arm 522 and cross member 524 of roller bracket 531. This causes a rotation of roller bracket 531 about roller assembly rotational axis 40 and roller 534 being positioned in roller depression 549 of latch 540. Further, as shown in FIG. 24, cross member 524 is positioned in a recess 640 of auxiliary bolt 600 proximate a lower surface 642 of recess 640 and distal from an upper surface 644 of recess 640.

Figure 25:
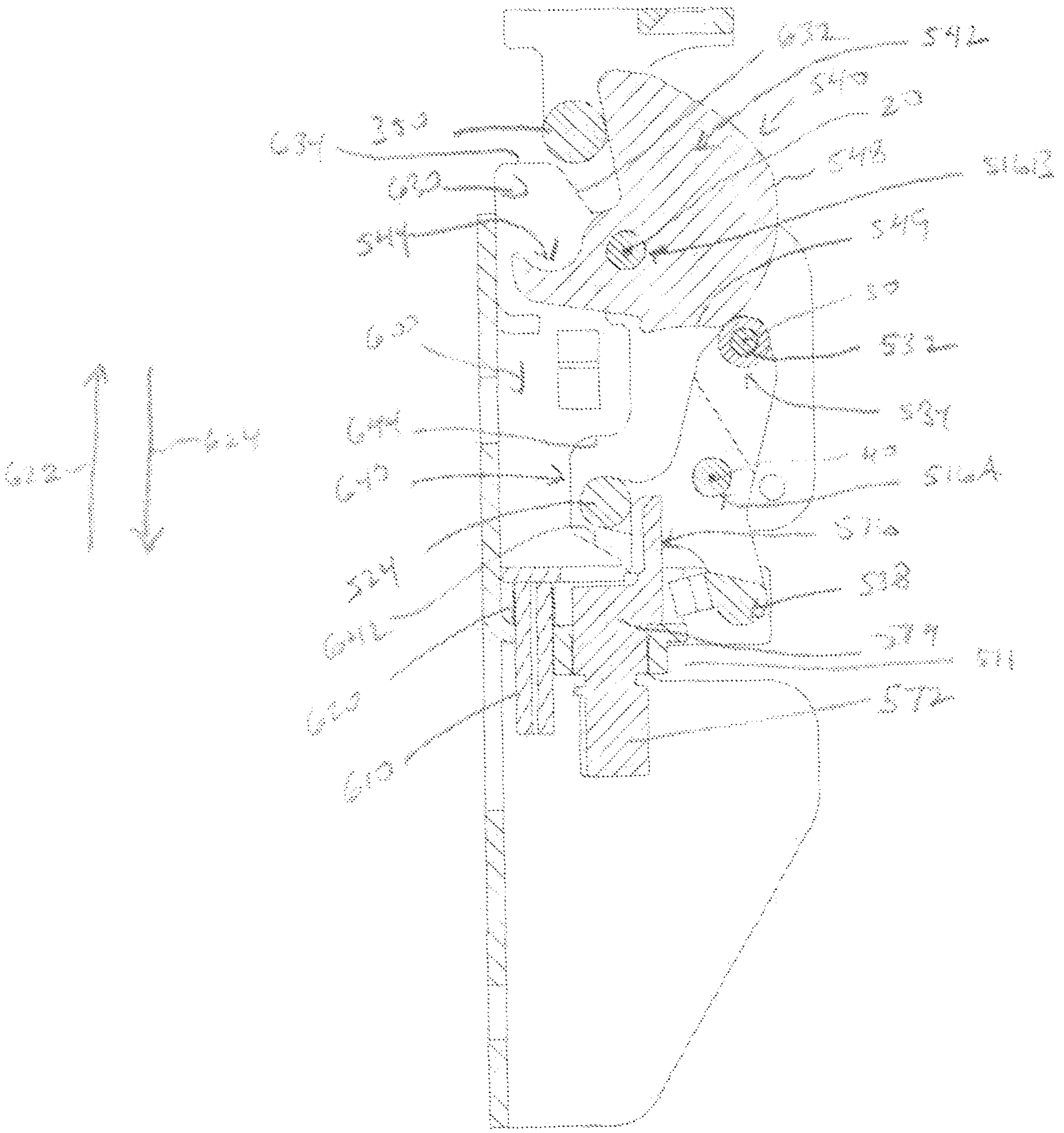
FIG. 25 shows a cross-sectional view of the top latch assembly of FIG. 22 shown in a partially unlatched position due to actuation of an input device of the exit device assembly of FIG. 1 taken along line 25-30-25-30 of FIG. 22.

Referring to FIG. 25, input 112 of input device 110 has been depressed resulting in a rotation of upper vertical rod 150. The rotation of upper vertical rod 150 causes a corresponding rotation of cam 576. The rotation of cam 576 causes one of the side portions of cam 576 to contact cross member 524 which in turn raises cross member 524 in recess 640 and causes roller bracket 531 to rotate about roller assembly rotational axis 40. The rotation about roller assembly rotational axis 40 results in roller 534 being moved out of roller depression 549 of latch 540. This movement of roller 534 allows latch 540 to rotate about latch rotation axis 20 and latch arm 542 to rotate downward and door 10 to begin to open. As door 10 is opened top portion 630 of auxiliary bolt 600 moves out of contact with strike plate 350 and p600 moves upward in direction 622.

Figure 26:
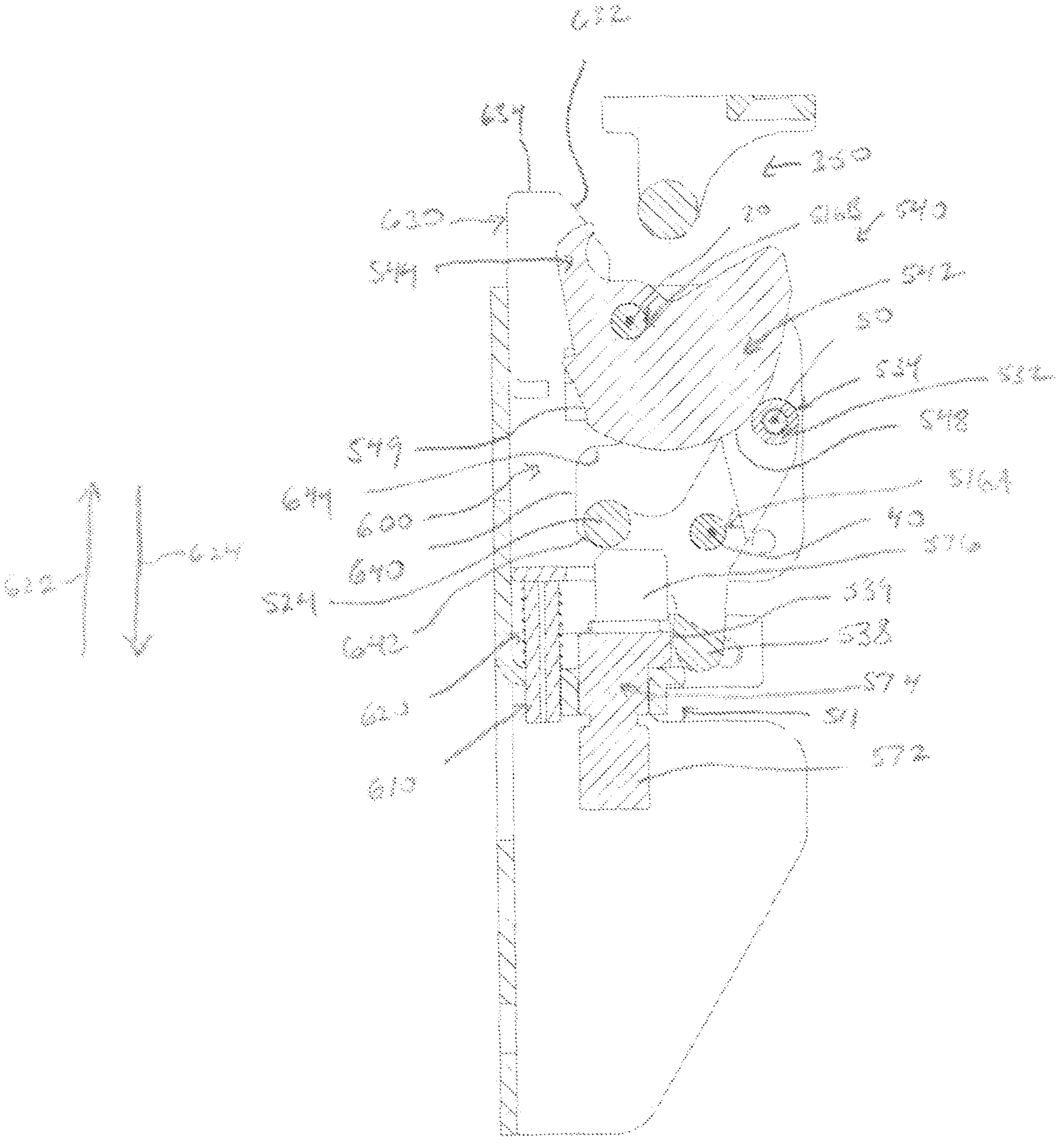
FIG. 26 shows the cross-sectional view of FIG. 25 with the top latch assembly of FIG. 22 shown in an unlatched position.
Figure 27:
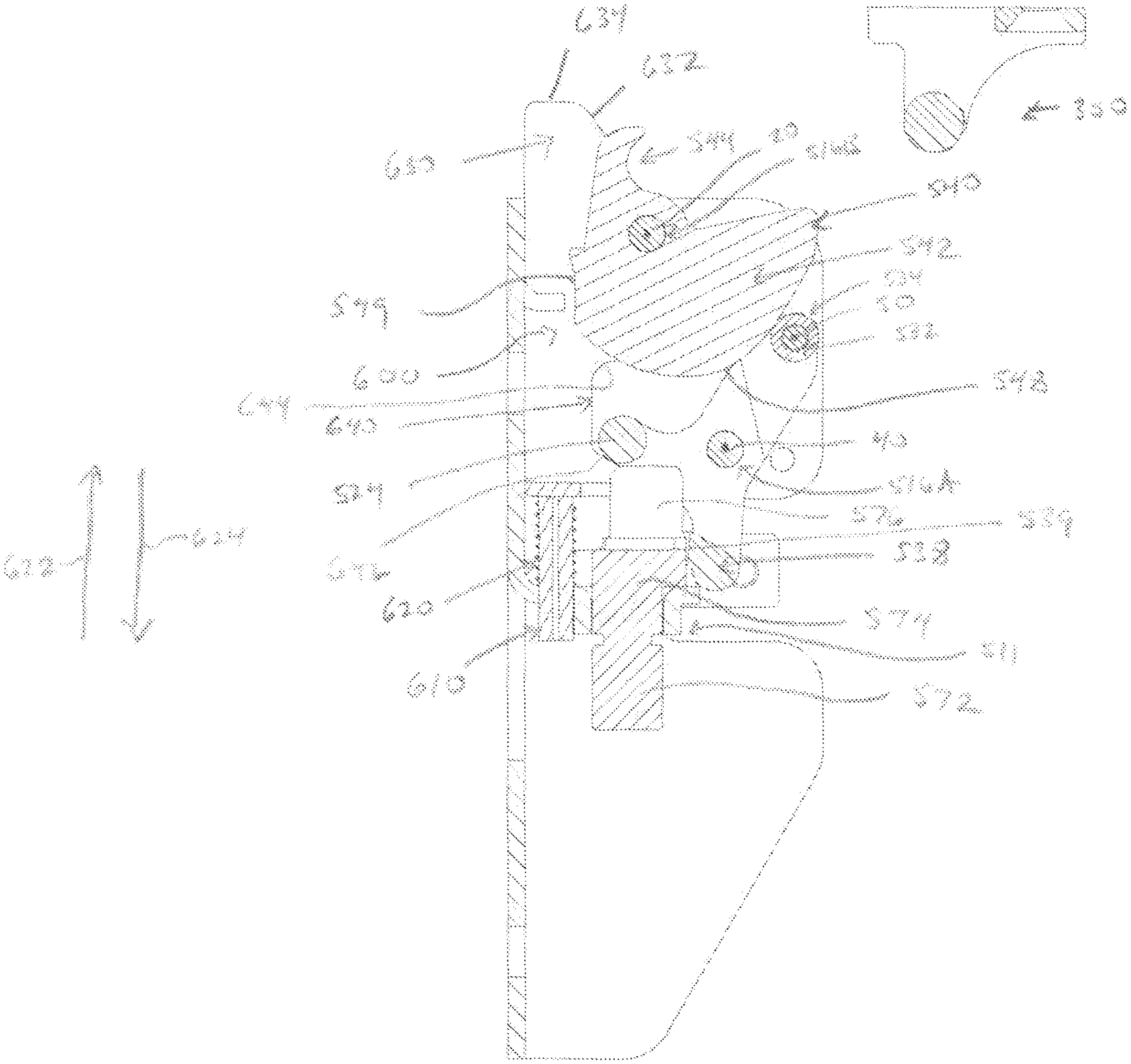
FIG. 27 shows the cross-sectional view of FIG. 26 with the door pushed open relative to a strike of a door frame.

Referring to FIG. 26, the upward movement of auxiliary bolt 600 also causes lower surface 642 of recess 640 to contact cross member 524 and further raise cross member 524 and rotate roller bracket 531 about roller assembly rotational axis 40. This further rotation of roller bracket 531 results in latch arm 542 of latch 540 to further rotate downward about latch rotation axis 20. As shown in FIG. 26, the rotation of roller bracket 531 about roller assembly rotational axis 40 is limited by the contact of latch arm 542 with cam 576. This in turn limits the upper movement of auxiliary bolt 600 due to contact between lower surface 642 of recess 640 and cross member 524. Further, roller 534 limits the rotation of latch 540. It should be noted that FIG. 25 shows an initial part of a rotation of upper vertical rod 150 and FIG. 26 shows a complete rotation of upper vertical rod 150 corresponding to a depression of input 112 of input device 110. In embodiments, a rotation of cam 576 from the home position of FIG. 24 to the position of FIG. 26 is between 53° to 60°. Referring to FIG. 27, door 10 is opened relative to door frame 12. While roller bracket 531 is in the position shown in FIG. 27, cam 576 is prevented from rotating back to the home position of FIG. 24 due to auxiliary bolt 600 maintaining the position of roller bracket 531. This maintains upper vertical rod 150 is the rotated position which also maintains lower vertical rod 160 in the rotated position and latch 435 of lower latch assembly 400 in the raised position.

Figure 28:
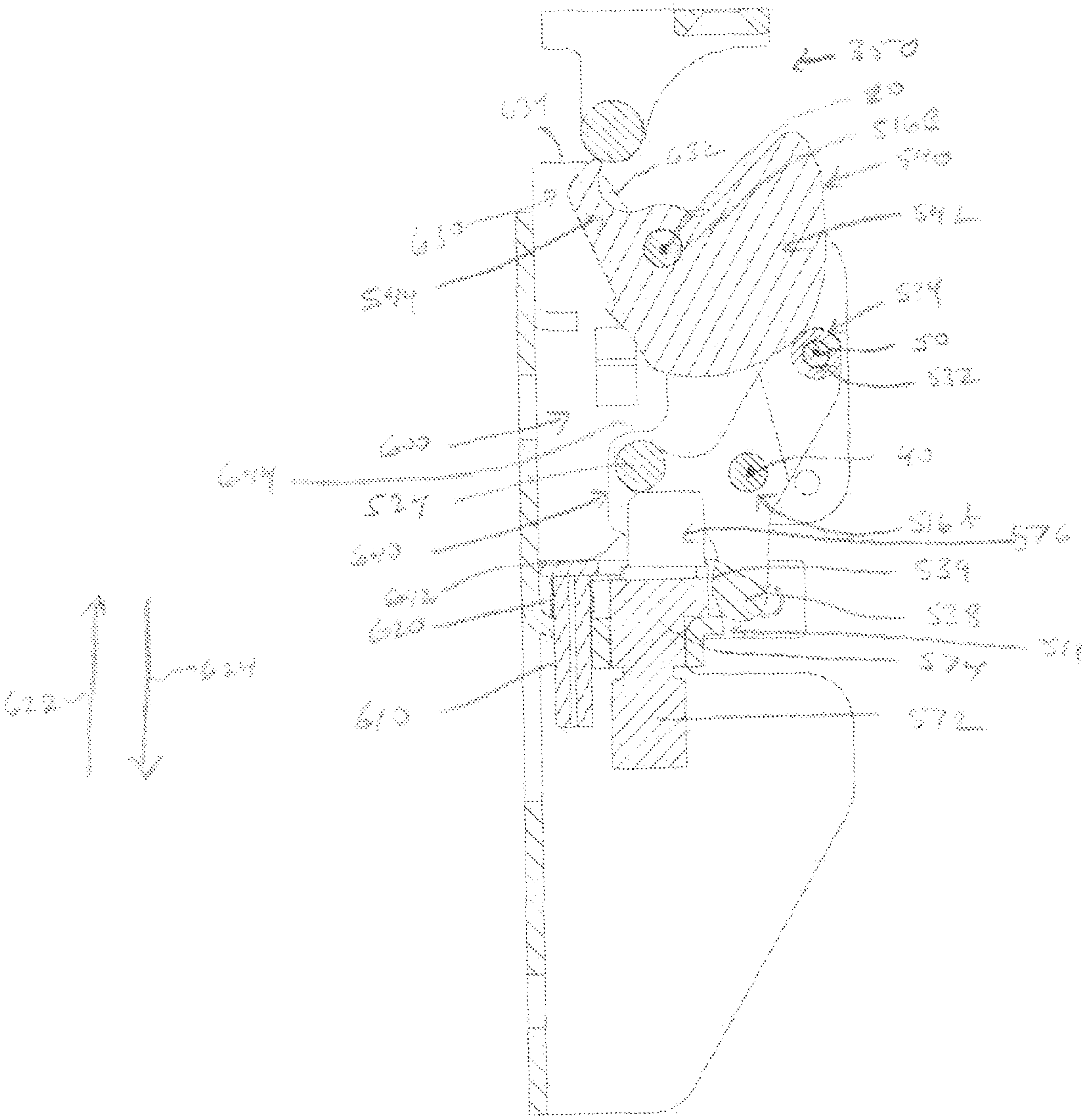
FIG. 28 shows the cross-sectional view of FIG. 27 with the door returning to the closed position relative to the strike of the door frame.

Referring to FIG. 28, door 10 is closing relative to door frame 12 and upper latch assembly 500 is returning to the latched position of FIG. 24. Strike 350 contacts a cam surface 632 of top portion 630 of auxiliary bolt 600 thereby pushing auxiliary bolt 600 in direction 624 against the bias of compression spring 620 until strike plate 350 contacts top surface 634 of top portion 630 of auxiliary bolt 600. Generally, at the same time, strike plate 350 contacts return arm 544 of latch 540 causing a rotation of latch 540 about latch rotation axis 20 to raise latch arm 542 of latch 540. The lowering of auxiliary bolt 600 in direction 624 energizes torsion spring 520 which through first arm 522 moves cross member 524 downward and roller bracket 531 to rotate about roller assembly rotational axis 40. This rotation causes cross member 538 to move away from cam 576 thereby allowing cam 576 to rotate back to the home position of FIG. 24.

Figure 29:
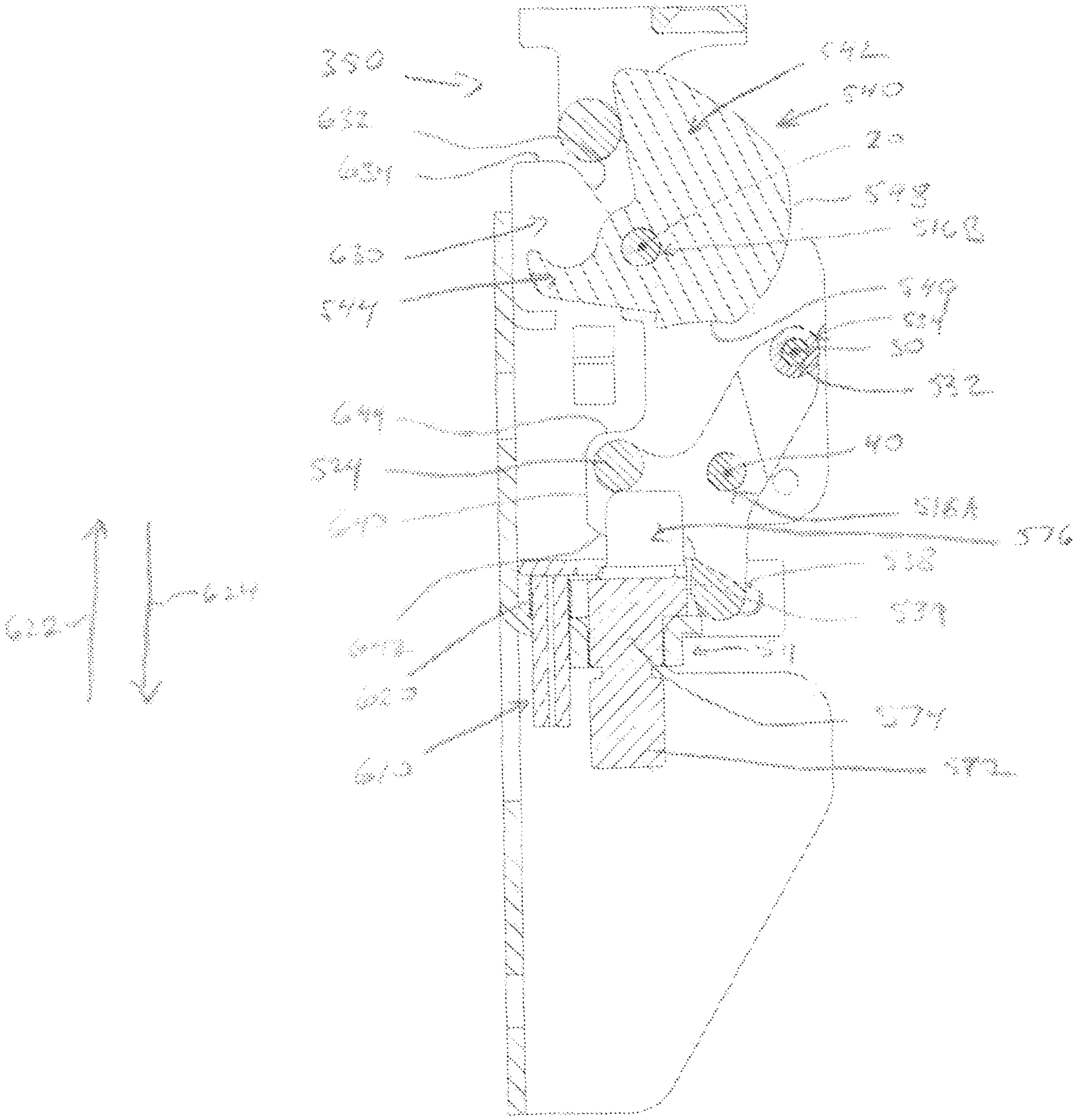
FIG. 29 shows the cross-sectional view of FIG. 25 with the input device of the exit device assembly of FIG. 1 in a dogged position.
Figure 30:
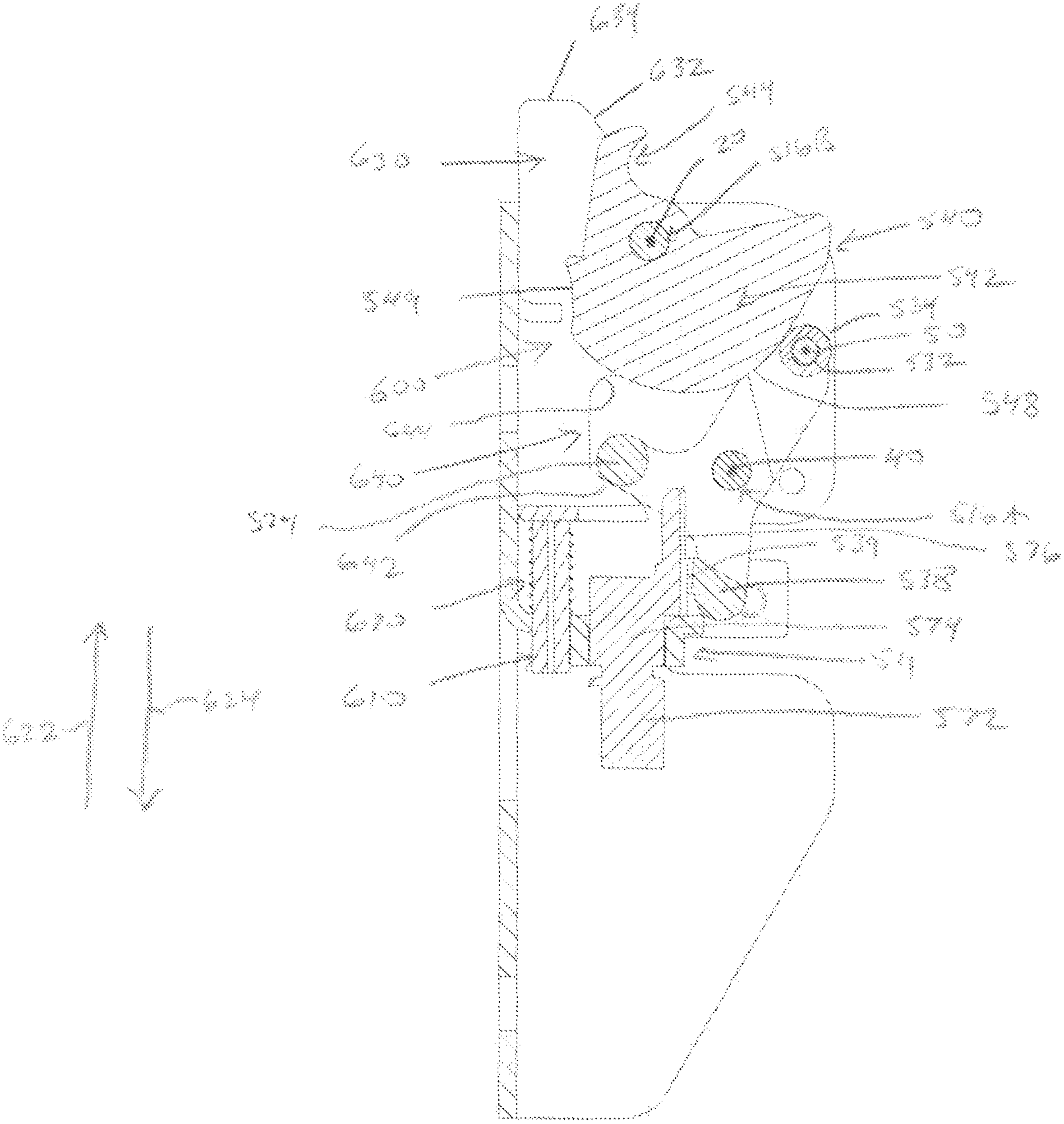
FIG. 30 shows the cross-sectional view of FIG. 25 with the input device of the exit device assembly of FIG. 1 in a rest position and a strike not present.

FIG. 29 illustrates the position of the components of upper latch assembly 500 when input 112 of input device 110 is dogged in a depressed position and door 10 is closed. FIG. 30 illustrates the position of the components of upper latch assembly 500 when input 112 of input device 110 is in a rest position (indicated by position of cam 576) and a strike is not present, such as in the case of an electric strike being retracted. When a strike is not present, auxiliary bolt 600 moves upward in direction 622. This upward movement causes a rotation of roller bracket 531 about roller assembly rotational axis 40 which in turn moves roller 534 out of roller depression 549 of latch 540. Latch 540 then rotates downward about latch rotation axis 20 due to the larger latch arm 542 compared to return arm 544 and roller 534 rolls along rolling surface 548. The rotation of latch 540 stops with return arm 544 positioned upward as shown in FIG. 30 due to the contact of cross member 538 with cam 576. As shown both return arm 544 of latch 540 and top portion 630 of auxiliary bolt 600 are positioned to engage a strike when one is presented again. Auxiliary bolt 600 operates as a strike presence sensor.

Lower Latch Assembly

The lower latch assembly 400 will now be explained in greater detail. As is shown in FIG. 14, lower latch assembly 400 includes an outer cover 402 configured to conceal the inner linkages of lower latch assembly 400. Outer cover 402 contains a circular opening 403 that receives lower vertical rod 160. In various embodiments, opening 403 may be any arcuate cutout, or any other type of opening that is able to receive lower vertical rod 160 while allowing movement thereof.

Figure 16:
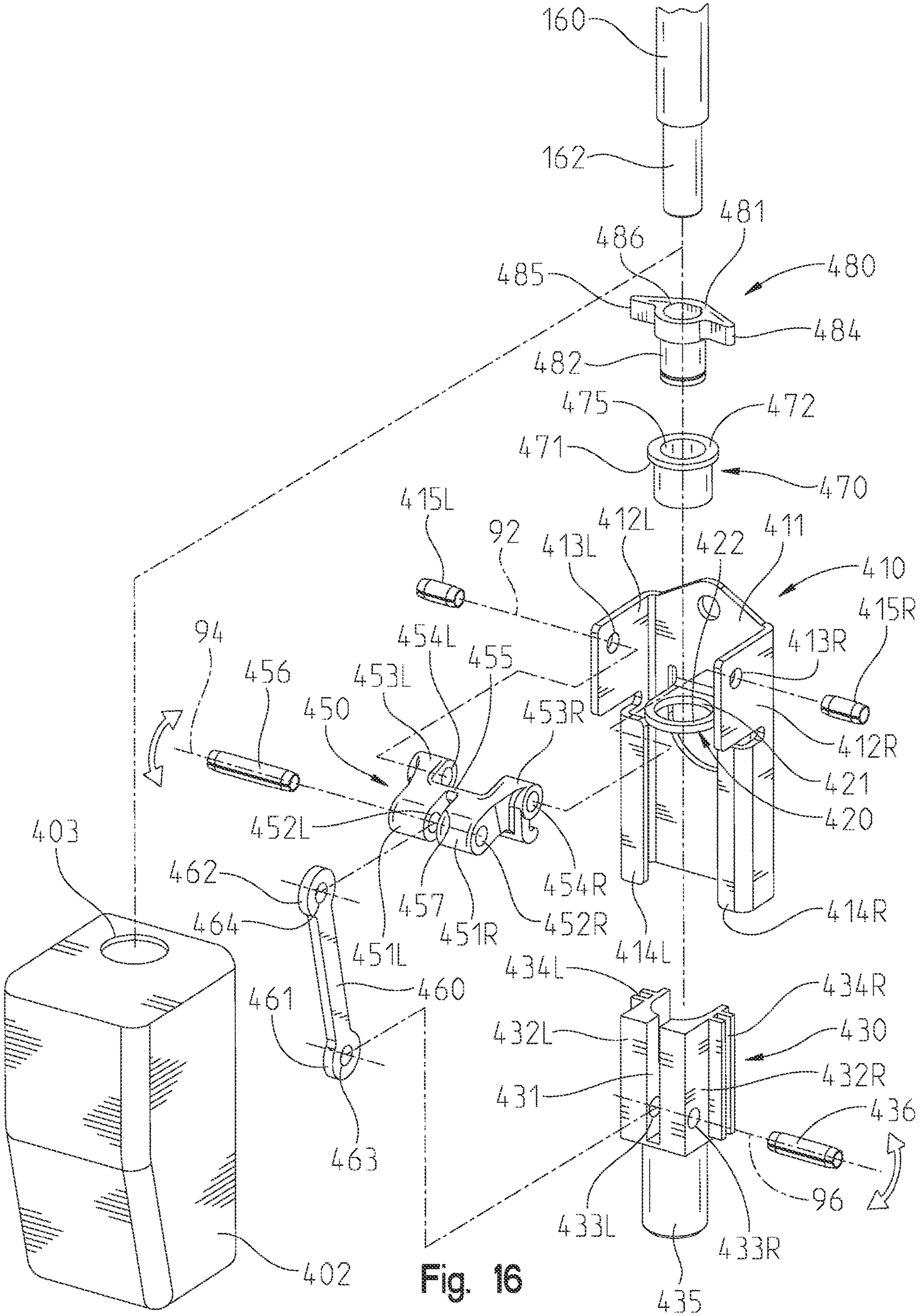
FIG. 16 shows an exploded view of a lower latch assembly of FIG. 14.
Figure 18:
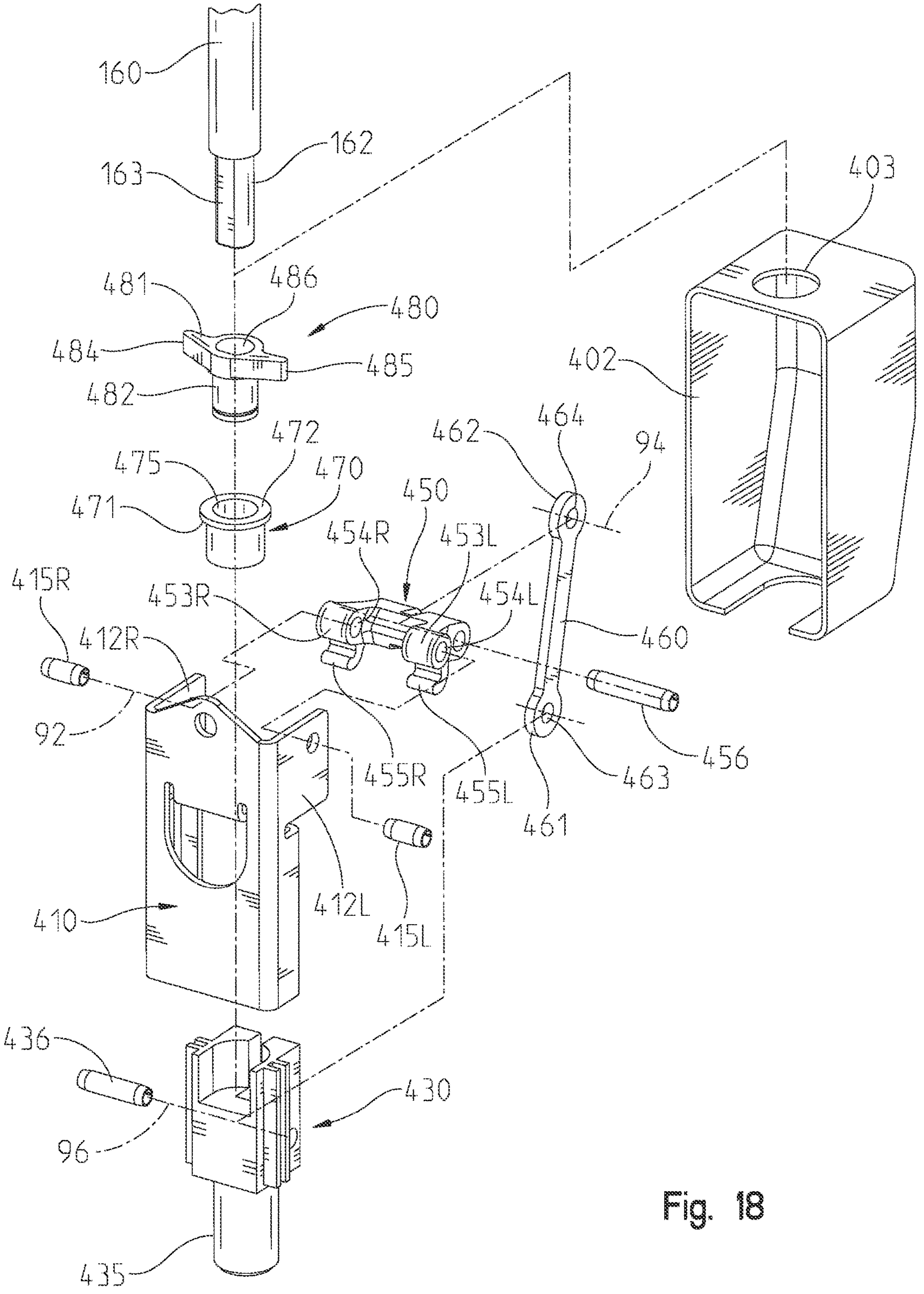
FIG. 18 shows an exploded view of a lower latch assembly of FIG. 14.

Turning to FIGS. 15 and 16, outer cover 402 is shown removed to reveal the inner linkages of lower latch assembly 400. Illustratively, lower latch assembly 400 includes a frame or chassis 410 that supports the inner linkages of lower latch assembly 400. In various embodiments, chassis 410 only supports some of the inner linkages of lower latch assembly 400. In the present embodiment, lower vertical rod 160 extends downward from intermediate transmission assembly 200 to engage lower latch assembly 400 (FIG. 1). Lower vertical rod 160 may extend below an upper extent of chassis 410. Illustratively, the lower end of lower vertical rod 160 is covered by chassis 410 and outer cover 402. At a lower extent of lower vertical rod 160, a lower vertical rod extension 162 extends further downward. Illustratively, lower vertical rod extension 162 has a smaller diameter than lower vertical rod 160. Lower vertical rod extension 162 is configured with a D-shaped profile with flat face 163 (FIG. 18).

In the present embodiment, lower latch assembly 400 further includes a cam 480 configured to receive lower vertical rod extension 162 within opening 486. Illustratively, opening 486 has a bore length the entire length of cam 480 and a D-shaped profile configured to complement and receive the D-shaped profile of lower vertical rod extension 162 to rotationally lock lower vertical rod 160 to cam 480. In this way, lower vertical rod extension 162 may transmit a torque from lower vertical rod 160 to cam 480 which will rotate as lower vertical rod 160 rotates. Cam 480 further includes first arm 484 and second arm 485 extending radially outward from opening 486. In the present embodiment, cam 480 further includes base portion 482 extending downward from first arm 484 and second arm 485.

Lower latch assembly 400 further includes bushing 470. Bushing 470 includes opening 475 having a bore length the entire length of bushing 470. Illustratively, opening 475 is configured to receive base portion 482 and allows base portion 482 to rotate within opening 475. In the present embodiment, bushing 470 further includes upper lip surface 472 on the upper portion of bushing 470. Upper lip surface 472 is configured to receive and abut a lower portion of first arm 484 and second arm 485. Further, bushing 470 includes lower lip surface 471 facing downward. In the present embodiment, lower lip surface 471 contacts ring 420 (FIG. 16). In various embodiments, bushing 470 may be fixed to ring 420 using an adhesive, through a weld, or other methods of coupling.

In the present embodiment, chassis 410 includes back wall 411 configured to abut door 10. Chassis 410 further includes right sliding tab 414R and left sliding tab 414L. Illustratively, right sliding tab 414R and left sliding tab 414L extend outward from back wall 411 and inward toward each other, creating an L-shaped profile, and extend downward along a lower portion of chassis 410.

Chassis 410 further includes ring 420 at an intermediate vertical location on chassis 410. Ring 420 extends outward from back wall 411 and has an arcuate profile with opening 421 extending vertically through ring 420. In the present embodiment, ring 420 includes upper surface 422 that faces upward, wherein the upper surface defines a plane nominally perpendicular to the door, and nominally parallel to floor 13 (FIG. 14.) Opening 421 is configured to receive bushing 470, and upper surface 422 is positioned to receive lower lip surface 471 to restrain bushing 470 from moving downward past ring 420.

Chassis 410 includes right tab 412R and left tab 412L extending outward and nominally perpendicular from back wall 411 and door 10. Illustratively, right tab 412R and left tab 412L are positioned on the upper portion of chassis 410. Further, right tab 412R includes opening 413R that receives pin 415R, and left tab 412L includes opening 413L that receives pin 415L. In the present embodiment, pins 415R and 415L are roller pins. In various embodiments, pins 415R and 415L may be a roller bearing or other type of fastener providing a low-friction rolling surface.

Lower latch assembly 400 further includes crank link 450. In the present embodiment, crank link 450 includes first portion 453R with aperture 454R and second portion 453L with aperture 454L. In the present embodiment, crank link 450 is longitudinally forward of lower vertical rod 160 and is coupled to an upper portion of chassis 410. Illustratively, aperture 454R and aperture 454L align with opening 413R and opening 413L, respectively. Pin 415R inserts through opening 413R and aperture 454R, and pin 415L inserts through opening 413L and aperture 454L (FIG. 18). Crank link 450 is coupled to chassis 410, and more specifically, crank link 450 is rotatably connected to right tab 412R and left tab 412L, creating crank link rotation axis 92 along pin 415R and pin 415L. Crank link rotation axis 92 is substantially orthogonal to the vertical rod rotation axis 50. In this case, "substantially orthogonal" is nominally orthogonal, and the crank rotation axis may be between 85-95 degrees offset from the vertical rod rotation axis.

Still referring to FIG. 16, crank link 450 includes third portion 451R and fourth portion 451L. In the present embodiment, third portion 451R and fourth portion 451L extend outward from first portion 453R, second portion 453L, and crank link rotation axis 92. Further, third portion 451R and fourth portion 451L are connected by bridge 455 extending across channel 457. In the present embodiment, first portion 453R, second portion 453L, third portion 451R, and fourth portion 451L are all connected and make a single piece. In the present embodiment, third portion 451R includes an aperture 452R and fourth portion 451L includes an aperture 452L. In the present embodiment, aperture 452R and aperture 452L are configured to receive pin 456. In various embodiments, pin 456 has a length sized to be retained within at least a portion of 452R and aperture 452L at the same time and extend across channel 457. In various embodiments pin 456 is a roller pin. In various embodiments, pin 456 may be a roller bearing or other type of fastener providing a low-friction rolling surface. In the present embodiment, as first portion 453R and second portion 453L rotate around crank link rotation axis 92, third portion 451R and fourth portion 451L also rotate around crank link rotation axis 92.

Lower latch assembly 400 further includes connecting rod 460 and bolt 430. Connecting rod 460 includes first end 461 configured with aperture 463 and second end 462 with aperture 464. In the present embodiment, second end 462 is received within channel 457, and pin 456 is inserted through aperture 464. Connecting rod 460 is operably coupled to crank link 450 and connecting rod 460 moves with crank link 450. Further, pin 456 connects third portion 451R, second end 462, and fourth portion 451L so that second end 462 is rotatable relative to third portion 451R and fourth portion 451L around first connecting rod rotation axis 94. In the present embodiment, connecting rod 460 is linear, however, in various embodiments, connecting rod 460 may take various shapes able to transmit a force between the crank link 450 and bolt 430.

Still referring to FIG. 16, bolt 430 is located at a lower portion of lower latch assembly 400. Bolt 430 includes right body portion 432R and left body portion 432L, and in the present embodiment, right body portion 432R and left body portion 432L include an upper portion of bolt 430. Right body portion 432R further includes channel 434R and aperture 433R, further, left body portion 432L further includes channel 434L and aperture 433L. Illustratively, channels 434R and 434L extend laterally outward from bolt 430, and nominally parallel to door 10 (FIG. 14). Channels 434R and 434L each include a pair of tabs extending along the height of right body portion 432R and left body portion 432L, respectively. In various embodiments, channels 434R and 434L may extend only a portion of right body portion 432R and left body portion 432L. Channels 434R and 434L are configured to receive right sliding tab 414R and left sliding tab 414L to serve as a guide for reciprocation of bolt 430 vertically along right sliding tab 414R and left sliding tab 414L. In the present embodiment, right body portion 432R and left body portion 432L further include apertures 433R and 433L, respectively. Further, right body portion 432R and left body portion 432L are laterally separated by channel 431 which receives first end 461 of connecting rod 460. Apertures 433R and 433L are configured to align with aperture 463, and pin 436 extends through aperture 433R, aperture 463 of first end 461, and aperture 433L. Pin 436 rotatably couples connecting rod 460 to bolt 430. In various embodiments pin 436 is a roller pin. In various embodiments, pin 436 may be a roller bearing or other type of fastener providing a low-friction rolling surface. Pin 436 creates a second connecting rod rotation axis 96, about which connecting rod 460 is rotatable.

Still referring to FIG. 16, bolt 430 includes a latch 435 extending vertically downward from right body portion 432R and left body portion 432L. In the present embodiment, latch 435 engages bolt receiver 11 positioned within floor 13 (FIG. 14). In the present embodiment, latch 435 comprises a cylindrical profile and bolt receiver 11 has a complementary profile. In the present embodiment, latch 435 is unitized with bolt 430 and moves with bolt 430. Bolt 430 moves along right sliding tab 414R and left sliding tab 414L through channel 434R and channel 434L, latch 435 also moves with bolt 430. In various embodiments, latch 435 may appear to be similarly sized as bolt 430. In various embodiments, latch 435 may have any profile that interfaces with bolt receiver 11 to selectively preclude blocking movement of door 10 from the closed position illustrated in FIG. 1. In various embodiments, latch 435 may be removably coupled from bolt 430.

Figure 17:
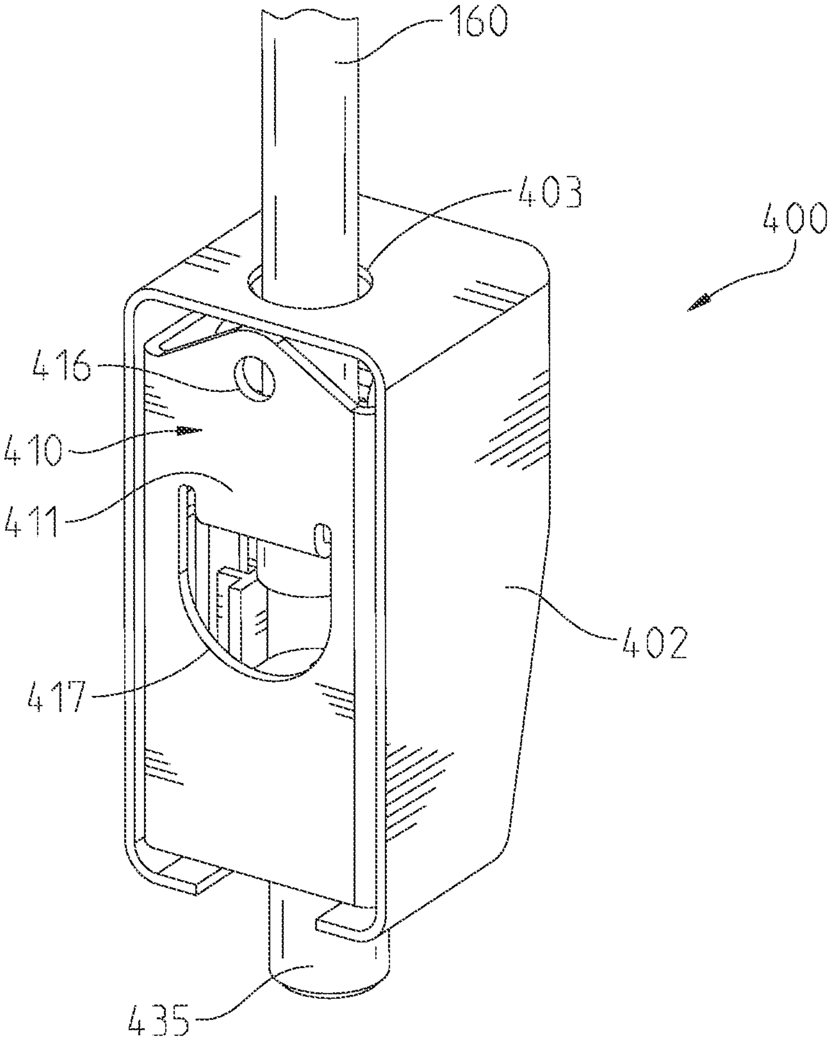
FIG. 17 shows a perspective view of a lower latch assembly of FIG. 14.

Now turning to FIG. 17, back wall 411 includes an opening 416 to receive a fastener (not shown) that couples lower latch assembly 400 to door 10. Further, back wall 411 includes an opening 417, and in various embodiments, opening 417 is created by punching ring 420 out of back wall 411, and bending ring 420 inward, away from back wall 411. In the present embodiment, the profile of opening 417 is substantially similar to the profile of ring 420.

Turning to FIG. 18, crank link 450 further includes first arm 455R and second arm 455L. First arm 455R and second arm 455L extend substantially downward from first portion 453R and second portion 453L, respectively, and are constructed with an arcuate shape. In various embodiments, first arm 455R and second arm 455L may be constructed with various shapes. More specifically, first portion 453R and second portion 453L are constructed so at least one of first portion 453R and second portion 453L comes into contact with at least one of first arm 484 and second arm 485 of cam 480. In the present embodiment, first portion 453R and second portion 453L are unitized as one piece, and if first portion 453R and second portion 453L are moved, crank link 450 will move.

Figure 19A:
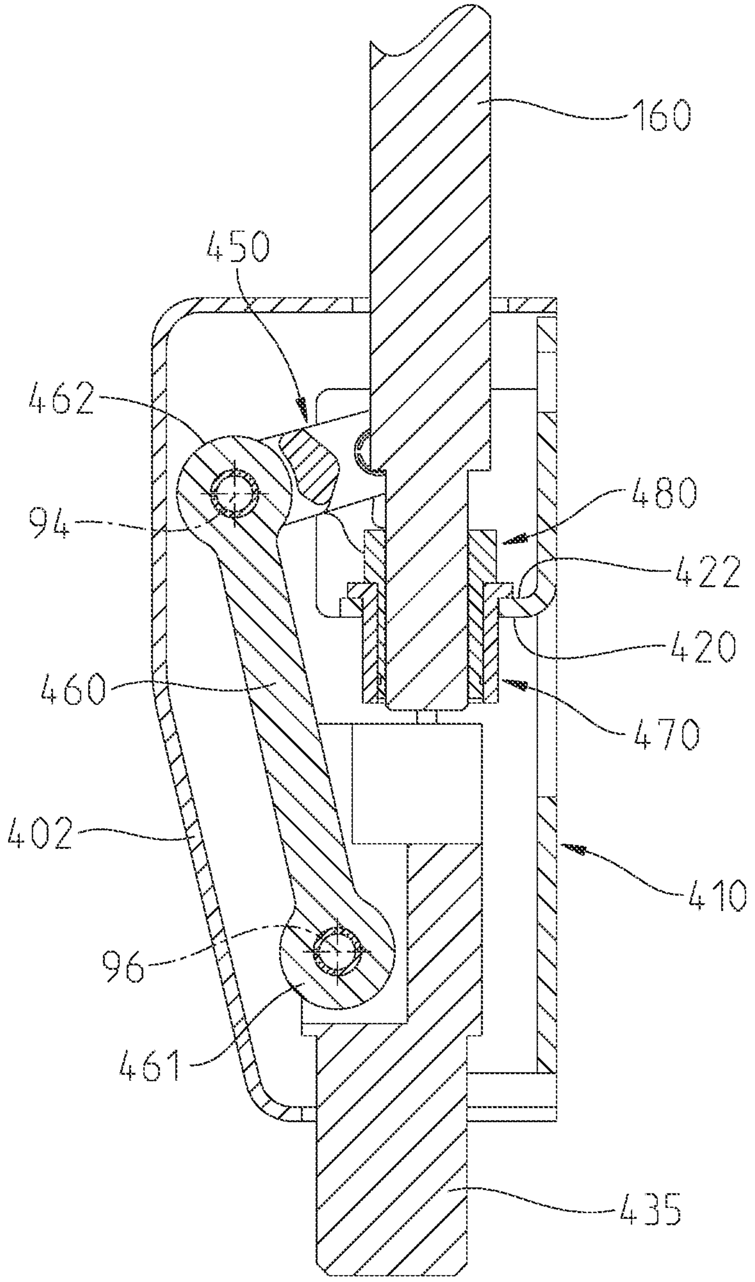
FIG. 19A shows a cross-sectional view of the lower latch assembly of FIG. 14, shown in a latched position, taken along line 19A-19A of FIG. 14.
Figure 19B:
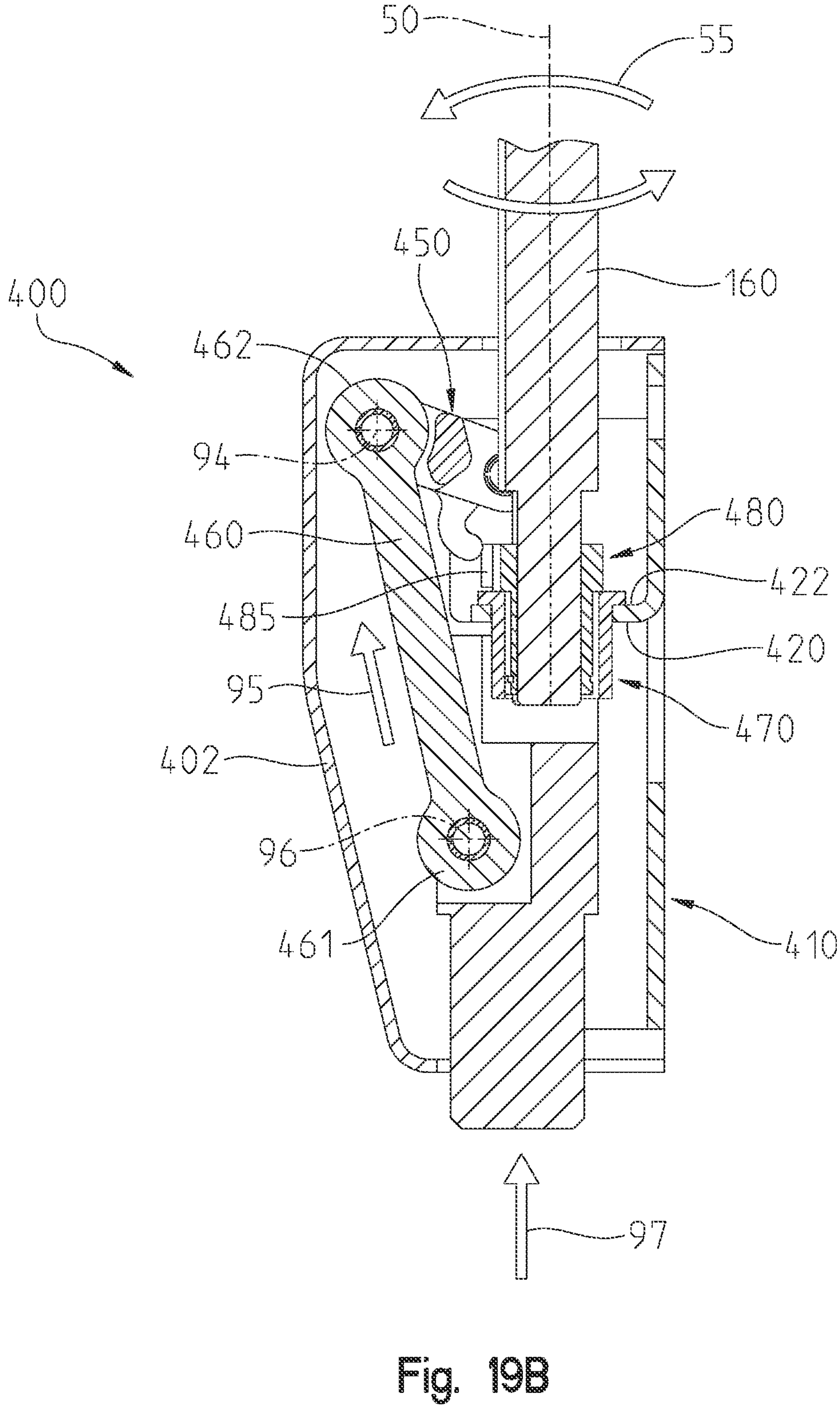
FIG. 19B shows a cross-sectional view of the lower latch assembly similar to FIG. 19A, shown in an unlatched position.

Referring to FIGS. 19A-19B, operation of lower latch assembly 400 will be explained. FIG. 19A shows a latched, or engaged, position of lower latch assembly 400. Latch 435 is in a lowered position where the lowermost portion of latch 435 is farthest away from outer cover 402. In the present embodiment, input device 110 (FIG. 1) is disengaged and lower vertical rod 160 remains unrotated, and also cam 480 remains unrotated and in a neutral state. Further shown in FIG. 19A, crank link 450 remains rotated downward about crank link rotation axis 92 (FIG. 16) relative to the ground 13. Connecting rod 460 is positioned in a lowermost position, keeping latch 435 in a latched, or engaged, position. Illustratively, lower vertical rod extension 162 extends downward and through cam 480 and bushing 470.

Now turning to FIG. 19B, lower latch assembly 400 is in a disengaged, or unlatched, state. In the present embodiment, latch 435 is moved upward in a vertical direction 97. Illustratively, lower vertical rod 160 is rotated around vertical rod rotation axis 50 in rotational direction 55. As lower vertical rod 160 rotates, cam 480 rotates around vertical rod rotation axis 50 in rotational direction 55, and second arm 485 contacts second arm 455L. As lower vertical rod 160 rotates to its full extent, second arm 485 rotates a commensurate distance, and pushes second arm 455L a commensurate amount. Crank link 450 rotates about crank link rotation axis 92 (FIG. 16), and third portion 451R and fourth portion 451L move upwards, also rotating about crank link rotation axis 92. Further, as third portion 451R and fourth portion 451L move upward, connecting rod 460 moves in an upward direction 95. As connecting rod 460 moves in upward direction 95, bolt 430 and latch 435 move vertically upward along vertical direction 97. As lower vertical rod 160 rotates in rotational direction 55, forces are transmitted through lower latch assembly 400 and raise bolt 430 along vertical direction 97.

Figure 20:
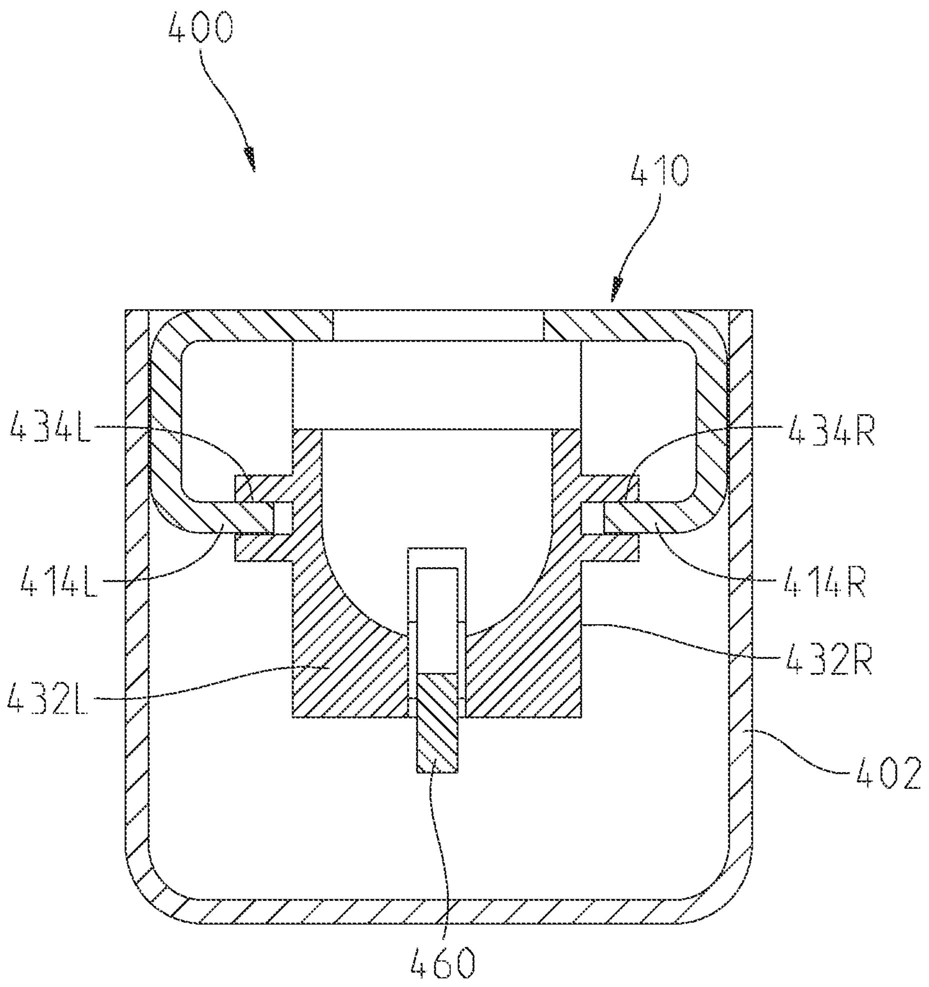
FIG. 20 shows a cross sectional view of the lower latch assembly of FIG. 14, taken along line 20-20 of FIG. 14.

As illustrated in FIG. 20, channel 434R and channel 434L engage right sliding tab 414R and left sliding tab 414L, respectively. In the present embodiment, the height of channel 434R and channel 434L, and the length of right sliding tab 414R and left sliding tab 414L does not allow bolt 430 to be removed unless slid vertically upward or downward off right sliding tab 414R and left sliding tab 414L. Outer profile of outer cover 402 encloses the entirety of internal linkages of lower latch assembly 400.

Figure 21B:
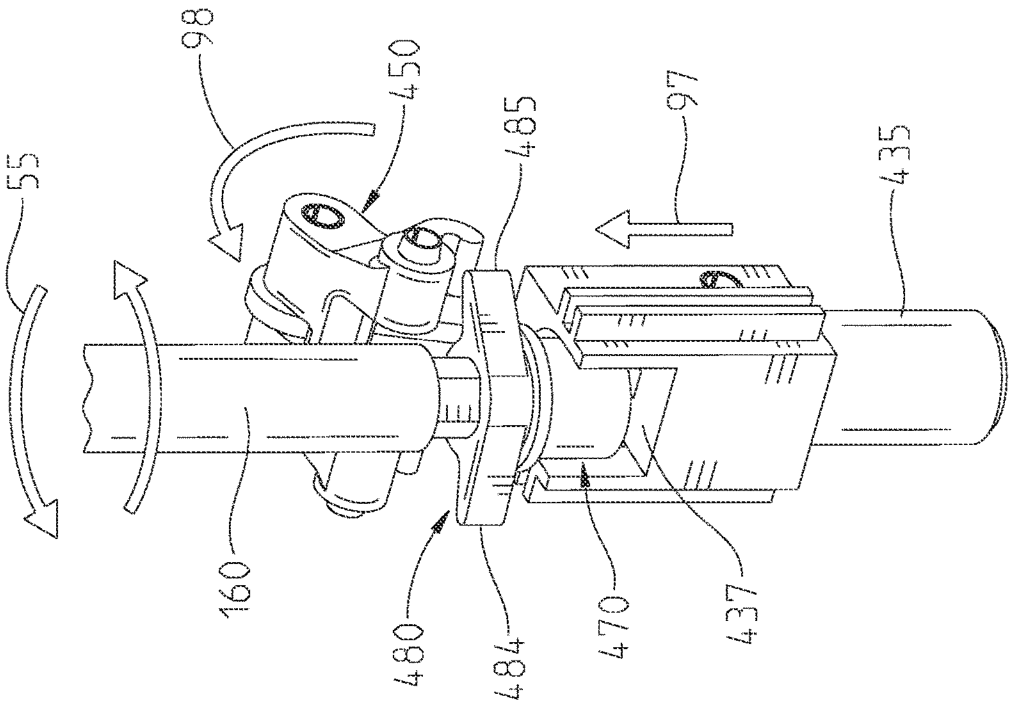
FIG. 21B shows a perspective view of a partial assembly of the lower latch assembly similar to FIG. 21A, shown in an unlatched position.
Figure 21A:
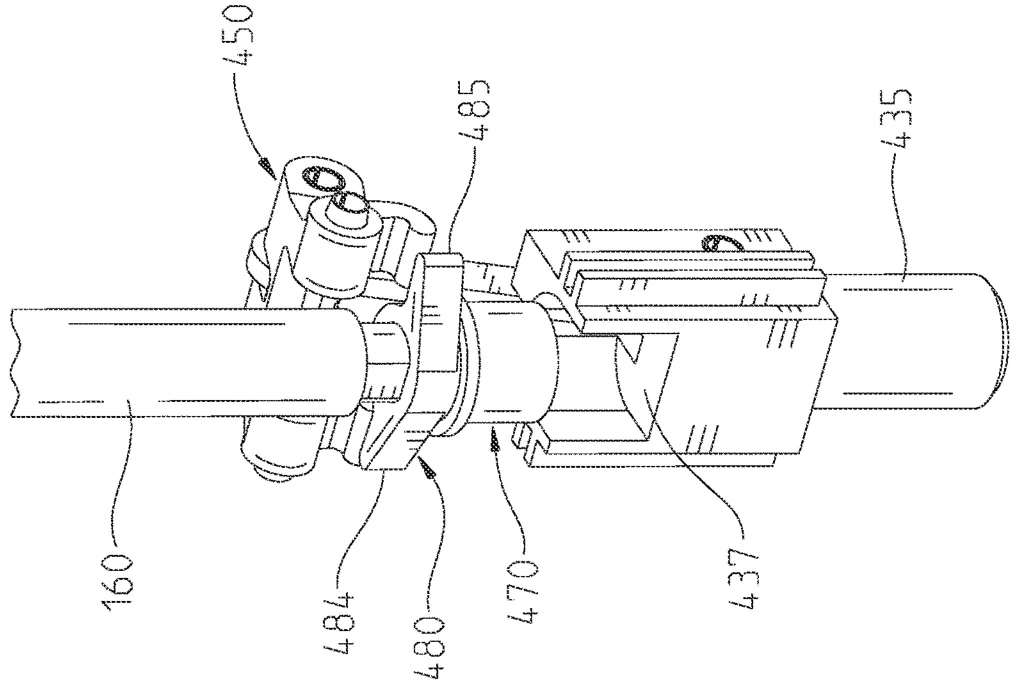
FIG. 21A shows a perspective view of a partial assembly of the lower latch assembly of FIG. 14, shown in a latched position.
Figure 22:
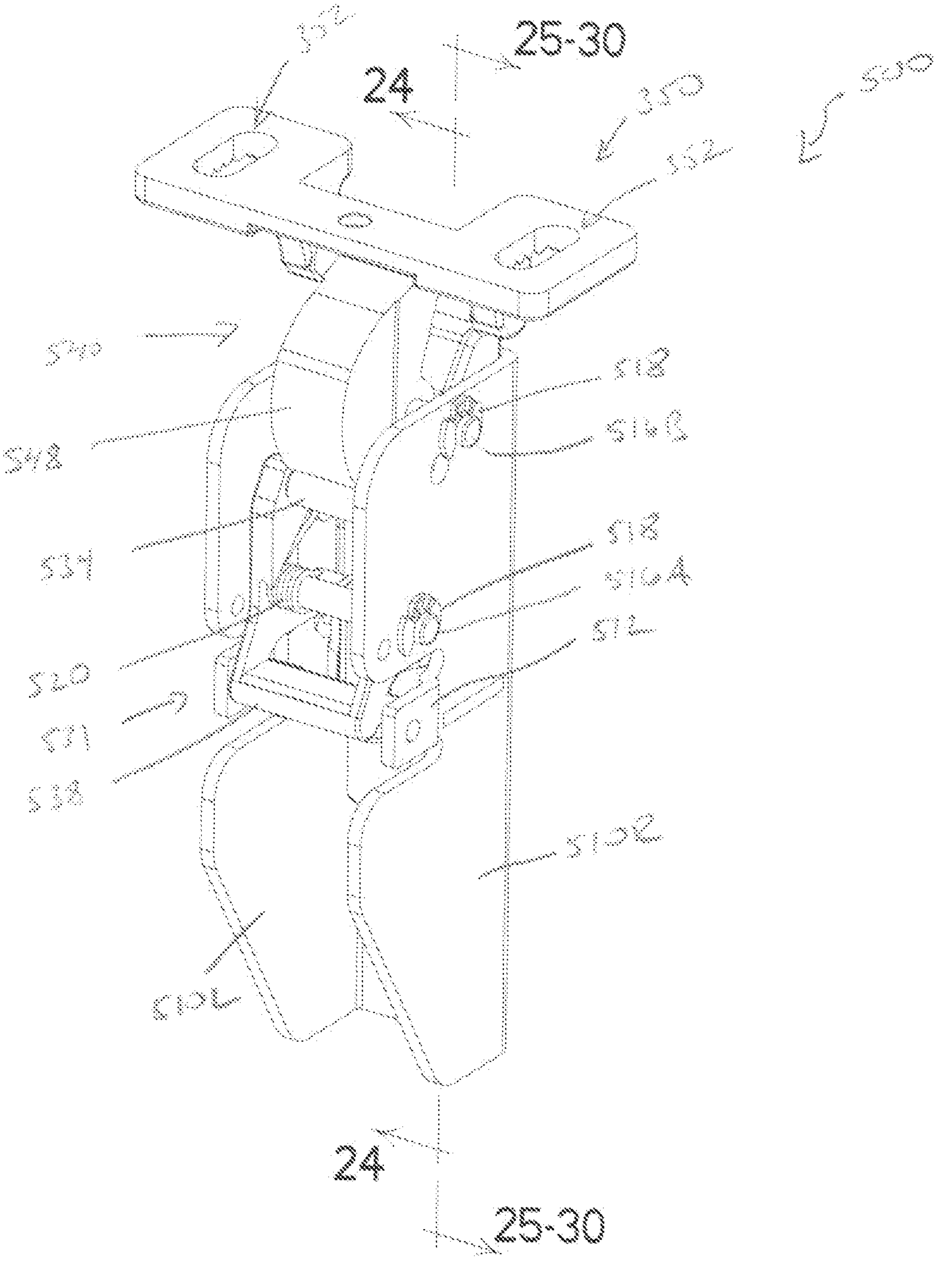
FIG. 22 shows a perspective view of another exemplary top latch assembly of the exit device assembly of FIG. 1.

Turning now to FIGS. 21A-21B, the operation of lower latch assembly 400 will be further explained. In the present embodiment, as lower vertical rod 160 rotates from an unrotated position (FIG. 21A) to a rotated position (FIG. 21B), second arm 485 may rotate and push second arm 455L. In various embodiments, lower vertical rod 160 may be rotated opposite to rotational direction 55, and first arm 484 may rotate and push first arm 455R. Crank link 450 is moved and rotated upwards in rotational direction 98, around crank link rotation axis 92. In the present embodiment, whether lower vertical rod 160 is rotated in rotational direction 55, or opposite rotational direction 55, either rotational motion will impart movement on crank link 450, and actuating latch 435, as previously described. In various embodiments, only first arm 484 or second arm 485 may be present, and lower vertical rod 160 may be rotationally restricted. A perceived benefit of the disclosed system is that lower latch assembly 400 may be placed on either a left-side door or a right-side door, and the mechanical linkages would not have to change, making manufacturing and distribution easier.

Still referring to FIGS. 21A-21B, as bolt 430 moves in vertical direction 97, an upper portion of bolt 430 moves up and surrounds bushing 470. In the present embodiment, bolt 430 is created with a cutout 437 configured to receive a portion of bushing 470. In a side view, bolt 430 overlaps a portion of bushing 470, decreasing the amount of vertical space needed for lower latch assembly 400 and the overall package size of lower latch assembly 400 is decreased. Additionally, with smaller packaging, a shorter connecting rod 460 may be used, as well as a smaller crank link 450.

The process may work in reverse when lower vertical rod 160 moves in the rotational direction opposite rotational direction 55. In this way, cam 480 moves in the rotational direction opposite rotational direction 55 and crank link 450 rotates downward around crank link rotation axis 92, and crank link 450 moves vertically downward. The return of crank link 450 and latch 435 to the latched position of FIGS. 19A and 21A may be effected by gravity. Alternatively, a spring may be implemented to bias latch 435 to the latched position, or arms 484, 485 of cam 480 may be captured by first portion and second portion 455L, 455R of crank link 450 such that cam 480 exerts force on crank link 450 during a movement returning latch 435 to the latched position.

Full Assembly

The full system will now be explained in greater detail. As shown in FIG. 1, when an operator wishes to operate exit device assembly 100 to open, close, or lock door 10, operator may engage input device 110 through input 112. As input device 110 is engaged, intermediate transmission assembly 200 is actuated. Specifically, input bracket 250 moves in lateral direction 90, and upper tab 252A and lower tab 252B pull on pin 234A and pin 234B which rotates upper output 230A and lower output 230B, respectively (FIG. 4).

As upper output 230A rotates in rotational direction 55, upper vertical rod 150 also rotates in rotational direction 55. As is further shown in FIGS. 12A-12C, upper vertical rod 150 is shown rotating from an unrotated position (FIG. 12A) to a partially rotated position (FIG. 12B) to a fully rotated position (FIG. 12C). Illustratively, as upper vertical rod 150 rotates, upper latch assembly 300 is moved from an engaged/latched/locked position (FIG. 12A), to a disengaged/unlatched/unlocked position (FIG. 12C). In various embodiments, the height of upper vertical rod 150 may be greater than half of the height of door 10. In various embodiments, the height of upper vertical rod 150 may be less than half of the height of door 10.

Further, as upper output 230A rotates, lower output 230B and lower vertical rod 160 rotate. Looking now at FIGS. 19A-19B, as lower vertical rod 160 rotates in rotational direction 55, lower latch assembly 400 is moved from an engaged/latched/locked position (FIG. 19A) to a disengaged/unlatched/unlocked position (FIG. 19B). As lower vertical rod 160 rotates in rotational direction 55, latch 435 is moved vertically upward into a disengaged/unlatched/unlocked position. In various embodiments, the height of lower vertical rod 160 may be greater than half of the height of door 10. In various embodiments, the height of lower vertical rod 160 may be less than half of the height of door 10.

In the present embodiment, input device 110, intermediate transmission assembly 200, upper latch assembly 300, and lower latch assembly 400 all move in unison. The actuation of input device 110 actuates upper latch assembly 300 and lower latch assembly 400 through intermediate transmission assembly 200. As input device 110 is actuated, intermediate transmission assembly 200, upper latch assembly 300, and lower latch assembly 400 are all actuated at substantially the same time, and upper latch assembly 300 and lower latch assembly 400 may be moved into a disengaged/unlatched/unlocked position so that door 10 may be opened. In the present embodiment, when upper latch assembly 300 is in the engaged/latched/locked position, the cam stem 370 is held in the rotated position, and thus, lower latch assembly is also held in the unengaged/unlatched/unlocked position.

A benefit of exit device assembly 100 is that by changing the translational movement of input bracket 250 into rotational movement of upper vertical rod 150 and lower vertical rod 160, the amount of force required to fully actuate exit device assembly 100 is reduced as compared to prior known systems. In known embodiments, upper vertical rod 150 and lower vertical rod 160 are vertically translated, and subsequently must lift a lower latch assembly, and more specifically a bolt, against gravity. The present embodiment uses the mechanical advantage present within exit device assembly 100 to reduce the overall effort required to actuate exit device assembly 100. Further, the length of upper vertical rod 150 and lower vertical rod 160 need not be precisely controlled.

In the present embodiment, exit device assembly 100 may be required to be actuated with less than a predetermined force to meet a standard requirement such as the California Building Code. In the present embodiment, exit device assembly 100 is constructed so that an input force of less than five pounds is required to actuate exit device assembly 100.

Concealed Vertical Rod System

Figure 31:
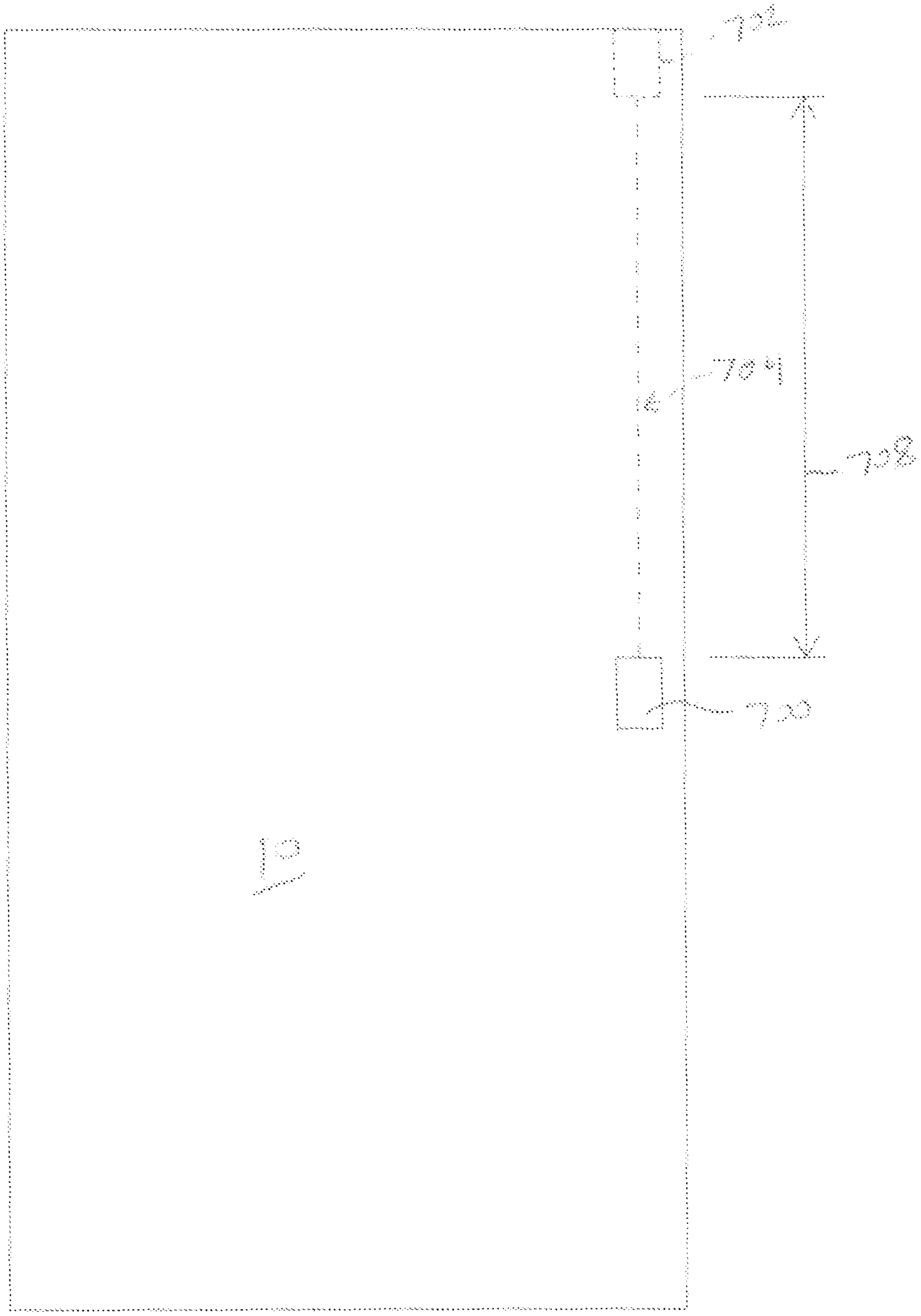
FIG. 31 shows an exemplary door having an actuator assembly, a concealed upper latch assembly, and a concealed vertical rod operatively connecting the actuator assembly and the concealed upper latch assembly and having a length L between the actuator assembly and the concealed upper latch assembly.
Figure 35:
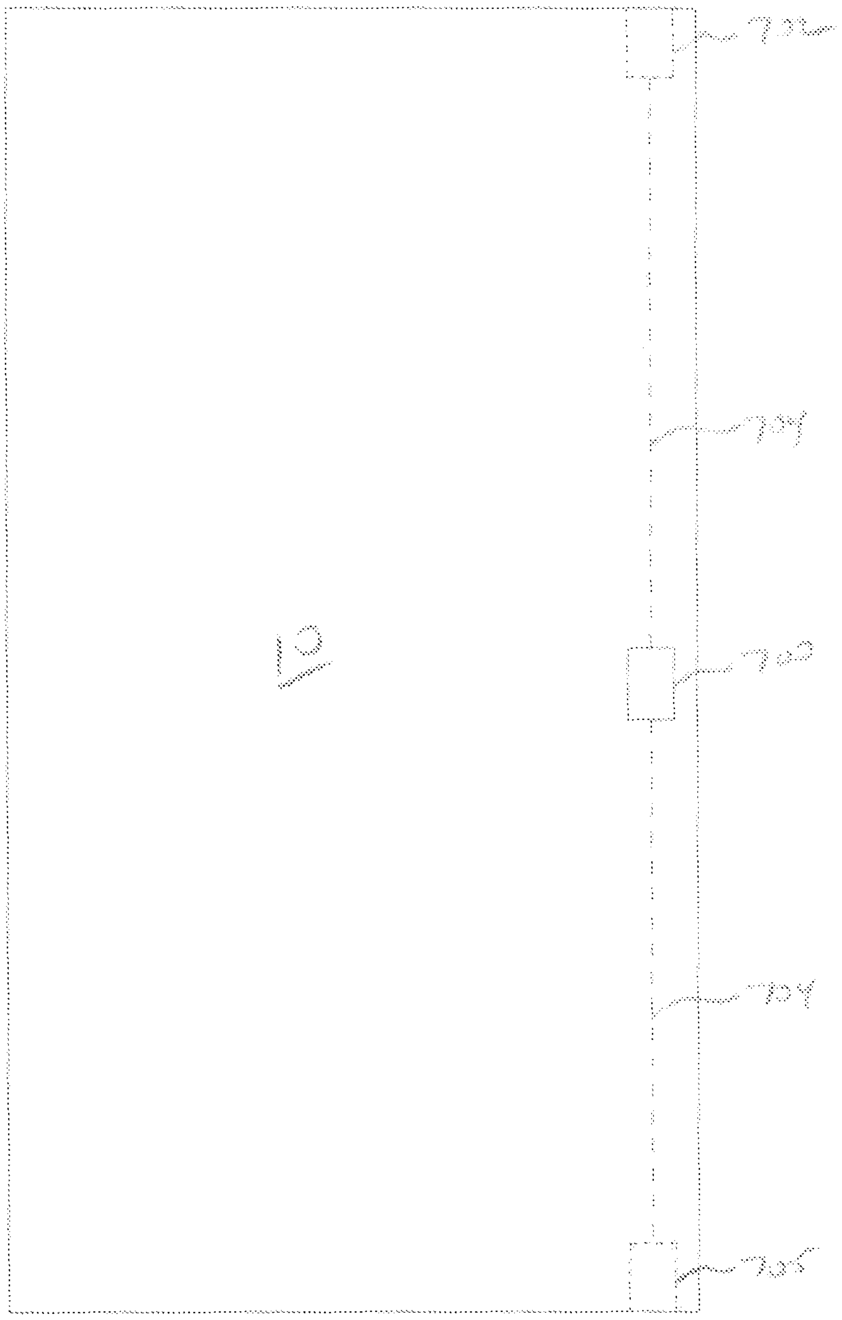
FIG. 35 shows another exemplary door having an actuator assembly, a concealed upper latch assembly, a first concealed vertical rod operatively connecting the actuator assembly and the concealed upper latch assembly; a concealed lower latch assembly; and a second concealed vertical rod operatively connecting the actuator assembly to the concealed lower latch assembly.

Referring to FIG. 31, in embodiments, door 10 includes an actuation system 700, a concealed upper latch assembly 702, and a concealed vertical rod system 704 operatively coupling actuation system 700 to concealed upper latch assembly 702. An exemplary actuation system 700 is the input device 110 described herein or other exemplary systems that receive an operator input (depression or rotation) and transform that motion into a rotation of concealed vertical rod system 704. Exemplary concealed upper latch assembly 702 include the upper latch systems described herein or other exemplary systems which control a latch based on a rotational input from concealed vertical rod system 704. In FIG. 31, concealed vertical rod system 704 is shown connecting actuation system 700 and concealed upper latch assembly 702. In FIG. 35, separate concealed vertical rod systems 704 may be used to connect actuation system 700 and concealed upper latch assembly 702 and actuation system 700 and an exemplary concealed lower latch system 705, respectively.

Figure 32:
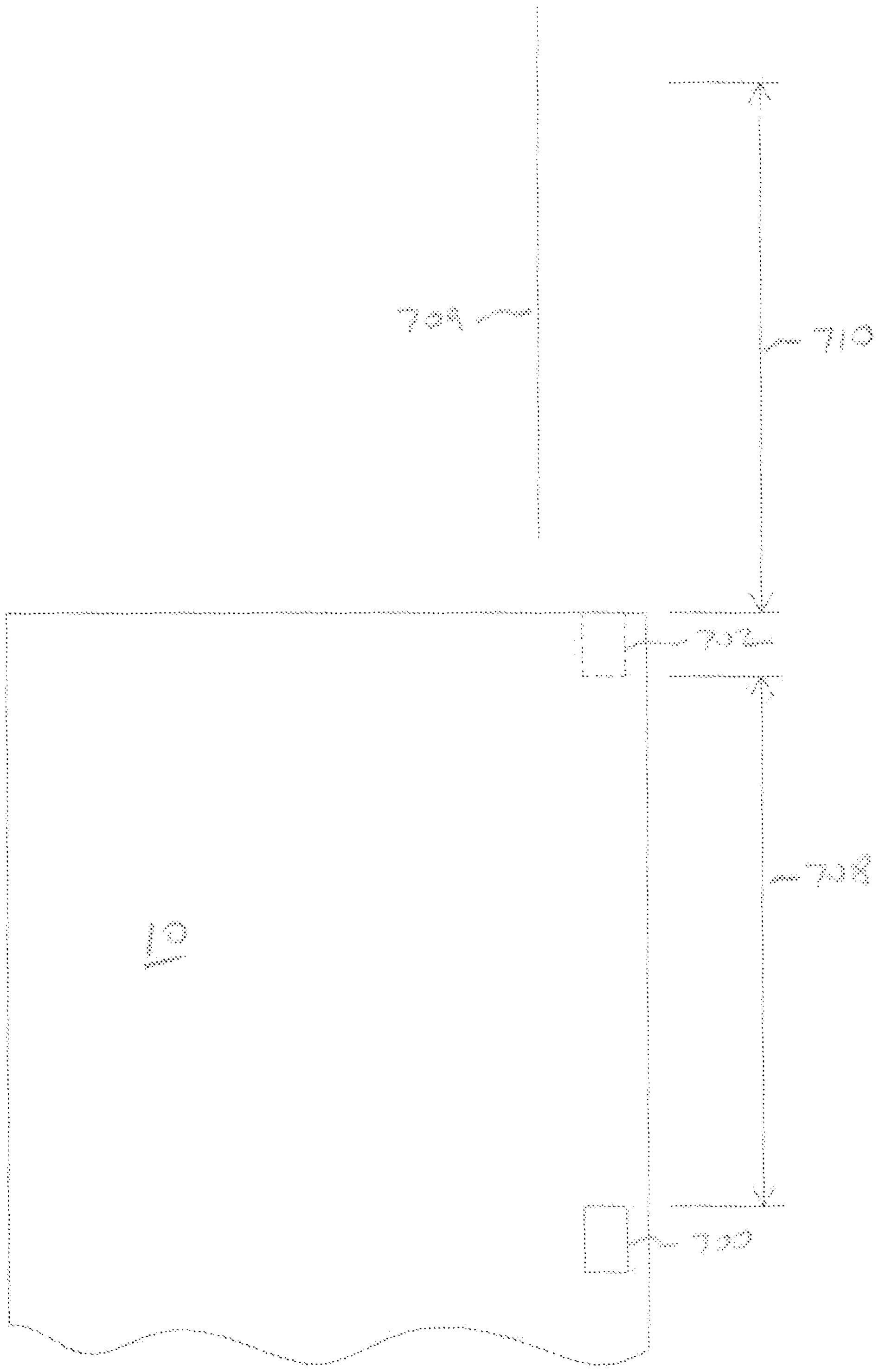
FIG. 32 shows the exemplary door of FIG. 31 having the vertical rod removed from the door.

As shown in FIG. 31, link 740 has a first length 708 between actuation system 700 and concealed upper latch assembly 702, although link 740 may be longer than first length 708 and extend into one or both of actuation system 700 and concealed upper latch assembly 702. Turning to FIG. 32, traditional vertical rods 709 are one-piece which means that a space above door 10 having an installation length 710 must be provided to install a traditional one piece vertical rod 709 into door 10. Installation length 710 is at least as long as length 708. This space requirement often requires door 10 to be dissembled from door frame 12 to install traditional vertical rod 709.

In contrast, link 740 is able to be assembled to door 10 in an area having a smaller installation length than installation length 710 of a traditional one-piece rod. In embodiments, link 740 is made of individual sections coupled together and/or is a flexible system bendable about its length, such as at joints or due to its construction, but having torsional rigidity. An advantage, among others, of having a torsional rigidity is that link 740 operates the same as traditional one-piece rod 709 in communicating a rotational output of actuation system 700 to concealed upper latch assembly 702.

Figure 33:
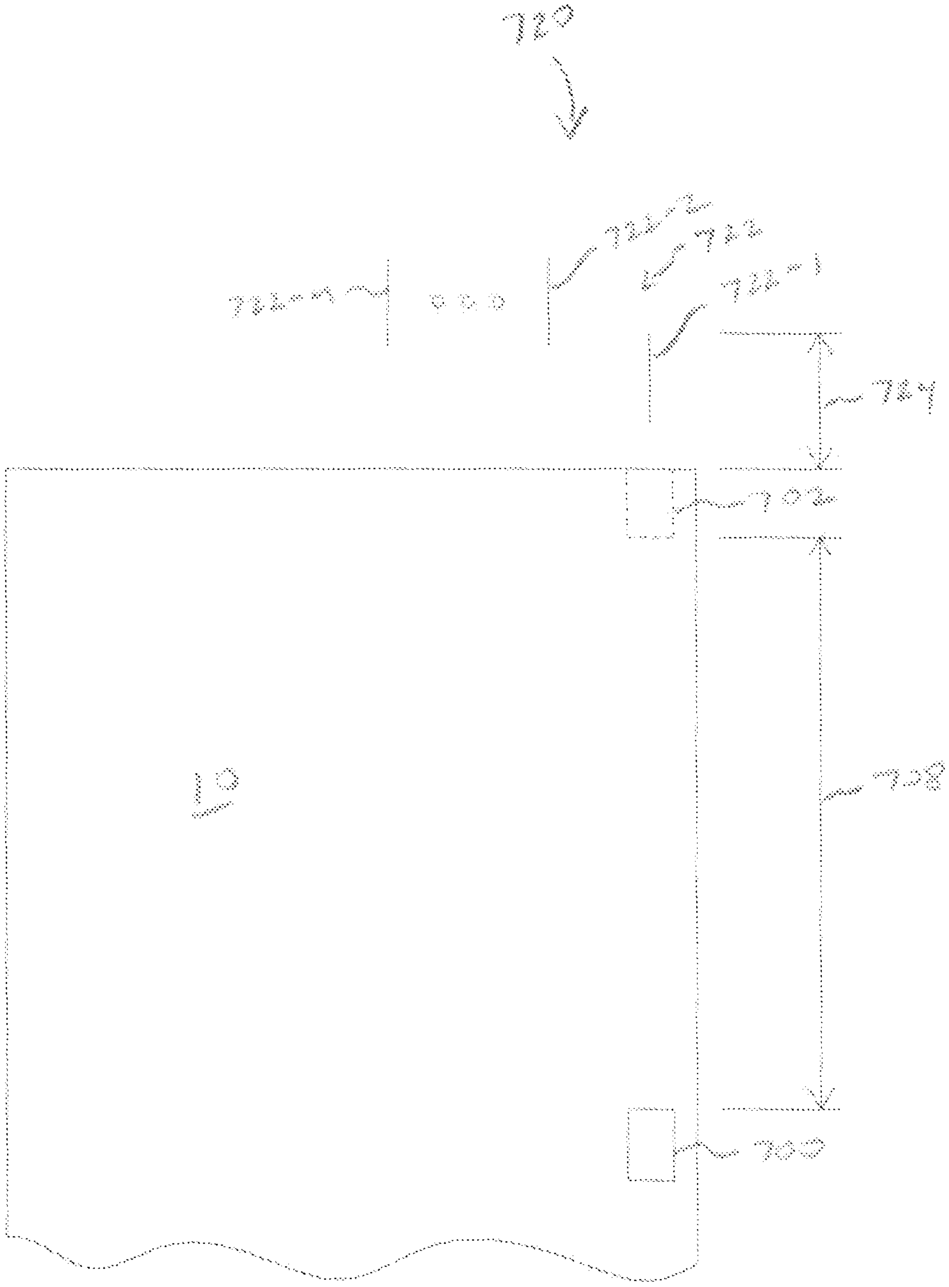
FIG. 33 shows a first exemplary rod system having a plurality of sections coupled together to operatively connect the actuator assembly and the upper latch assembly.

Referring to FIG. 33, a first embodiment 720 of link 740 is illustrated. Vertical rod system 720 includes a plurality of individual sections 722, illustratively sections 722-1, 722-2, . . . **722-*n*. Each section 722 has a length less than length 708 and thus requires an installation length 724 beyond a boundary of door 10 of less than installation length 710 of a traditional one piece vertical rod 709. Sections 722 of vertical rod system 720 are coupled together and inserted in turn into door 10. In embodiments, multiple sections 722 of vertical rod system 720 may be assembled together outside of door 10 and subsequently inserted into door 10**.

Figure 36:
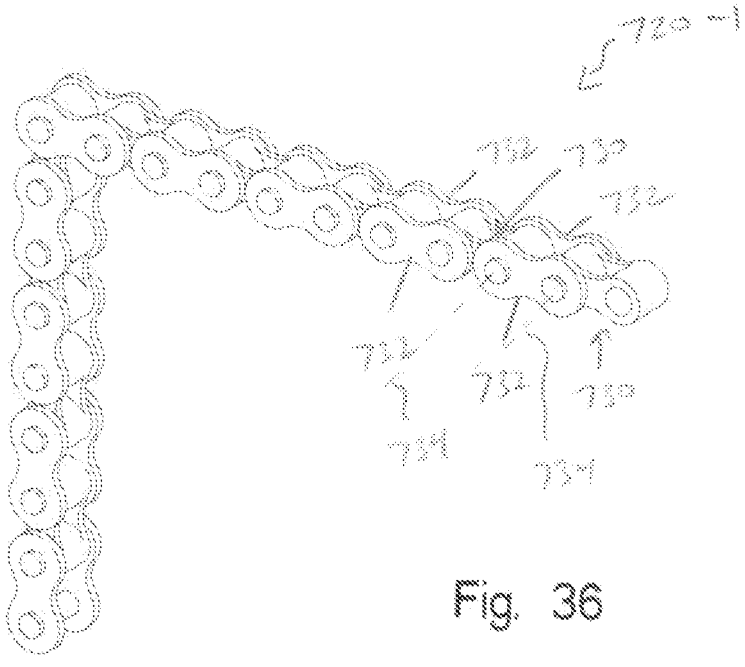
FIG. 36 shows a first exemplary rod system having a plurality of sections of FIG. 33.

Referring to FIG. 36, a first exemplary embodiment 720-1 of vertical rod system 720 is shown. The exemplary vertical rod system 720-1 in FIG. 36 includes a plurality of links 730 interconnected by side plates 732. The plurality of links 730 and side plates 732 are rotatably coupled and may rotate relative to each other about a plurality of parallel axes 734 in a similar manner as a bicycle chain. Axes 734 are generally orthogonal to vertical when vertical rod system 720-1 is installed into door 10 and door 10 is attached to door frame 12. Further, a length of vertical rod system 720-1 is easily adjusted by adding or removing links 730 thereto. Each of actuation system 700 and concealed upper latch assembly 702 will have mating coupling features to couple vertical rod system 720-1 thereto.

Figure 37:
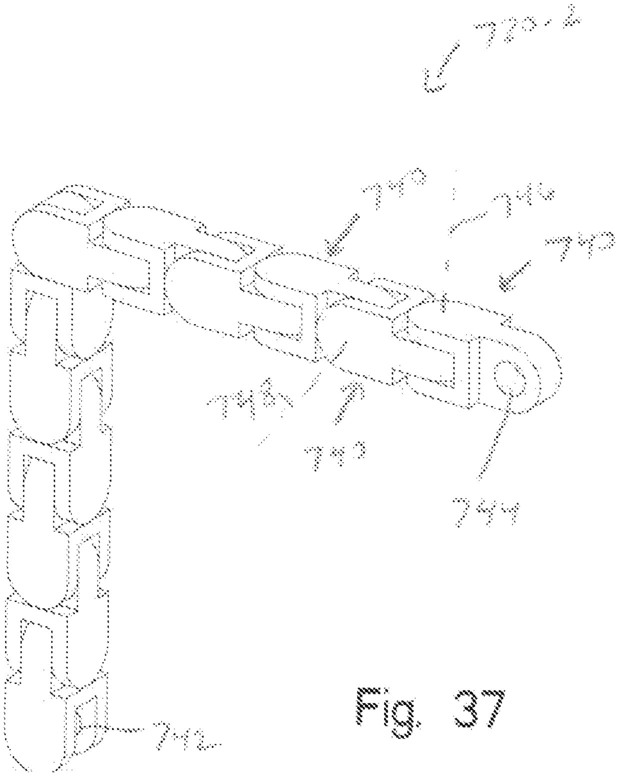
FIG. 37 shows a second exemplary rod system having a plurality of sections of FIG. 33.

Referring to FIG. 37, a second exemplary embodiment 720-2 of vertical rod system 720 is shown. The exemplary vertical rod system 720-2 in FIG. 37 includes a plurality of links 740 interconnected by mating protrusions 742 and recesses 744 on the links 740. by side plates 732. The plurality of links 740 are rotatably coupled at the connections of mating protrusions 742 and recesses 744 and may rotate relative to each other about a plurality of parallel axes 736 and 748. Axis 746 is orthogonal to axis 748. Axes 746 and 748 are generally orthogonal to vertical when vertical rod system 720-2 is installed into door 10 and door 10 is attached to door frame 12. Further, a length of vertical rod system 720-2 is easily adjusted by adding or removing links 740 thereto. Each of actuation system 700 and concealed upper latch assembly 702 will have mating coupling features to couple vertical rod system 720-2 thereto.

Figure 39:
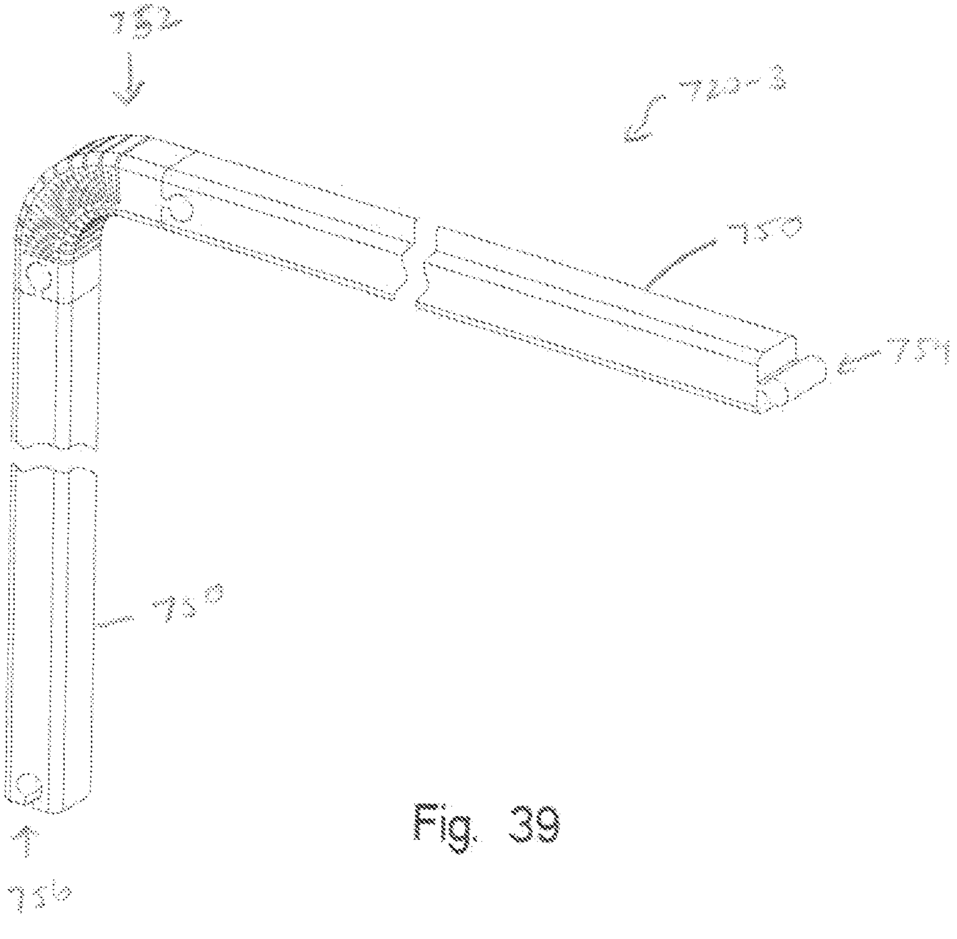
FIG. 39 shows a third exemplary rod system having a plurality of sections of FIG. 33.

Referring to FIG. 39, a third exemplary embodiment 720-3 of vertical rod system 720 is shown. The exemplary vertical rod system 720-3 in FIG. 39 includes a plurality of links 750 interconnected by flexible couplers 752. Each of links 750 and flexible couplers 752 include mating protrusions 754 and recesses 756. The plurality of links 750 are rotatably coupled together through couplers 752. Couplers 752 are flexible along their length and do not provide rotation for the attached links 750 about a single axis. The flexibility provided by couplers 752 is generally orthogonal to vertical when vertical rod system 720-3 is installed into door 10 and door 10 is attached to door frame 12. Further, a length of vertical rod system 720-3 is easily adjusted by adding or removing links 750 thereto. Each of actuation system 700 and concealed upper latch assembly 702 will have mating coupling features to couple vertical rod system 720-3 thereto.

Figure 34:
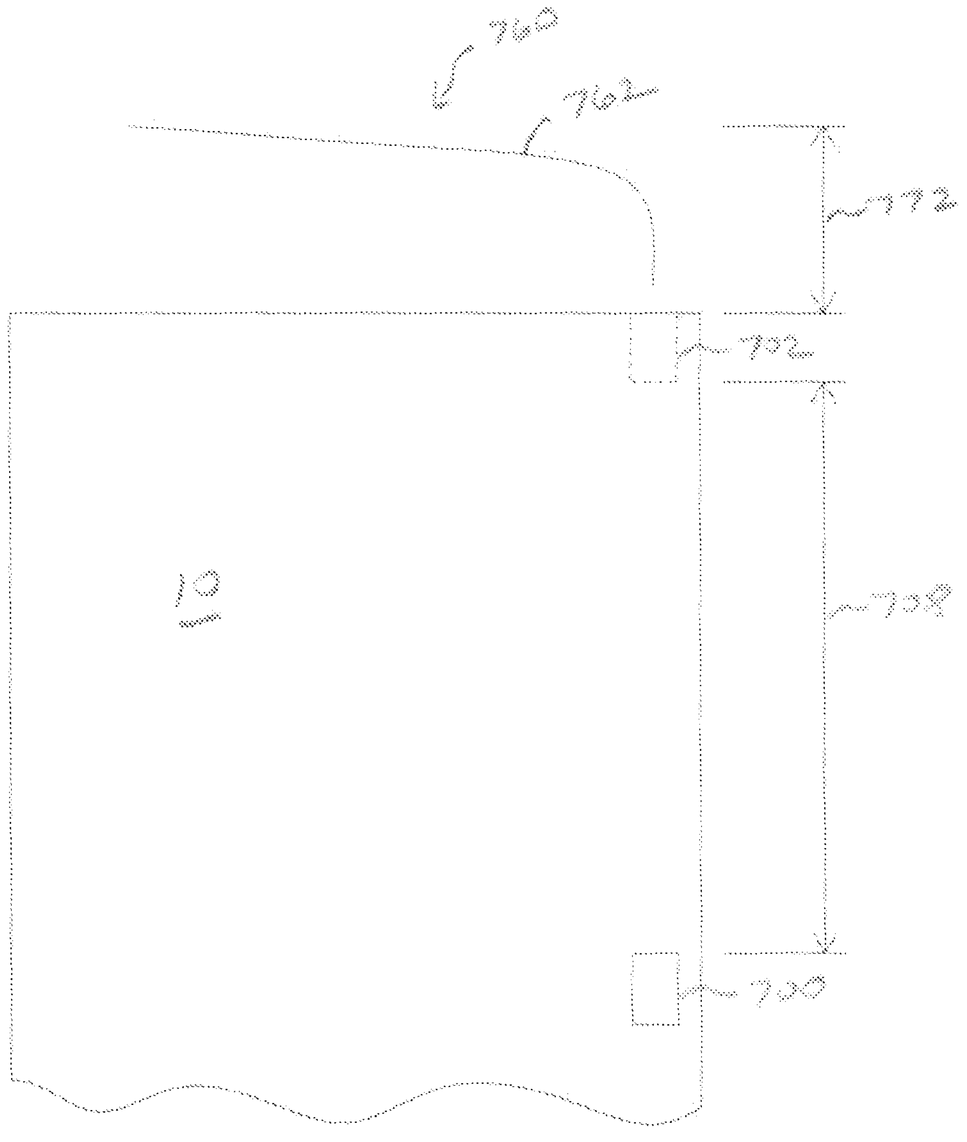
FIG. 34 shows a second exemplary rod system having at least one flexible section to operatively connect the actuator assembly and the upper latch assembly.

Referring to FIG. 34, a second embodiment 760 of link 740 is illustrated. Vertical rod system 760 includes a flexible rotary shaft 762 which is flexible along its length but has a torsional rigidity similar to a traditional single piece rod 709. Due to its flexibility vertical rod systems requires an installation length 772 beyond a boundary of door 10 of less than installation length 710 of a traditional one piece vertical rod 709.

Figure 38:
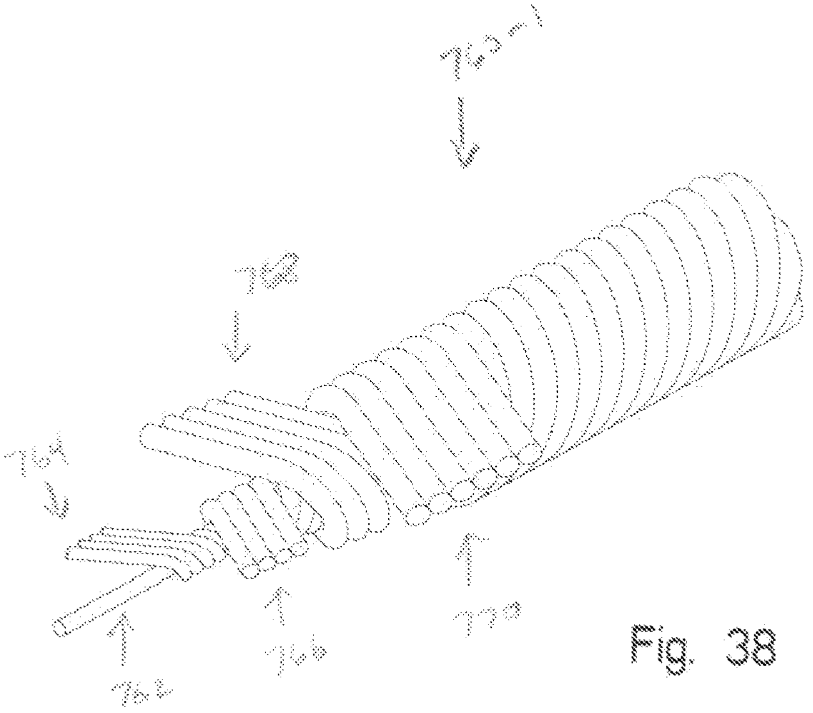
FIG. 38 shows a first exemplary rod system having at least one flexible section to operatively connect the actuator assembly and the upper latch assembly of FIG. 34.

Referring to FIG. 38, an embodiment 760-1 of vertical rod system 760 is shown. Vertical rod system 760-1 includes a central flexible shaft 762 and a plurality of sets of wires 764, 766, 768, and 770 wrapped about central flexible shaft 762.

Figure 40:
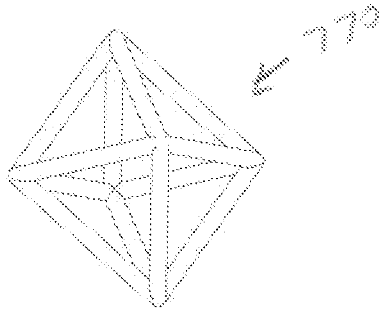
FIG. 40 shows a unit piece of a second exemplary rod system of FIG. 34.
Figure 41:
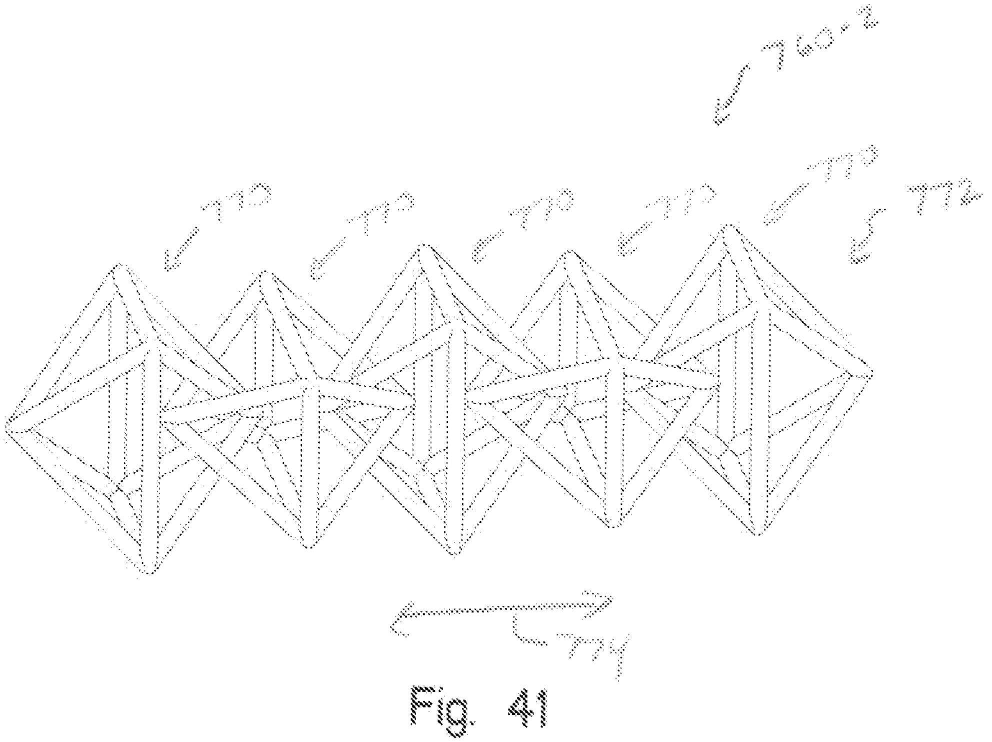
FIG. 41 shows a plurality of interlocking unit pieces of FIG. 40.

Referring to FIGS. 40 and 41, another embodiment 760-2 of vertical rod system 760 is shown. Referring to FIG. 40, an open unit 770, illustratively an octahedron is shown. A plurality of individual units 770 may be formed together to form a rod like structure 772. In embodiments, the individual units 770 are printed with a 3-D printer as structure 772. When units 770 are allowed to move relative to each other the vertical rod system 760-2 is flexible. When units 770 are compressed along length 774, the units 770 in essence interlock and the overall structure 772 becomes rigid. In embodiments, a flexible cable (not shown) may run through the units from a beginning of structure 772 to an end of structure 772 and the cable is tightened to draw units 770 into an interlocked arrangement.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An upper door latch assembly, comprising:

an upper latch comprising a rocker rotatable about a rocker axis of rotation from an extended, latched position to a retracted, unlatched position and from the retracted, unlatched position to the extended, latched position;

a rotatable input rotatable about a rotatable input axis of rotation, the rocker axis of rotation perpendicular to the rotatable input axis of rotation, the rotatable input having a rotatable input latched position and a rotatable input unlatched position, the rotatable input rotatable about the rotatable input axis of rotation from the rotatable input latched position to the rotatable input unlatched position and from the rotatable input unlatched position to the rotatable input latched position, the rotatable input maintaining the upper latch in the latched position when the rotatable input maintains the rotatable input latched position; and wherein an upper end of the rotatable input is maintained at a first distance from the rocker axis of rotation in both the rotatable input latched position and the rotatable input unlatched position.

2. The upper door latch assembly of claim 1, wherein the rotatable input extends a length greater than ½ of a height of a pedestrian traffic door, whereby the upper latch can be actuated from a distance greater than ½ of the height of the pedestrian traffic door.

3. The upper door latch assembly of claim 1, wherein the rotatable input comprises an upper vertical rod.

4. The upper door latch assembly of any of claims 1-3, wherein the rotatable input comprises a cam.

5. The upper door latch assembly of claim 4, wherein the cam has a cam longitudinal axis, the cam longitudinal axis offset from the rotatable input axis of rotation.

6. The upper door latch assembly of claim 1, further comprising:

a pivotable roller bracket pivotable about a pivot axis;

a roller rotatably supported by the pivotable roller bracket about a roller axis of rotation, the roller axis of rotation spaced a distance from the pivot axis, the pivotable roller bracket having a blocking position with the roller blocking movement of the upper latch from the extended, latched position toward the retracted, unlatched position, the pivotable roller bracket pivotable about the pivot axis from the blocking position to allow the upper latch to actuate toward the retracted, unlatched position.

7. The upper door latch assembly of claim 6, wherein the upper latch bears against the roller when actuated from the extended, latched position to the retracted, unlatched position.

8. The upper door latch assembly of claim 7, further comprising:

a torsion spring biasing the pivotable roller bracket toward the blocking position, the torsion spring biasing the roller toward the upper latch, the torsion spring providing a biasing force maintaining the position of the upper latch in the retracted, unlatched position when the upper latch maintains the retracted, unlatched position.

9. The upper door latch assembly of claim 6, wherein the rotatable input comprises a cam, the cam maintaining a stop position blocking pivoting of the pivotable roller bracket from the blocking position when the rotatable input maintains the rotatable input latched position, the cam having a cam longitudinal axis, the rotatable input comprises a rotatable input longitudinal axis, the cam longitudinal axis offset from the rotatable input longitudinal axis.

10. The upper door latch assembly of claim 8, wherein the upper latch comprises a return arm, the return arm positioned to receive a force to overcome the biasing force maintaining the position of the upper latch in the retracted, unlatched position.

11. An upper door latch assembly, comprising:

an upper latch having an extended, latched position and a retracted, unlatched position; and a rotatable input having a rotatable input latched position and a rotatable input unlatched position, the rotatable input rotatable about a rotatable input axis of rotation from the rotatable input latched position to the rotatable input unlatched position and from the rotatable input unlatched position to the rotatable input latched position, the rotatable input maintaining the upper latch in the latched position when the rotatable input maintains the rotatable input latched position, the rotatable input extending a length greater than ½ of a height of a pedestrian traffic door, whereby the upper latch can be actuated from a distance greater than ½ of the height of the pedestrian traffic door;

wherein the upper latch comprises a rocker rotatable about a rocker axis of rotation from the latched position to the unlatched position and from the unlatched position to the latched position, the rocker axis of rotation perpendicular to the rotatable input axis of rotation.

12. The upper door latch assembly of claim 11, wherein the rotatable input comprises an upper vertical rod.

13. The upper door latch assembly of claim 12, wherein the rotatable input comprises a cam having a cam longitudinal axis, the rotatable input comprises a rotatable input longitudinal axis, the cam longitudinal axis offset from the rotatable input longitudinal axis.

14. The upper door latch assembly of claim 11, further comprising:

a pivotable roller bracket pivotable about a pivot axis;

a roller rotatably supported by the pivotable roller bracket about a roller axis of rotation, the roller axis of rotation spaced a distance from the pivot axis, the pivotable roller bracket having a blocking position with the roller blocking movement of the upper latch from the extended, latched position toward the retracted, unlatched position, the pivotable roller bracket pivotable about the pivot axis from the blocking position to allow the upper latch to actuate toward the retracted, unlatched position.

15. The upper door latch assembly of claim 14, wherein the upper latch bears against the roller when actuated from the extended, latched position to the retracted, unlatched position.

16. The upper door latch assembly of claim 15, further comprising:

a torsion spring biasing the pivotable roller bracket toward the blocking position, the torsion spring biasing the roller toward the upper latch, the torsion spring providing a biasing force maintaining the position of the upper latch in the retracted, unlatched position when the upper latch maintains the retracted, unlatched position.

17. The upper door latch assembly of claim 16, wherein the rotatable input comprises a cam, the cam maintaining a stop position blocking pivoting of the pivotable roller bracket from the blocking position when the rotatable input maintains the rotatable input latched position, the cam having a cam longitudinal axis, the rotatable input comprises a rotatable input longitudinal axis, the cam longitudinal axis offset from the rotatable input longitudinal axis.

18. The upper door latch assembly of claim 16, wherein the upper latch comprises a return arm, the return arm positioned to receive a force to overcome the biasing force maintaining the position of the upper latch in the retracted, unlatched position.

19. The upper door latch assembly of claim 11, wherein the rotatable input comprises a cam, and wherein the cam includes a contact interface.

20. The upper door latch assembly of claim 19, wherein the cam includes a planar portion and an outer extent, at least one of the planar portion and the outer extent defining the contact interface.

21. The upper door latch assembly of claim 12, wherein a contact interface is located at a first end of the upper vertical rod.

22. The upper door latch assembly of claim 11, further comprising a contact interface rotatable with the rotatable input, the contact interface defining a radial displacement from the rotatable input axis of rotation as the rotatable input is rotated about the rotatable axis of rotation, the radial displacement varying from a first radial displacement to a second radial displacement as the rotatable input is rotated from a first rotational position to a second rotational position, the first radial displacement being different than the second radial displacement, the radial displacement operatively coupled to the upper latch to cause the upper latch to move between the extended, latched position and the retracted, unlatched position as the rotatable input is moved between the first rotational position and the second rotational position.

* * * * *